US012765575B2

(12) United States Patent
Basse et al.

(10) Patent No.: US 12,765,575 B2
(45) Date of Patent: Oct. 20, 2026

(54) FIBROUS OR LAMINATED, AND TEXTURED FOOD PRODUCT AND METHOD FOR PRODUCING SAME

(71) Applicant: UMIAMI SAS, Villebon sur Yvette (FR)

(72) Inventors: Benoȋt Basse, Villebon sur Yvette (FR); Marie Line El Chemali, Villebon sur Yvette (FR); Hugo Dupuis, Villebon sur Yvette (FR); Laurena Masbernat, Villebon sur Yvette (FR)

(73) Assignee: UMIAMI SAS, Villebon sur Yvette (FR)

( * ) Notice: Subject to any disclaimer, the term of this patent is extended or adjusted under 35 U.S.C. 154(b) by 481 days.

(21) Appl. No.: 18/346,337

(22) Filed: Jul. 3, 2023

(65) Prior Publication Data

US 2024/0081369 A1 Mar. 14, 2024

Related U.S. Application Data

(63) Continuation-in-part of application No. PCT/EP2022/071272, filed on Jul. 28, 2022.

(30) Foreign Application Priority Data

Jul. 30, 2021 (FR) ...................................... 2108339

(51) Int. Cl.
*A23J 3/14* (2006.01)
*A23J 3/22* (2006.01)
*A23J 3/24* (2006.01)

(52) U.S. Cl.
CPC ................ *A23J 3/14* (2013.01); *A23J 3/227* (2013.01); *A23J 3/24* (2013.01)

(58) Field of Classification Search
CPC ................ A23J 3/14; A23J 3/24; A23J 3/227
See application file for complete search history.

(56) References Cited

U.S. PATENT DOCUMENTS 3,870,808 A 3/1975 Boyer et al.
4,084,017 A * 4/1978 Kim .......................... A23J 3/24 426/802
4,423,083 A 12/1983 Shenouda
(Continued)

FOREIGN PATENT DOCUMENTS

CA 1072394 A 2/1980
WO 2009153751 A1 12/2009
WO 2021119614 A1 6/2021

OTHER PUBLICATIONS

Norton et al., "Leucine content of dietary proteins is a determinant of postprandial skeletal muscle protein synthesis in adult rats", Nutrition & Metabolism, 9:67, (2012), pp. 1-9. (Year: 2012).*
(Continued)

*Primary Examiner* — Elizabeth Gwartney
(74) *Attorney, Agent, or Firm* — Maier & Maier, PLLC

(57) ABSTRACT

The production of a new fibrous or laminated, and textured food product, in particular a new so-called meat substitute. Also, a method for producing the new fibrous or laminated, and textured food product. Further, the uses of the new fibrous or laminated, and textured food product as an intermediate product that can be used in the manufacture of other products.

21 Claims, 17 Drawing Sheets

Specification includes a Sequence Listing.

(56) References Cited

U.S. PATENT DOCUMENTS

| | | | |
|---|---|---|---|
| 5,811,150 | A | 9/1998 | Morikawa et al. |
| 2015/0305390 | A1 | 10/2015 | Holz-Schietinger et al. |

OTHER PUBLICATIONS

International Search Report issued on Dec. 5, 2022, in corresponding International Application No. PCT/EP2022/071272, 4 pages.
Consolacion et al., "Freeze Texturation of Proteins: Effect of the Alkali, Acid and Freezing Treatments on Texture Formation", Food Structure, vol. 5, No. 1, Article 5, Jan. 1, 1986, 8 pages.
He et al., "Material Perspective on the Structural Design of Artificial Meat", Advanced Sustainable Systems, vol. 5, No. 8, May 31, 2021, 16 pages.
Dekkers, "Creation of fibrous plant protein foods", Wageningen University, Sep. 14, 2018, 212 pages.
Dekkers et al., "Structuring processes for meat analogues", Trends in Food Science and Technology, GB, vol. 81, Nov. 1, 2018, 12 pages.
Braham et al., "Effect of Concentrated Salts Solutions on the Stability of Immobilized Enzymes: Influence of Inactivation Conditions nd Immobilization Protocol", Molecules, vol. 26, Feb. 12, 2021, 25 pages.
Butler et al., "Effects of Certain Metal Salts on the Inactivation of Solid Trypsin by Ionizing Radiation", Radiation Research, vol. 19, No. 4, Aug. 1963, 12 pages.
Chen et al., "Gel properties of SPI modified by enzymatic crosslinking during frozen storage", Food Hydrocolloids, Jan. 5, 2016, 32 pages.
Chen et al., "System parameters and product properties response of soybean protein extruded at wide moisture range", Journal of Food Engineering, vol. 96, Jul. 25, 2009, 6 pages.
Dan-Asabe et al., "Water Displacement and Bulk Density-Relation Methods of Finding Density of Powdered Materials", International Journal of Innovative Research in Science, Engineering and Technology, vol. 2, No. 9, Sep. 2013, 7 pages.
Motey, "La viande d'imitation pourrait envahir nos assiettes d'ici 2050", Nov. 13, 2013, https://www.lefigaro.fr/conso/2014/11/13/05007-20141113ARTFIG00006-la-viande-d-imitation-pourrait-envahir-nos-assiettes-d-ici-2050.php, 3 pages.
Grist et al., "The Inactivation of Enzymes by Ultraviolet Light. V. The Disruption of Specific Cystines in Ribonuclease", Radiation Research, vol. 26, No. 2, Oct. 1965, 14 pages.
Heck et al., "Enzyme-catalyzed protein crosslinking", Appl Microbiol Biotechnol, vol. 97, Nov. 25, 2012,15 pages.
Hughes et al., "Archimedes revisited: a faster, better, cheaper method of ccurately measuring the volume of small objects", Physics Education, vol. 40, No. 5, Sep. 2005, 8 pages.
Kerr et al., "Dynamic Mechanical Analysis of Marinated Chicken Breast Meat", Journal of Texture Studies, vol. 31, Aug. 2, 2000, 16 pages.
Langston et al., "Substrate Specificity of Streptomyces Transglutaminases", Applied Biochemistry and Biotechnology, vol. 136, May 14, 2006, 18 pages.
McLlaren et al., "Mechanism of Inactivation of Enzyme Proteins by Ultraviolet Light", Science, vol. 134, May 15, 1961, 2 pages.
Menendez et al., "Structural Changes of Microbial Transglutaminase during Thermal and High-Pressure Treatment", J. Agric. Food Chem., vol. 54, Feb. 7, 2006, 6 pages.
Skalecki et al., "Freezing-induced changes of the colour and texture of Baltic cod fillets", "Poulllltr, Rabbits, Nutria, Fish Meat", Polish Society of Food Technologists—Mallopolska Branch, Oct. 2010, 10 pages.
Mllamiel et al., "Influence of High-Intensity Ultrasound and Heat Treatment in Continuous Flow on Fat, Proteins, and Native Enzymes of Milk", J. Agric. Food Chem., vol. 48, Jan. 27, 2000, 7 pages.
Yokoyama et al., "Properties and applications of microbial transglutaminase", Appl Microbiol Biotechnol, vol. 64, Jan. 22, 2004, 8 pages.
Zhang et al., "Converting peanut protein biomass waste into 'double green' meat substitutes using a high-moisture extrusion process: a multi-scale method to explore a process for forming a meat-like fibrous structure", J. Agric. Food Chem., Aug. 27, 2019, 43 pages.

* cited by examiner

A

B

C

A

B

FIBROUS OR LAMINATED, AND TEXTURED FOOD PRODUCT AND METHOD FOR PRODUCING SAME

CROSS-REFERENCE TO RELATED APPLICATIONS

This is a Continuation-in-Part application of an international application PCT/EP2022/071272 filed on Jul. 28, 2002, which claims priory to FR2108339 filed on Jul. 30, 2021, which is hereby incorporated by reference into the present disclosure.

REFERENCE TO A SEQUENCE LISTING

In accordance with 37 CFR § 1.831, the present specification makes reference to a Sequence Listing submitted electronically as an ".xml" file named "CIP MEAT—Sequence Listing ST.26.xml". The .xml file was generated on Jun. 21, 2023 and is 2,316 bytes in size. The entire contents of the Sequence Listing are hereby incorporated by reference.

FIELD

The invention relates to the production of a new fibrous or laminated, and textured food product, and particularly a new product so-called "meat substitute". It also relates to a method for producing said new fibrous or laminated, and textured food product. It also relates to the uses of said new fibrous or laminated, and textured food product as an intermediate product that can be used in the manufacture of other products.

BACKGROUND

With the rise of vegetarian and vegan diets, and the awareness of the ecological cost of the meat industry, many food manufacturers have developed a wide range of meat substitutes that imitate meat products (e.g. steaks, cheeses, sausages, etc.). These products also called meat substitutes, imitation meat or vegetable meat, are food products whose organoleptic qualities are similar to a certain type of meat such as chicken or beef.

Moreover, the production of these artificial meats requires seven times less resources than that of real meat (Florent Motey, "La viande d'imitation pourrait envahir nos assiettes d'ici 2050", Le Figaro, 13 Nov. 2014, p. 1). Indeed, peas or brown algae, for example, require much less water than cattle breeding (which, moreover, must be fed with cereals).

These meat substitutes are basically made from non-meat products and sometimes also exclude products of animal origin, such as dairy products or eggs. Most of them are based on soya, wheat, cereals, peas, various photosynthetic plants, bacterial or fungal cultures which are denatured by chemical and mechanical treatment to obtain a product in the form of meat, which can then be flavoured. Recently, some companies have even tried their hand at making artificial meat with 3D printers.

Among the mechanical treatments used to produce these artificial meats, extrusion cooking is the most widely used in the food industry. This method is widely used in the food industry as it allows the production of expanded, precooked or textured products. It consists of subjecting raw materials or a mixture of raw materials to simultaneous mechanical and thermal treatment for a very short time. Briefly, the foodstuff is first mixed and homogenized by the addition of mechanical energy, then it is cooked by the thermal energy supplied in order to modify some of its molecular bonds and finally, the product is extruded by the force of pressure towards the outside through the die.

Among the chemical treatments that allow the production of these artificial meats, the use of enzymes in the food industry can be implemented. It is also possible to use salts or acid to produce these artificial meats by chemical treatment. Finally, it is possible to use physical treatments, such as high pressure or heat treatments.

However, as mentioned above, these meat substitutes, in order to offer the taste and texture qualities of the imitated products, undergo a series of treatments that considerably degrade their nutritional qualities and increase the health risks.

SUMMARY

A first aim of the invention is to provide a new fibrous or laminated, and textured food product, in particular a new fibrous or laminated, and textured food product with high nutritional values. A second purpose of the invention is to provide said new fibrous or laminated, and textured food product, in particular said new fibrous or laminated, and textured food product with high nutritional values, as an intermediate product that can be used in the manufacture of other products. A third aim of the invention is to propose a method for producing said new fibrous or laminated, and textured food product, which implements an innovative technology. Another aim of the invention is to propose a non-degrading method for obtaining said new fibrous or laminated, and textured food product with high nutritional values. Another aim of the invention is to propose the use of directional or even uni-directional freezing to induce the formation of fibres and to texture a protein solution. Another aim of the invention is to provide a new fibrous or laminated, and textured food product with high nutritional values coated with a second food product.

BRIEF DESCRIPTION OF THE DRAWINGS

Legend: +: Low presence of clear and independent fibres; ++: Medium presence of clear and independent fibres; and +++: High presence of clear and independent fibres

DETAILED DESCRIPTION

Figure 1:
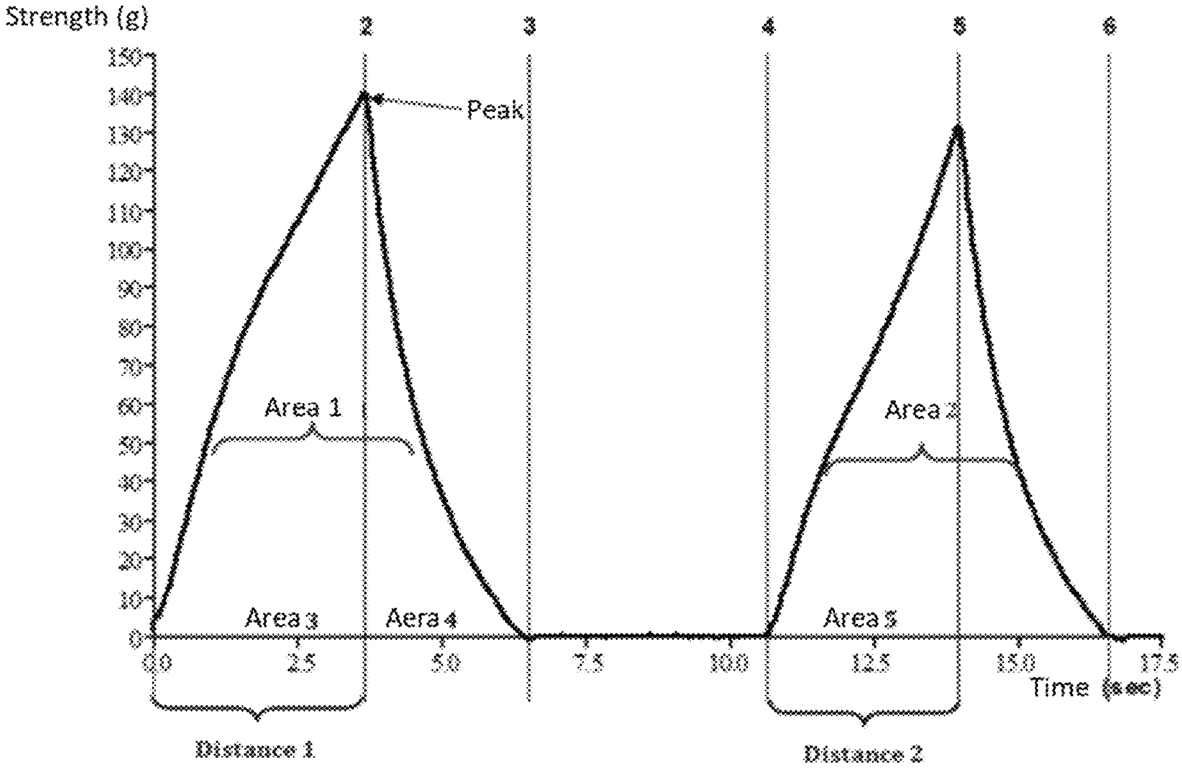
FIG. 1 shows a typical example of a graph obtained when analysing a texture profile.

According to a first aspect of the invention, the object of the invention is a fibrous or laminated, and textured food product characterized by:

an anisotropy greater than 1 a.u. (arbitrary unit) in a texturometry test; and a viscoelasticity tan δ less than 1 a.u. in a rheology test.

"Fibrous food product" means that the product of the invention is organized in filamentous formations in the form of bundles. It also means that the product of the invention has anisotropy, which can be measured in shear with a texturometer.

"Laminated food product" means that the product of the invention is organized in flat expanses laid on top of each other or in sheets laid on top of each other. This also means that the product of the invention has anisotropy, which can be measured in shear with a texturometer.

Furthermore, it should be noted that a cross-section of the flat sheets or laminates constituting the laminated food product shows fibres, which are essentially straight. The edge of a flat surface or sheet therefore corresponds to a fibre, hence the above characterization of a fibrous food product.

"Textured food product" means that the product of the invention is derived from a liquid mixture which, following the implementation of the method of the invention, has solid viscoelastic characteristics measurable in rheology.

By "fibrous or laminated, and textured food product" (also referred to as the product of the invention), it is thus understood that the product of the invention combines its characteristics and thus has measurable anisotropy and viscoelasticity.

By "anisotropy" we mean the property of being direction dependent, in this case the direction of the fibres. This can be measured by classical techniques known in the prior art, such as a texturometry test. In this respect and from a theoretical point of view, an anisotropy greater than 1 a.u. translates into "fibrous" or "laminated" (Chen f., Wei Y. M, Zhang B., Okhonlaye Ojokoh A., 2010. *System parameters and product properties response of soybean protein extruded at wide moisture range. Journal of Food Engineering*. Volume 96, Issue 2, 208-213). Viscoelasticity" refers to the property of materials that exhibit both viscous and elastic characteristics when subjected to deformation. This can be measured by conventional techniques known in the prior art such as a rheology test in which the loss factor or damping factor tan δ is measured, where δ is the phase angle or loss, or phase shift, between stress and strain. In this respect and from a theoretical point of view, a viscoelasticity tan δ less than 1 a.u. translates into "solid and textured" (Kerr W. L., Li R., Toledo T. 2000. *Dynamic mechanical analysis of marinated chicken breast meat. Journal of Textures Studies*. Volume 31, 421-436).

Other parameters may be associated with these two parameters to characterise the product of the invention. In this respect and according to another mode of implementation, the invention relates to the fibrous or laminated, and textured food product as described above, further characterized by a fibre density from 40.00±5.00% to 90.00±0.10%, in which the ratio [fibre length:product width] is from 0.03±0.02 a.u. to 0.15±0.01 a.u., in particular from 0.03±0.02 a.u. to 0.13±0.02 a.u.

"Fibre density" means the volume fraction occupied by fibres in a cross-section (along the axis perpendicular to the length of the product) in the widest part of the product, measured by image analysis. Furthermore, it has to be noted that "fibre density from 40.00% to 90.00%" encompasses a fibre density strictly from 40.00% to 90.00%. "Fibre density from 40.00% to 90.00%" means that the density can also be from 40.00% to 70.00%, from 70.00% to 90.00%, from 45.00% to 85.00%, from 50.00% to 80.00%, from 55.00% to 75.00% or from 60.00% to 70.00%. This also means that the fibre density can be 40.00%, 45.00%, 50.00%, 55.00%, 60.00%, 65.00%, 70.00%, 75.00%, 80.00%, 85.00% or 90.00%. Moreover, the fibres of the product of the invention being essentially rectilinear (i.e. at least 90% of the fibres have a shape which can be likened to a straight line, cf. FIG. 21 right-hand panel), another embodiment of the invention relates to the fibrous or laminated, and textured food product as described above further characterized by the presence of essentially rectilinear fibres.

The ratio [fibre length:product width] means the ratio of the average fibre length of the product (in mm), measured by image analysis, to its total product width (mm), measured with a ruler.

Furthermore, it has to be noted that "ratio [fibre length: product width] from 0.03±0.02 a.u. to 0.15±0.01 a.u., in particular from 0.03±0.02 a.u. to 0.13±0.02 a.u." encompasses a ratio [fibre length:product width] strictly from 0.03 a.u. to 0.15 a.u., in particular strictly from 0.03 a.u. to 0.13 a.u. "Ratio [fibre length:product width] from 0.03 a.u. to 0.15 a.u., in particular from 0.03 a.u. to 0.13 a.u." means that this ratio can also be from 0.03 a.u. to 0.08 a.u., from 0.08 a.u. to 0.13 a.u., from 0.04 a.u. to 0.12 a.u., from 0.05 a.u. to 0.11 a.u., from 0.06 a.u. to 0.10 a.u. or from 0.07 a.u. to 0.09 a.u. This also means that this ratio can be equal to 0.03 a.u., 0.04 a.u. to 0.12 a.u., 0.05 a.u. to 0.11 a.u., 0.06 a.u. to 0.10 a.u. or 0.07 a.u. to 0.09 a.u, 0.04 a.u., 0.05 a.u., 0.06 a.u., 0.07 a.u., 0.08 a.u., 0.09 a.u., 0.10 a.u., 0.11 a.u., 0.12 a.u., 0.13 a.u., 0.14 a.u. or 0.15 a.u.

In view of the above, it is understood that another embodiment of the invention is the fibrous or laminated, and textured food product as described above further characterized by a fibre density from 40.00±5.00% to 90.00±0.10%, said fibres being substantially straight, and in which the ratio [fibre length:product width] is from 0.03±0.02 a.u. to 0.15±0.01 a.u., in particular from 0.03±0.02 a.u. to 0.13±0.02 a.u.

In view of the above, it is understood that another embodiment of the invention is the fibrous or laminated, and textured food product as described above further characterized by a fibre density from 40.00% to 90.00%, said fibres being substantially straight, and in which the ratio [fibre length:product width] is from 0.03 a.u. to 0.15 a.u., in particular from 0.03 a.u. to 0.13 a.u.

According to another embodiment, the invention relates to the fibrous or laminated, and textured food product as described above further characterized by:

a firmness from 10.00±1.00 N to 50.00±10.00 N in a texturometry test; and a water retention capacity from 50.00±3.00% to 90.00±9.10%, in particular from 50.00±3.00% to 90.00±1.00%.

"Firmness" means the force required to compress the product of the invention between 2 molars. This parameter is therefore defined as the power required to obtain a certain deformation. Furthermore, it has to be noted that "firmness from 10.00±1.00 N to 50.00±10.00 N" encompasses a firmness strictly from 10.00 N to 50.00 N. "Firmness from 10.00 N to 50.00 N", means that the firmness can also be from 10.00 N to 39.99 N, and the product of the invention is then described as not very firm, or from 40.00 N to 50.00 N, and the product of the invention is then described as very firm.

"Water retention capacity" means the quantity representative of the capacity of the product structure to retain water when compressed with a mass of 1 kg for 5 minutes. It is measured with the following equation:

$$\text{Water retention capacity (\%)} = \frac{\text{Moisture content (\%)} - \text{Water loss (\%)}}{\text{Moisture content (\%)}}$$

The moisture is measured by means of a thermobalance and the water loss is measured by the ratio of the difference in mass of the product before and after compression to the mass of the product before compression. Furthermore, it has to be noted that "water retention capacity from 50.00±3.00% to 90.00±9.10%, in particular from 50.00±3.00% to 90.00±1.00%" encompasses a water retention capacity strictly from 50.00% to 99.10%, in particular strictly from 50.00% to 90.00%. "Water retention capacity from 50.00% to 99.10%, in particular from 50.00% to 90.00%" means that this can also be from 80.00% to 99.10%, in particular from 80.00% to 90.00%, in which case the product of the invention is characterized by a high water retention capacity, or from 40.00% to 79.99%, in which case the product of the invention is characterized by a low water retention capacity.

In view of the foregoing, it is understood that according to one embodiment the invention relates to a fibrous or laminated, and textured food product characterized by:

- an anisotropy greater than 1 a.u. in a texturometry test;
- a viscoelasticity tan δ less than 1 a.u. in a rheology test;
- a firmness from 10.00±1.00 N to 50.00±10.00 N in a texturometry test;
- a water retention capacity from 50.00±3.00% to 90.00±9.10%, in particular from 50.00±3.00% to 90.00±1.00%; and
- a fibre density from 40.00±5.00% to 90.00±0.10%, in which the ratio [fibre length:product width] is from 0.03±0.02 a.u. to 0.15±0.01 a.u., in particular from 0.03±0.02 a.u. to 0.13±0.02 a.u.

In particular and according to another embodiment the invention relates to a fibrous or laminated, and textured food product characterized by:

- an anisotropy greater than 1 a.u. in a texturometry test;
- a viscoelasticity tan δ less than 1 a.u. in a rheology test;
- a firmness from 10.00 N to 50.00 N in a texturometry test;
- a water retention capacity from 50.00% to 99.10%, in particular from 50.00% to 90.00%; and
- a fibre density from 40.00% to 90.00%, in which the ratio [fibre length:product width] is from 0.03 a.u. to 0.15 a.u., in particular from 0.03 a.u. to 0.13 a.u.

In particular and according to another embodiment, the invention relates to a fibrous or laminated, and textured food product characterized by:

- an anisotropy greater than 1 a.u. in a texturometry test;
- a viscoelasticity tan δ less than 1 a.u. in a rheology test;
- a firmness from 10.00 N to 39.99 N in a texturometry test;
- a water retention capacity from 80.00% to 99.10%, in particular from 80.00% to 90.00%; and
- a fibre density from 40.00% to 90.00%, in which the ratio [fibre length:product width] is from 0.03 a.u. to 0.15 a.u., in particular from 0.03 a.u. to 0.13 a.u.

In particular and according to another embodiment, the invention relates to a fibrous or laminated, and textured food product characterized by:

- an anisotropy greater than 1 a.u. in a texturometry test;
- a viscoelasticity tan δ less than 1 a.u. in a rheology test;
- a firmness from 40.00 N to 50.00 N in a texturometry test;
- a water retention capacity from 40.00% to 79.99%; and
- a fibre density from 40.00% to 90.00%, in which the ratio [fibre length:product width] is from 0.03 a.u. to 0.15 a.u., in particular from 0.03 a.u. to 0.13 a.u.

In particular and according to another embodiment, the invention relates to a fibrous or laminated, and textured food product characterized by:

- an anisotropy greater than 1 a.u. in a texturometry test;
- a viscoelasticity tan δ less than 1 a.u. in a rheology test;
- a firmness from 40.00 N to 50.00 N in a texturometry test;
- a water retention capacity from 80.00% to 99.10%, in particular from 80.00% to 90.00%; and
- a fibre density from 40.00% to 90.00%, in which the ratio [fibre length:product width] is from 0.03 a.u. to 0.15 a.u., in particular from 0.03 a.u. to 0.13 a.u.

According to another embodiment, the invention relates to the fibrous or laminated, and textured food product as described above further characterized by a density from 1.40±0.19 $g/cm^3$ to 1.90±0.10 $g/cm^3$, in particular from 1.59±0.10 $g/cm^3$ to 1.90±0.10 $g/cm^3$, in a water displacement test.

"Density" means the ratio of the mass of the product to its volume, in $g/cm^3$. The mass of the product is measured by weighing and the volume by water displacement (Dan-Asabe, B., Yaro, S. A., Yawas, D. S., & Aku, S. Y. (2007). *Water displacement and bulk density-relation methods of finding density of powered materials*. International Journal of Innovative Research in Science, Engineering and Technology, 3297(9); Hughes, S. W. (2005). *Archimedes revisited: a faster, better, cheaper method of accurately measuring the volume of small objects*. Physics Education, 40(5), 468-474). Furthermore, it has to be noted that "density from 1.40±0.19 $g/cm^3$ to 1.90±0.10 $g/cm^3$, in particular from 1.59±0.10 $g/cm^3$ to 1.90±0.10 $g/cm^3$" encompasses a density strictly from 1.40 $g/cm^3$ to 1.90 $g/cm^3$, in particular strictly from 1.59 $g/cm^3$ to 1.90 $g/cm^3$. "Density from 1.40 $g/cm^3$ to 1.90 $g/cm^3$, in particular from 1.59 $g/cm^3$ to 1.90 $g/cm^3$" means that this density can also be from 1.59 $g/cm^3$ to 1.75 $g/cm^3$, from 1.75 $g/cm^3$ to 1.90 $g/cm^3$, from 1.65 $g/cm^3$ to 1.85 $g/cm^3$ or from 1.70 $g/cm^3$ to 1.70 $g/cm^3$. This means that it can also be equal to 1.40 $g/cm^3$, 1.45 $g/cm^3$, 1.50 $g/cm^3$, 1.55 $g/cm^3$, 1.59 $g/cm^3$, 1.60 $g/cm^3$, 1.65 $g/cm^3$, 1.70 $g/cm^3$, 1.75 $g/cm^3$, 1.80 $g/cm^3$, 1.85 $g/cm^3$ or 1.90 $g/cm^3$.

According to another embodiment, the invention relates to the fibrous or laminated, and textured food product as described above further characterized by an elasticity (strictly) from 10.00% to 55.00% in a texturometry test.

"Elasticity" means the ability of a product to return to its original shape within a given time between two compressions. It is measured in % by the ratio Distance 2/Distance 1 (see FIG. 1). Furthermore, "elasticity (strictly) from 10.00% to 55.00%" means that the elasticity can also be from 10.00% to 30.00%, from 30.00% to 55.00%, from 15.00% to 50.00%, from 20.00% to 45.00%, from 25.00% to 40.00% or from 30.00% to 35.00%. This also means that it can be equal to 10.00%, 15.00%, 20.00%, 25.00%, 30.00%, 35.00%, 40.00%, 45.00%, 50.00% or 55.00%.

According to another embodiment, the invention relates to the fibrous or laminated, and textured food product as described above, further characterized by a dry matter content (in g of water/100 g product) from 15±1.00% to 39±1.00% as measured by a thermobalance.

"Dry matter content" means the fraction of the product that is dry matter. This quantity is calculated as follows:

Dry matter content (%)=100−Moisture content (%)

Furthermore, it has to be noted that "dry matter content (in g of water/100 g product) from 15±1.00% to 39±1.00%" encompasses a dry matter content strictly from 15% to 39%. "Dry matter content from 15% to 39%" means that it can also be from 16% to 35% or from 20% to 30%. This also means that the dry matter content can be 15%, 16%, 17%, 18%, 19%, 20%, 21%, 22%, 23%; 24%, 25%, 26%, 27%, 28%, 29%, 30%, 31%, 32%, 33%, 34%, 35%, 36%, 37%, 38% or 39%.

In view of the foregoing, it is understood that according to one embodiment the invention relates to a fibrous or laminated, and textured food product characterized by:

an anisotropy greater than 1 a.u. in a texturometry test;
a viscoelasticity tan δ less than 1 a.u. in a rheology test;
a firmness from 10.00±1.00 N to 50.00±10.00 N in a texturometry test;
a water retention capacity from 50.00±3.00% to 90.00±9.10%, in particular from 50.00±3.00% to 90.00±1.00%;
a dry matter content (in g of water/100 g of product) from 15±1.00% to 39±1.00% measured by a thermobalance;
a density from 1.40±0.19 g/cm$^3$ to 1.90±0.10 g/cm$^3$, in particular from 1.59±0.10 g/cm$^3$ to 1.90±0.10 g/cm$^3$, in a water displacement test;
an elasticity (strictly) from 10.00% to 55.00% in a texturometry test; and
a fibre density from 40.00±5.00% to 90.00±0.10%;

in which the ratio [fibre length:product width] is from 0.03±0.02 a.u. to 0.15±0.01 a.u., in particular from 0.03±0.02 a.u. to 0.13±0.02 a.u.

In particular and according to another embodiment, the invention relates to a fibrous or laminated, and textured food product characterized by:

an anisotropy greater than 1 a.u. in a texturometry test;
a viscoelasticity tan δ less than 1 a.u. in a rheology test;
a firmness from 10.00 N to 50.00 N in a texturometry test;
a water retention capacity from 50.00% to 99.10%, in particular from 50.00% to 90.00%;
a dry matter content (in g of water/100 g of product) from 15% to 39% measured by a thermobalance;
a density from 1.40 g/cm$^3$ to 1.90 g/cm$^3$, in particular from 1.59 g/cm$^3$ to 1.90 g/cm$^3$, in a water displacement test;
an elasticity (strictly) from 10.00% to 55.00% in a texturometry test; and
a fibre density from 40.00% to 90.00%, in which the ratio [fibre length:product width] is from 0.03 a.u. to 0.15 a.u., in particular from 0.03 a.u. to 0.13 a.u.

In particular and according to another embodiment, the invention relates to a fibrous or laminated, and textured food product characterized by:

an anisotropy greater than 1 a.u. in a texturometry test;
a viscoelasticity tan δ less than 1 a.u. in a rheology test;
a firmness from 10.00 N to 39.99 N in a texturometry test;
a water retention capacity from 80.00% to 99.10%, in particular from 80.00% to 90.00%;
a dry matter content (in g of water/100 g of product) from 15% to 39% measured by a thermobalance;
a density from 1.40 g/cm$^3$ to 1.90 g/cm$^3$, in particular from 1.59 g/cm$^3$ to 1.90 g/cm$^3$, in a water displacement test;
an elasticity from 10.00% to 55.00% in a texturometry test; and
a fibre density from 40.00% to 90.00%, in which the ratio [fibre length:product width] is from 0.03 a.u. to 0.15 a.u., in particular from 0.03 a.u. to 0.13 a.u.

In particular and according to another embodiment, the invention relates to a fibrous or laminated, and textured food product characterized by:

an anisotropy greater than 1 a.u. in a texturometry test;
a viscoelasticity tan δ less than 1 a.u. in a rheology test;
a firmness from 40.00 N to 50.00 N in a texturometry test;
a water retention capacity from 40.00% to 79.99%;
a dry matter content (in g of water/100 g of product) from 15% to 39% measured by a thermobalance;
a density from 1.40 g/cm$^3$ to 1.90 g/cm$^3$, in particular from 1.59 g/cm$^3$ to 1.90 g/cm$^3$, in a water displacement test;
an elasticity from 10.00% to 55.00% in a texturometry test; and
a fibre density from 40.00% to 90.00%, in which the ratio [fibre length:product width] is from 0.03 a.u. to 0.15 a.u., in particular from 0.03 a.u. to 0.13 a.u.

In particular and according to another embodiment, the invention relates to a fibrous or laminated, and textured food product characterized by:

an anisotropy greater than 1 a.u. in a texturometry test;
a viscoelasticity tan δ less than 1 a.u. in a rheology test;
a firmness of 40.00 N to 50.00 N in a texturometry test;
a water retention capacity of 80.00% to 90.00%;
a dry matter content (in g of water/100 g of product) from 15% to 39% measured by a thermobalance;
a density from 1.40 g/cm$^3$ to 1.90 g/cm$^3$, in particular from 1.59 g/cm$^3$ to 1.90 g/cm$^3$, in a water displacement test;
an elasticity from 10.00% to 55.00% in a texturometry test; and
a fibre density from 40.00% to 90.00%, in which the ratio [fibre length:product width] is from 0.03 a.u. to 0.15 a.u., in particular from 0.03 a.u. to 0.13 a.u.

According to another embodiment, the invention relates to the fibrous or laminated, and textured food product as described above wherein said fibres have a thickness from 0.10±0.05 mm to 1.00±0.50 mm and a length from 1.00±0.50 mm to 150.00±20.00 mm.

"Fibre thickness" means the distance between two ends of a fibre along an axis perpendicular to its development, measured in mm by image analysis. Furthermore, it has to be noted that "thickness from 0.10±0.05 mm to 1.00±0.50 mm" encompasses a thickness strictly from 0.10 mm to 1.00 mm. "Thickness from 0.10 mm to 1.00 mm" means that the thickness can also be from 0.10 mm to 0.55 mm, from 0.55 mm to 1.00 mm, from 0.15 mm to 0.95 mm, from 0.20 mm to 0.90 mm, from 0.25 mm to 0.85 mm, from 0.30 mm to 0.80 mm, from 0.35 mm to 0.75 mm or from 0.40 mm to 0.70 mm. This also means that it can be equal to 0.10 mm, 0.20 mm, 0.30 mm, 0.40 mm, 0.50 mm, 0.60 mm, 0.70 mm, 0.80 mm, 0.90 mm or 1.00 mm.

"Fibre length" means the distance between two ends of a fibre following its development, measured in mm by image analysis. Furthermore, it has to be noted that "length from 1.00±0.50 mm to 150.00±20.00 mm" encompasses a length strictly from 1.00 mm to 150.00 mm. "Length from 1.00 mm to 150.00 mm" means that the length can also be from 1.00 mm to 95.00 mm, from 95.00 mm to 150.00 mm, from 5.00 mm to 120.00 mm, from 15.00 mm to 100.00 mm, from 25.00 mm to 85.00 mm, or from 45.00 mm to 75.00 mm This also means that it can be equal to 1.00 mm, 10.00 mm, 20.00 mm, 30.00 mm, 40.00 mm, 50.00 mm, 60.00 mm, 70.00 mm, 80.00 mm, 90.00 mm, 100.00 mm, 110.00 mm, 120.00 mm, 130.00 mm, 140.00 mm or 150.00 mm.

According to another embodiment, the invention relates to the fibrous or laminated, and textured food product as described above in which the inter-fibre space is from 0.05±0.03 mm to 1.00±0.50 mm.

"Inter-fibre space" means the distance between two fibres side by side, measured in mm by image analysis. Furthermore, it has to be noted that "inter-fibre space is from 0.05±0.03 mm to 1.00±0.50 mm" encompasses an inter-fibre space strictly from 0.05 mm to 1.00 mm. "Inter-fibre space from 0.05 mm to 1.00 mm" means that this space can also be from 0.05 mm to 0.50 mm, from 0.50 mm to 1.00 mm, from 0.10 mm to 0.90 mm, from 0.20 mm to 0.80 mm, from 0.30 mm to 0.70 mm or from 0.40 mm to 0.60 mm. This also means that it can be equal to 0.05 mm, 0.10 mm, 0.15 mm, 0.20 mm, 0.25 mm, 0.30 mm, 0.35 mm, 0.40 mm, 0.45 mm, 0.50 mm, 0.55 mm, 0.60 mm, 0.65 mm, 0.70 mm, 0.75 mm, 0.80 mm, 0.85 mm, 0.90 mm, 0.95 mm, or 1.00 mm.

According to another embodiment, the invention relates to the fibrous or laminated, and textured food product as described above further characterized by a chewability from 10.00±5.00 N to 1,500.00±150.00 N in a texturometry test.

"Chewability" means the energy required to chew the product of the invention to prepare it for swallowing. Furthermore, it has to be noted that "chewability from 10.00±5.00 N to 1,500.00±150.00 N" encompasses a chewability strictly from 10.00 N to 1,500.00 N. "Chewability from 10.00 N to 1,500.00 N" means that the chewability can also be from 10.00 N to 900.00 N, from 900.00 N to 1,500.00 N, from 250.00 N to 1,250.00 N or from 500 N to 1,000.00 N. This also means that it can be equal to N10.00, N50.00, N100.00, N250.00, N500.00, N750.00, N1,000.00, N1,250.00 or N1,500.00.

According to another embodiment, the invention relates to the fibrous or laminated, and textured food product as described above, further characterized by a cohesion from 0.10±0.05 a.u. to 0.70±0.10 a.u. in a texturometry test.

"Cohesion" means the ability of the product to resist a second deformation, relative to its ability to resist a first deformation. It is measured by the ratio Aire2/Aire 1 (see FIG. 1). Furthermore, it has to be noted that "cohesion from 0.10±0.05 a.u. to 0.70±0.10 a.u." encompasses a cohesion strictly from 0.10 a.u. to 0.70 a.u. "Cohesion from 0.10 a.u. to 0.70 a.u.", means that the cohesion may also be from 0.10 a.u. to 0.40 a.u., from 0.40 a.u. to 0.70 a.u, from 0.20 a.u. to 0.60 a.u. or from 0.30 a.u. to 0.50 a.u. This also means that it can be equal to 0.10 a.u., 0.20 a.u., 0.30 a.u., 0.40 a.u., 0.50 a.u., 0.60 a.u. or 0.70 a.u.

According to another embodiment, the invention relates to the fibrous or laminated, and textured food product as described above further characterized by a resilience (strictly) from 5.00% to 28.00%, in particular (strictly) from 5.00% to 25.00%, in a texturometry test.

"Resilience" means the ability of a product to return to its original size after compression. It is measured in % by the ratio of Area 4/Area 3 (see FIG. 1). Furthermore, "resilience (strictly) from 5.00% to 28.00%, in particular (strictly) from 5.00% to 25.00%" means that the resilience can also be 5.00% to 15.00%, 15.00% to 25.00% or 10.00% to 20.00%. This also means that it can be 5.00%, 10.00%, 15.00%, 20.00% or 25.00%.

In view of the foregoing, it is understood that according to one embodiment the invention relates to a fibrous or laminated, and textured food product characterized by:

- an anisotropy greater than 1 a.u. in a texturometry test;
- a viscoelasticity tan δ less than 1 a.u. in a rheology test;
- a firmness from 10.00±1.00 N to 50.00±10.00 N in a texturometry test;
- a water retention capacity from 50.00±3.00% to 90.00±9.10%, in particular from 50.00±3.00% to 90.00±1.00%;
- a resilience (strictly) from 5.00% to 28.00%, in particular (strictly) from 5.00% to 25.00%, in a texturometry test;
- an elasticity (strictly) from 10.00% to 55.00% in a texturometry test; and
- a fibre density from 40.00±5.00% to 90.00±0.10%, in which the ratio [fibre length:product width] is from 0.03±0.02 a.u. to 0.15±0.01 a.u., in particular from 0.03±0.02 a.u. to 0.13±0.02 a.u.

In particular and according to another embodiment the invention relates to a fibrous or laminated, and textured food product characterized by:

- an anisotropy greater than 1 a.u. in a texturometry test;
- a viscoelasticity tan δ less than 1 a.u. in a rheology test;
- a firmness from 10.00 N to 50.00 N in a texturometry test;
- a water retention capacity from 50.00% to 99.10%, in particular from 50.00% to 90.00%;
- a resilience (strictly) from 5.00% to 28.00%, in particular (strictly) from 5.00% to 25.00%, in a texturometry test;
- an elasticity (strictly) from 10.00% to 55.00% in a texturometry test; and
- a fibre density from 40.00% to 90.00%, in which the ratio [fibre length:product width] is from 0.03 a.u. to 0.15 a.u., in particular from 0.03 a.u. to 0.13 a.u.

In view of the foregoing, it is also understood that according to one embodiment the invention relates to a fibrous or laminated, and textured food product characterized by:

- an anisotropy greater than 1 a.u. in a texturometry test;
- a viscoelasticity tan δ less than 1 a.u. in a rheology test;
- a firmness from 10.00±1.00 N to 50.00±10.00 N in a texturometry test;
- a water retention capacity from 50.00±3.00% to 90.00±9.10%, in particular from 50.00±3.00% to 90.00±1.00%;
- a resilience (strictly) from 5.00% to 28.00%, in particular (strictly) from 5.00% to 25.00% in a texturometry test;
- a cohesion from 0.10±0.05 a.u. to 0.70±0.10 a.u. in a texturometry test;
- an elasticity (strictly) from 10.00% to 55.00% in a texturometry test;
- a chewability from 10.00±5.00 N to 1,500.00±150.00 N in a texturometry test;
- a density from 1.40±0.19 $g/cm^3$ to 1.90±0.10 $g/cm^3$, in particular from 1.59±0.10 $g/cm^3$ to 1.90±0.10 $g/cm^3$, in a water displacement test;
- a dry matter content (in g of water/100 g of product) from 15±1.00% to 39±1.00% as measured by a thermobalance; and
- a fibre density from 40.00±5.00% to 90.00±0.10%;

wherein said fibres have a thickness from 0.10±0.05 mm to 1.00±0.50 mm and a length from 1.00±0.50 mm to 150.00±20.00 mm, the inter-fibre space being from 0.05±0.03 mm to 1.00±0.50 mm, and in which the ratio [fibre length:product width] is from 0.03±0.02 a.u. to 0.15±0.01 a.u., in particular from 0.03±0.02 a.u. to 0.13±0.02 a.u.

In particular and according to another embodiment, the invention relates to a fibrous or laminated, and textured food product characterized by:

- an anisotropy greater than 1 a.u. in a texturometry test;
- a viscoelasticity tan δ less than 1 a.u. in a rheology test;
- a firmness from 10.00 N to 50.00 N in a texturometry test;
- a water retention capacity from 50.00% to 99.10%, in particular from 50.00% to 90.00%;
- a resilience from 5.00% to 28.00%, in particular from 5.00% to 25.00% in a texturometry test;
- a cohesion from 0.10 a.u. to 0.70 a.u. in a texturometry test;
- an elasticity from 10.00% to 55.00% in a texturometry test;
- a chewability from 10.00 N to 1500.00 N in a texturometry test;
- a density from 1.40 g/cm$^3$ to 1.90 g/cm$^3$, in particular from 1.59 g/cm$^3$ to 1.90 g/cm$^3$, in a water displacement test;
- a dry matter content (in g of water/100 g of product) from 15% to 39% as measured by a thermobalance; and
- a fibre density from 40.00% to 90.00%;

wherein said fibres have a thickness from 0.10 mm to 1.00 mm and a length from 1.00 mm to 150.00 mm, the inter-fibre space being from 0.05 mm to 1.00 mm, and in which the ratio [fibre length:product width] is from 0.03 a.u. to 0.15 a.u., in particular from 0.03 a.u. to 0.13 a.u.

In particular and according to another embodiment, the invention relates to a fibrous or laminated, and textured food product characterized by:

- an anisotropy greater than 1 a.u. in a texturometry test;
- a viscoelasticity tan δ less than 1 a.u. in a rheology test;
- a firmness from 10.00 N to 39.99 N in a texturometry test;
- a water retention capacity from 80.00% to 99.10%, in particular from 80.00% to 90.00%;
- a resilience from 5.00% to 28.00%, in particular from 5.00% to 25.00% in a texturometry test;
- a cohesion from 0.10 a.u. to 0.70 a.u. in a texturometry test;
- an elasticity from 10.00% to 55.00% in a texturometry test;
- a chewability from 10.00 N to 1500.00 N in a texturometry test;
- a density from 1.40 g/cm$^3$ to 1.90 g/cm$^3$, in particular from 1.59 g/cm$^3$ to 1.90 g/cm$^3$, in a water displacement test;
- a dry matter content (in g of water/100 g of product) from 15% to 39% as measured by a thermobalance; and
- a fibre density from 40.00% to 90.00%;

wherein said fibres have a thickness from 0.10 mm to 1.00 mm and a length from 1.00 mm to 150.00 mm, the inter-fibre space being from 0.05 mm to 1.00 mm, and in which the ratio [fibre length:product width] is from 0.03 a.u. to 0.15 a.u., in particular from 0.03 a.u. to 0.13 a.u.

In particular and according to another embodiment, the invention relates to a fibrous or laminated, and textured food product characterized by:

- an anisotropy greater than 1 a.u. in a texturometry test;
- a viscoelasticity tan δ less than 1 a.u. in a rheology test;
- a firmness of 40.00 N to 50.00 N in a texturometry test;
- a water retention capacity from 40.00% to 79.99%;
- a resilience from 5.00% to 28.00%, in particular from 5.00% to 25.00% in a texturometry test;
- a cohesion from 0.10 a.u. to 0.70 a.u. in a texturometry test;
- an elasticity from 10.00% to 55.00% in a texturometry test;
- a chewability from 10.00 N to 1500.00 N in a texturometry test;
- a density from 1.40 g/cm$^3$ to 1.90 g/cm$^3$, in particular from 1.59 g/cm$^3$ to 1.90 g/cm$^3$, in a water displacement test;
- a dry matter content from 20.00% of fibrous or laminated, and textured food product to 40.00% of fibrous or laminated, and textured food product; and
- a fibre density from 40.00% to 90.00%;

wherein said fibres have a thickness from 0.10 mm to 1.00 mm and a length from 1.00 mm to 150.00 mm, the inter-fibre space being from 0.05 mm to 1.00 mm, and wherein the ratio [fibre length to product width] is from 0.03 a.u. to 0.15 a.u., in particular from 0.03 a.u. to 0.13 a.u.

In particular and according to another embodiment, the invention relates to a fibrous or laminated, and textured food product characterized by:

- an anisotropy greater than 1 a.u. in a texturometry test;
- a viscoelasticity tan δ less than 1 a.u. in a rheology test;
- a firmness from 40.00 N to 50.00 N in a texturometry test;
- a water retention capacity from 80.00% to 99.10%, in particular from 80.00% to 90.00%; and
- a resilience from 5.00% to 28.00%, in particular from 5.00% to 25.00% in a texturometry test;
- a cohesion from 0.10 a.u. to 0.70 a.u. in a texturometry test;
- an elasticity from 10.00% to 55.00% in a texturometry test;
- a chewability from 10.00 N to 1500.00 N in a texturometry test;
- a density from 1.40 g/cm$^3$ to 1.90 g/cm$^3$, in particular from 1.59 g/cm$^3$ to 1.90 g/cm$^3$, in a water displacement test;
- a dry matter content (in g of water/100 g of product) from 15% to 39% as measured by a thermobalance; and
- a fibre density from 40.00% to 90.00%;

wherein said fibres have a thickness from 0.10 mm to 1.00 mm and a length from 1.00 mm to 150.00 mm, the inter-fibre space being from 0.05 mm to 1.00 mm, and in which the ratio [fibre length:product width] is from 0.03 a.u. to 0.15 a.u., in particular from 0.03 a.u. to 0.13 a.u.

According to another embodiment, the invention relates to the fibrous or laminated, and textured food product as described above further characterized by a moisture content from 60.00±0.05% to 80.00±0.05%.

"Moisture (or humidity)" means the amount of water present in the product of the invention as measured by a thermobalance. Furthermore, it has to be noted that "moisture content from 60.00±0.05% to 80.00±0.05%" encompasses a moisture content strictly from 60.00% to 80.00%. "Moisture content from 60.00% to 80.00%" means that the moisture content may also be from 60.00% to 70.00%, from 70.00% to 80.00% or from 65.00% to 75.00%. This also means that it can be 60.00%, 65.00%, 70.00%, 75.00% or 80.00%.

According to another embodiment, the invention relates to the fibrous or laminated, and textured food product as described above characterized by:

a. a height of at least 0.5 cm;
b. a thickness of at least 0.5 cm; and
c. a width of at least 0.5 cm.

"Height of at least 0.5 cm" means that the height may be at least 1 cm, at least 2 cm, at least 3 cm, at least 4 cm, at least 5 cm, at least 6 cm, at least 7 cm, at least 8 cm, at least 9 cm, at least 10 cm, at least 11 cm, at least 12 cm, at least 13 cm, at least 14 cm, at least 15 cm, at least 16 cm, at least 17 cm, at least 18 cm, at least 19 cm, at least 20 cm, at least 21 cm, at least 22 cm, at least 23 cm, at least 24 cm, at least 25 cm, at least 26 cm, at least 27 cm, at least 28 cm, at least 29 cm, at least 30 cm, etc. This also means that the height can be from 2 cm to 30 cm, from 6 cm to 15 cm.

"Thickness of at least 0.5 cm" means that the thickness may be at least 1 cm, at least 2 cm, at least 3 cm, at least 4 cm, at least 5 cm, at least 6 cm, at least 7 cm, at least 8 cm, at least 9 cm, at least 10 cm, at least 11 cm, at least 12 cm, at least 13 cm, at least 14 cm, at least 15 cm, at least 16 cm, at least 17 cm, at least 18 cm, at least 19 cm, at least 20 cm, at least 21 cm, at least 22 cm, at least 23 cm, at least 24 cm, at least 25 cm, at least 26 cm, at least 27 cm, at least 28 cm, at least 29 cm, at least 30 cm, etc. This also means that the thickness can be from 5 cm to 15 cm.

"Width of at least 0.5 cm" means that the width may be at least 1 cm, at least 2 cm, at least 3 cm, at least 4 cm, at least 5 cm, at least 6 cm, at least 7 cm, at least 8 cm, at least 9 cm, at least 10 cm, at least 11 cm, at least 12 cm, at least 13 cm, at least 14 cm, at least 15 cm, at least 16 cm, at least 17 cm, at least 18 cm, at least 19 cm, at least 20 cm, at least 21 cm, at least 22 cm, at least 23 cm, at least 24 cm, at least 25 cm, at least 26 cm, at least 27 cm, at least 28 cm, at least 29 cm, at least 30 cm, etc. This also means that the width can be from 5 cm to 30 cm.

As indicated below, the product of the invention is obtained from vegetable proteins. Also, it is understood that another embodiment of the invention is the fibrous or laminated, and textured food product as described above, said fibrous or laminated, and textured food product comprising vegetable proteins.

According to a second aspect, the object of the invention is the use(s) of the fibrous or laminated, and textured food product as described above as an intermediate product which may be used in the manufacture of other more complex products (e.g. ready-made meals, etc.).

According to another embodiment, said more complex products can be the fibrous or laminated, and textured food product as described above, said fibrous or laminated, and textured food product being with coated with a solution of food polymers of plant origin. Consequently, the invention also relates to a fibrous or laminated, textured and coated food product. For illustration purposes, the fibrous or laminated, and textured food product of the invention coated with a second food product may look like a chicken drumstick with a skin.

By "food polymer of plant origin" is meant a solution consisting of plant polysaccharides, plant proteins or mixtures thereof. For example, vegetable polysaccharides may be selected from:

starches;
modified starches;
gums;
alginates; and
carrageenans.

For example, vegetable proteins may be selected from:

soy protein (*Glycine max*);
yellow pea protein (*Pisum sativum*);
chickpea protein (*Cicer arietinum*);
wheat protein (*Triticum aestivum*);
maize protein (*Zea mays*); and
potato protein (*Solanum tuberosum*).

This solution of food polymers of plant origin may be in the form of a liquid, gel or film, in which the plant polymer(s) is/are suspended in water, oil or a mixture of water and oil.

This solution of food polymers of plant origin may consist of less than 60% of its dry mass derived from vegetable polymers. This solution of food polymers of plant origin may also consist of 20% to 100% of its dry mass.

In addition, it is noted that the coating with said solution of food polymers of plant origin can cover from 1% to 100% of the surface of the fibrous or laminated, and textured food product.

In particular, said coating can cover from 20% to 100%, from 40% to 100%, from 60% to 100, from 80% to 100%, from 20% to 80%, from 20% to 60%, from 20% to 40%, or from 40% to 80%.

According to another aspect of the invention, it is the object of the invention to produce a fibrous or laminated, and textured food product from vegetable proteins, or a method for producing said fibrous or laminated, and textured food product as described above from vegetable proteins, comprising at least the following steps:

a. enzymatic treatment of a protein solution comprising from 1% to 30% by weight of plant proteins based on the weight of the protein solution and at least 20% of said plant proteins being soluble in said protein solution;
   by adding an enzyme of the aminoacyltransferase class or the oxidoreductase class, said protein solution with said enzyme added being incubated under conditions which allow said enzyme to catalyze at least one enzymatic reaction to obtain an enzymatically treated protein solution; and
b. freezing said enzymatically treated protein solution under conditions that allow the formation of protein fibres to obtain a fibrous or laminated, textured and frozen food product.

It is important to note that in the context of the invention, the fibrous or laminated, and textured food product (also called the product of the invention) obtained is a meat substitutes, i.e. from vegetable proteins is obtained a product mimicking the characteristics of meat in terms, in particular, of fibre and texture, and whose organoleptic properties can be modified at will (addition of flavourings, addition of fat, etc.). Indeed, the implementation of the method of the invention developed by the inventors is adaptable and has the advantage of allowing the production of small as well as large meat substitutes pieces (e.g. height of 15 cm×thickness of 15 cm×width of 30 cm). The diversity of the products obtained is therefore wide and the malleability (adaptation of the parameters) of the method of the invention advantageously makes it possible to achieve a wide range of textures that are very interesting for industry. Furthermore, and unlike the extrusion method, the implementation of the method of the invention does not involve the use of high temperatures or high pressures. In this way, the vegetable proteins retain a large part of their nutritional qualities and the organoleptic properties of the product of the invention are only improved.

"Protein solution" means an aqueous solution comprising vegetable proteins. This solution may therefore include other ingredients such as salts, etc., as a result of the implementation of the method of the invention (see below). Preferably, this protein solution is not salted, i.e. a salt concentration of 0% by mass with respect to the mass of the protein solution. However, and in the event that this protein solution contains salt, in particular NaCl, due to the chosen protein source, the salt concentration of the protein solution must not exceed 0.85% by mass with respect to the mass of the protein solution. In other words, and in the sense of the invention, the salt concentration of the protein solution is less than 0.85% by mass with respect to the mass of the protein solution. “Less than 0.85%” means that the salt concentration of the protein solution may be less than 0.80%, less than 0.70%, less than 0.60%, less than 0.50%, less than 0.40%, less than 0.30%, less than 0.20%, less than 0.10%, or less than 0.05% by mass, based on the mass of the protein solution. Advantageously, the salt concentration of the protein solution is less than 0.20% or even less than 0.10% by mass, based on the mass of the protein solution.

With regard to the raw material (i.e. plant proteins), it is stated that the starting protein solution comprises from 1% to 30% by mass of plant proteins in relation to the mass of the protein solution. This means that it is possible for the protein solution to comprise from 1% to 25%, from 1% to 20%, from 1% to 15%, from 1% to 10%, from 1% to 10%, from 1% to 5%, from 5% to 30%, from 10% to 30%, from 15% to 30%, from 20% to 30%, from 25% to 30%, from 5% to 25%, or from 10% to 20% by weight of plant proteins based on the weight of the protein solution. This also means that the protein solution may comprise 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, or 30% by weight of vegetable protein based on the weight of the protein solution.

Furthermore, it should be noted that for the purposes of the invention, the term “vegetable protein(s)” is understood to include any protein mixture comprising:

at least 70% protein of plant origin by mass of proteins with a lysine score of 50 to 150 and a glutamine score of 50 to 150 when said enzyme belongs to the class of aminoacyltransferases (e.g. transglutaminase), or with a tyrosine score of 50 to 150 when said enzyme belongs to the class of oxidoreductases (e.g. laccase, tyrosinase and peroxidase); and not more than 30% of other proteins, of plant or non-plant origin, by mass of protein.

In other words, when it is mentioned that the starting protein solution comprises from 1% to 30% by weight of vegetable proteins relative to the weight of the protein solution, this means that the starting protein solution comprises from 1% to 30% by weight of vegetable proteins from a mixture comprising at least 70% of proteins of vegetable origin whose lysine/glutamine/tyrosine scores are those mentioned above and at most 30% of other proteins relative to the weight of the protein solution. In particular, the starting protein solution comprises from 1% to 30% by weight of vegetable proteins from a mixture comprising 83.33% of proteins of vegetable origin whose lysine/glutamine/tyrosine scores are those mentioned above and 16.66% of other proteins with respect to the weight of the protein solution. In particular, the starting protein solution comprises from 1% to 30% by weight of vegetable proteins from a mixture comprising at least 80% of proteins of vegetable origin whose lysine/glutamine/tyrosine scores are those mentioned above and at most 20% of other proteins with respect to the weight of the protein solution. In particular, the starting protein solution comprises from 1% to 30% by weight of vegetable proteins from a mixture comprising 90.91% of proteins of vegetable origin whose lysine/glutamine/tyrosine scores are those mentioned above and 9.09% of other proteins with respect to the weight of the protein solution. In particular, the starting protein solution comprises from 1% to 30% by weight of vegetable proteins from a mixture comprising at least 90% of proteins of vegetable origin whose lysine/glutamine/tyrosine scores are those mentioned above and at most 10% of other proteins with respect to the weight of the protein solution. In particular, the starting protein solution comprises from 1% to 30% by weight of vegetable proteins from a mixture comprising at least 95% of proteins of vegetable origin whose lysine/glutamine/tyrosine scores are those mentioned above and at most 5% of other proteins with respect to the weight of the protein solution. In particular, the starting protein solution comprises from 1% to 30% by weight of vegetable proteins from a mixture comprising 95.24% of proteins of vegetable origin whose lysine/glutamine/tyrosine scores are those mentioned above and 4.76% of other proteins with respect to the weight of the protein solution. In particular, the starting protein solution comprises from 1% to 30% by weight of vegetable proteins from a mixture comprising 100% of proteins of vegetable origin whose lysine/glutamine/tyrosine scores are those mentioned above, relative to the weight of the protein solution.

“Lysine score”, “glutamine score” or “tyrosine score” means the concentration of amino acids in a protein compared to the concentration of the same amino acid in a reference protein (here, the egg protein, i.e. ovalbumin of sequence SEQ ID NO: 1). “Amino acid concentration of a protein” means the quantity of said amino acid relative to the total quantity of amino acids in said protein. For example, whereas ovalbumin of sequence SEQ ID NO: 1 contains 5.18% lysine and brown rice contains 3.8%. The lysine score of brown rice is therefore 73 ([3.8/5.18]×100), which means that it can be from 50 to 125, from 50 to 100, from 50 to 75, from 75 to 150, from 100 to 150, from 125 to 150, from 95 to 105 or from 75 to 125. This means that the score may be 50, 55, 60, 65, 70, 75, 80, 85, 90, 95, 100, 105, 110, 115, 120, 125, 130, 135, 140, 145 or 150. Also and in particular another embodiment of the invention relates to the method as described above, wherein the protein solution comprising from 1% to 30% by weight of vegetable proteins is derived from a mixture comprising:

at least 70% of proteins of plant origin with a lysine score of 75 to 125 (or 95 to 105) and a glutamine score of 75 to 125 (or 95 to 105) when said enzyme belongs to the class of aminoacyltransferases, or with a tyrosine score of 75 to 125 (or 95 to 105) where the enzyme belongs to the class of oxidoreductases; and no more than 30% of other proteins, in relation to the mass of the protein solution.

Also, it is understood that one embodiment of the invention is a method for producing a fibrous or laminated, and textured food product from vegetable proteins, or a method for producing said fibrous or laminated, and textured food product as described above, from vegetable proteins, comprising at least the following steps:

a. enzymatic treatment of a protein solution comprising from 1% to 30% by weight of vegetable proteins from a mixture comprising:

at least 70% of proteins of plant origin with a lysine score of 50 to 150 and a glutamine score of 50 to 150 when said enzyme belongs to the class of aminoacyltransferases and in particular when said enzyme is a transglutaminase, or with a tyrosine score of 50 to 150 when said enzyme belongs to the class of oxidoreductases and in particular when said enzyme is selected from: laccase, tyrosinase and peroxidase; and no more than 30% of other proteins, based on the mass of the protein solution and of which at least 20% of said vegetable proteins are soluble in said protein solution by adding an enzyme of the aminoacyltransferase class or the oxidoreductase class, said protein solution with said enzyme added being incubated under conditions which allow said enzyme to catalyze at least one enzymatic reaction to obtain an enzymatically treated protein solution; and b. freezing said enzymatically treated protein solution under conditions that allow the formation of protein fibres to obtain a fibrous or laminated, textured and frozen food product.

Furthermore, it is specified that at least 20% of said vegetable proteins are soluble, i.e. dissolved in the protein (aqueous) solution. In this respect, the solubility of said plant proteins can be measured by separating the protein solution by centrifugation (at at least 3000 rotations per minute [rpm] for 2 hours [h]), and quantifying the proteins. The solubility of said plant proteins is then defined as the ratio of the amount of plant proteins in the supernatant to the amount of total plant proteins (before separation). Furthermore, it should be noted that "at least 20%" means that at least 25%, at least 30%, at least 35%, at least 40%, at least 45% of said plant proteins are soluble, and preferably at least 50%. The invention therefore also includes all protein solutions based on vegetable proteins in which at least 50%, at least 60%, at least 70%, at least 80%, at least 90% or at least 95% of said vegetable proteins are soluble.

In this respect, and assuming that the protein solution of the invention comprises 1% by weight of vegetable proteins relative to the weight of the protein solution of which at least 20% of said vegetable proteins are soluble, this means that the protein solution of the invention comprises 0.2% by weight of soluble vegetable proteins relative to the weight of the protein solution. Assuming that the protein solution of the invention comprises 30% by weight of vegetable proteins with respect to the weight of the protein solution of which at least 20% of said vegetable proteins are soluble, this means that the protein solution of the invention comprises 6% by weight of soluble vegetable proteins with respect to the weight of the protein solution. It is thus understood that another embodiment of the invention relates to the method as described above, wherein said protein solution comprises at least 0.2 wt. % of soluble plant proteins based on the mass of the protein solution. "At least 0.2%" also means a value of at least 0.5%, at least 1%, at least 2%, at least 3%, at least 4%, at least 5%, at least 6%, at least 7%, at least 8%, at least 9%, at least 10%, at least 15%, at least 20%, at least 25%, at least 30%, at least 35%, at least 40%, at least 45%, at least 50%.

In view of the above, it is also understood that another embodiment of the invention relates to the method as described above, wherein said protein solution comprises from 5% to 25% by weight of plant proteins based on the weight of the protein solution. It is also understood that another embodiment of the invention relates to the method as described above, wherein said protein solution comprises plant proteins of which at least 50% are soluble in said protein solution.

"Enzyme addition" means the addition to the protein solution of proteins (amino acid sequence) whose three-dimensional sequence gives them a catalytic activity capable of carrying out an enzymatic reaction (e.g. formation of peptide bonds between two amino acids). Among those chosen to implement the invention, those belonging to the class of aminoacyltransferases (e.g. transglutaminase) and those belonging to the class of oxidoreductases (e.g. laccase, tyrosinase and peroxidase) are mentioned.

According to another embodiment, the invention thus relates to the method as described above, wherein said enzyme belongs to the class of aminoacyltransferases and is in particular a transglutaminase whose enzymatic activity is described below (Yokoyama K, Nio N, Kikuchi Y. Properties and applications of microbial transglutaminase. Appl Microbiol Biotechnol. 2004 May; 64(4):447-54. doi: 10.1007/s00253-003-1539-5. Epub 2004 Jan. 22. PMID: 14740191.):

Transglutaminase

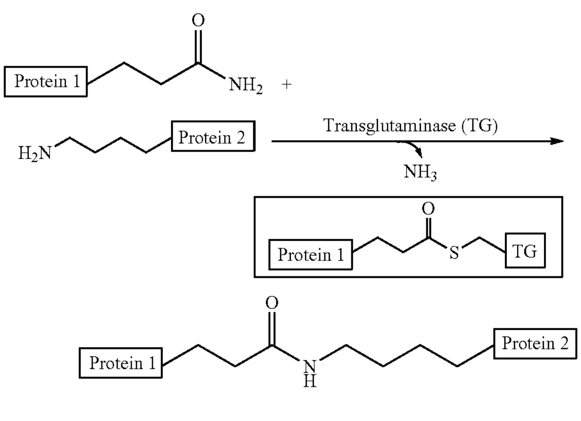

In particular, another embodiment of the invention relates to the method as described above, wherein said enzyme is microbial transglutaminase provided by:

BDF Ingredients as PROBIND® TXo (CAS No. 80146-85-6; Activity 125 U/g enzyme) produced by *Streptomyces mobaraensis* strain DSM 40587 (ATCC 27441) (WO 2009/153751);

AB Enzymes (CAS No. 80146-85-6; Activity of 100 U/g enzyme) produced by *Streptomyces mobaraensis* strain DSM 40587;

Kitchen Innovation as Transglutaminase EB (CAS No. 80146-85-6; Activity 100 U/g enzyme) produced by *Streptomyces mobaraensis* strain DSM 40587; or Ajinomoto as Activa® FV (CAS No. 80146-85-6; 98 U/g enzyme activity) produced by *Streptomyces mobaraensis* strain DSM 40587.

In particular, another embodiment of the invention relates to the method as described above, wherein said enzyme is BDF PROBIND® TXo (WO 2009/153751).

According to another embodiment, the invention thus also relates to the method as described above, wherein said enzyme belongs to the class of oxidoreductases and is particularly selected from laccase, tyrosinase and peroxidase. In particular, another embodiment of the invention relates to the method as described above, wherein said enzyme is selected from laccase, tyrosinase and peroxidase whose enzymatic activity is described below (Heck, T., Faccio, G., Richter, M., Thöny-Meyer, L., 2013. Enzyme-catalyzed protein crosslinking. Appl. Microbiol. Biotechnol. 97, 461-475.https://doi.org/10.1007/s00253-012-4569-z):

Tyrosinase

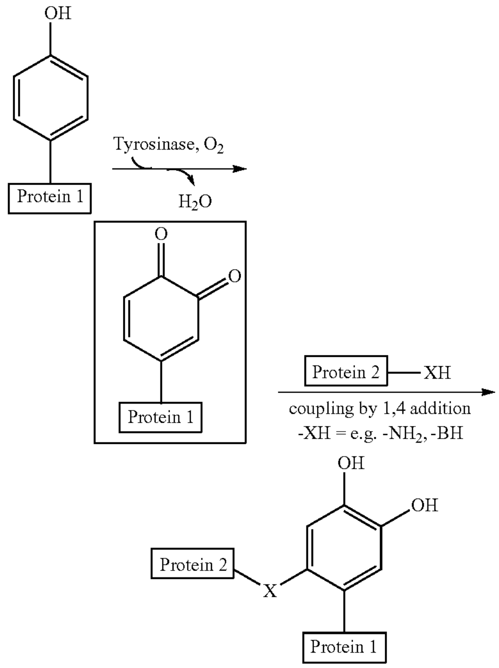

Laccase/Peroxydase

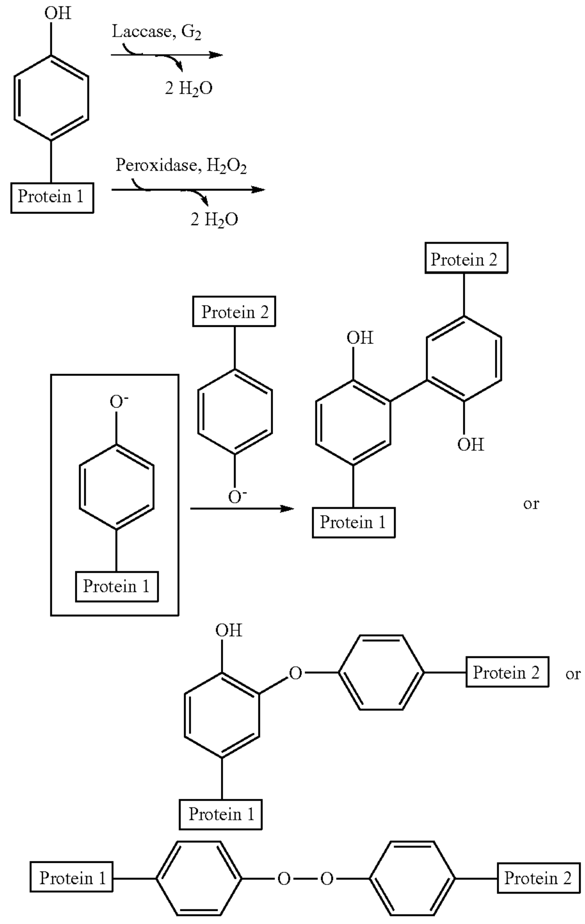

Examples of products being formed by radical coupling

In particular, another embodiment of the invention relates to the method as described above, wherein said enzyme is:

laccase supplied by Merck as Laccase (CAS No. 80498-15-3; Activity 500 U/g enzyme) produced by *Trametes versicolor,* peroxidase supplied by Merck as Peroxidase (CAS No. 9003-99-0; Activity 120,000 U/g enzyme) produced by *Armoracia rusticana*; or Tyrosinase supplied by Sigma-Aldrich as Tyrosinase (CAS No. 9002-10-2; Activity 1,000 U/g enzyme) produced by *Agaricus bisporus.*

In this respect, it is important to note that the incubation conditions of said enzyme to catalyse at least one enzymatic reaction for the purpose of cross-linking said plant proteins. "At least one enzymatic reaction" means a complete reaction which starts with the formation of an enzyme-substrate complex, and ends with the formation of a product from the substrate(s) and the release of the enzyme. "cross-linking said plant proteins" means the formation of protein-protein bonds. These may be strong bonds, such as disulphide bridges and peptide bonds; and/or weak bonds, such as hydrophobic bonds, hydrogen bonds, ionic bonds and Van der Walls forces.

In particular, one embodiment of the invention relates to the method as described above, wherein said conditions allowing said enzyme to catalyze at least one enzymatic reaction are suitable temperature and pH conditions, with or without stirring. For illustrative purposes, suitable [temperature; pH] pairs may be: [50 °C; pH 7] and [40 °C; pH 6]. Similarly, the [temperature; incubation time] pairs, for a pH of e.g. 6 to 7, may be: [30 °C; 120 min], [40 °C; 60 min], [50 °C; 30 min], [60 °C; 15 min].

"Freezing" means that the cross-linked protein solution due to the action of said enzyme is placed under sufficiently cold conditions, which allow the solidification of said enzymatically treated protein solution. For this purpose, a temperature from −110 °C to 0 °C, from −90 °C to −2 °C, from −50 °C to −4 °C or from −20 °C to −5 °C is applied for a sufficient period of time to said enzyme-treated protein solution. In this way, the formation of fibres takes place within said enzymatically treated protein solution, which give it a texture and make it possible to obtain a fibrous or laminated, textured and frozen food product. It should be noted that to obtain the cold conditions of the invention, its implementation requires in particular the use of mechanical, static or ventilated cold technologies; or cryogenic cold technologies (also static or ventilated). It should also be noted that "fibre formation" means that the effect of the cold and thus the solidification of the said enzymatically treated protein solution leads to the appearance of networks of interconnected proteins, which can be oriented if necessary under the effect of the cold. Also and according to another embodiment, the invention has as object the method as described above, wherein said freezing in step b. is carried out under conditions allowing a freezing of at least 95% of said enzymatically treated protein solution, said freezing taking place at a temperature ranging from −110 °C to 0 °C.

"Freezing of at least 95% of the said enzymatically treated protein solution" means that, at the end of the implementation of the method of the invention, it is possible that not all of the enzymatically treated protein solution is frozen. Indeed, assuming that the cold will propagate from the outside to the inside of the enzymatically treated protein solution, it is possible that the core of said enzymatically treated protein solution will not be frozen if step b. does not last long enough. Similarly and assuming directional or even uni-directional freezing, as the cold will propagate from the bottom to the top (or from the top to the bottom) of the enzyme-treated protein solution, it is possible that the top (or the bottom) of said enzyme-treated protein solution will not be frozen if step b. does not last long enough. However, a freezing rate of 95% is necessary and sufficient for the manufacture of the product of the invention. Therefore, “at least 95% freezing of said enzymatically treated protein solution” means at least 96%, at least 97%, at least 98%, at least 99% freezing so as to take this possibility into account.

This being the case and as it is preferable to obtain at the end of the method of the invention a fibrous or laminated, textured and frozen food product that is easily manipulated, another embodiment of the invention concerns the method as described above, wherein said freezing in step b. is carried out under conditions that allow for 100% freezing of said enzymatically treated protein solution.

“A temperature of −110 °C to 0 °C” means that the temperature conditions applied to allow solidification of said enzymatically treated protein solution are −110 °C to 0 °C. In other words, this temperature may be from −100 °C to −5 °C, from −90 °C to −10 °C, from −80 °C to −20 °C, from −70 °C to −30 °C or from −60 °C to −40 °C. In particular, it can be from −50 °C to −2 °C or from −20 °C to −5 °C. This also means that this temperature may be −110 °C, −100 °C, −90 °C, −80 °C, −70 °C, −60 °C, −50 °C, −40 °C, −30 °C, −20 °C, −10 °C, −5 °C, −4 °C, −3 °C, −2 °C, −1 °C or 0 °C. In particular, another embodiment of the invention relates to the method as described above, said freezing taking place at a temperature from −50 °C to −2 °C. In particular, another embodiment of the invention also relates to the method as described above, said freezing taking place at a temperature from −20 °C to −5 °C.

For all intents and purposes, the appropriate [temperature; time] pairs for carrying out this freezing are provided below. These are, for example, [−120 °C; 45 min], [−80 °C; 4 h], [−40 °C; 8 h], [−24 °C; 12 h] and [−5 °C; 24 h].

Also and in view of the above, the object of the invention is the method for producing a fibrous or laminated, and textured food product from vegetable proteins, or a method for producing said fibrous or laminated, and textured food product as described above from vegetable proteins, comprising at least the following steps:

a. enzymatic treatment of a protein solution comprising from 1% to 30% by weight of plant proteins based on the weight of the protein solution and at least 20% of said plant proteins being soluble in said protein solution by adding an enzyme of the aminoacyltransferase class or the oxidoreductase class, said protein solution with said enzyme added being incubated under conditions of temperature from 30 °C to 60 °C and duration from 15 minutes to 120 minutes allowing said enzyme to catalyze at least one enzymatic reaction to obtain an enzymatically treated protein solution; and
b. freezing said enzymatically treated protein solution under conditions of temperature ranging from −120 °C to −5 °C and duration ranging from 15 min to 48 h allowing the formation of protein fibres to obtain a fibrous or laminated, textured and frozen food product.

In view of the above, it is also understood that another embodiment of the invention relates to the method as described above, wherein the protein solution comprising from 1% to 30% by weight of plant proteins is derived from a mixture comprising:

- at least 70% of proteins of plant origin with a lysine score of 50 to 150 and a glutamine score of 50 to 150 when said enzyme belongs to the class of aminoacyltransferases, or
  - with a tyrosine score of 50 to 150 where the enzyme belongs to the class of oxidoreductases; and
- no more than 30% of other proteins.

According to another embodiment, the invention relates to the method as described above, wherein said freezing in step b. is a directional freezing. In particular, another embodiment of the invention relates to the method as described above, wherein said freezing in step b. is a uni-directional freezing.

Directional freezing” means that at least two straight cold fronts move through the enzyme-treated protein solution during freezing of the protein solution. For example, this occurs when the enzyme-treated protein solution is placed without insulation in a cold chamber (such as a freezer or deep freezer) in which the cold is uniformly distributed.

Unidirectional freezing” means that only one cold front moves through the enzymatically treated protein solution during freezing. To achieve this control of the direction of freezing, the means that can be used are known. Indeed, it is possible to do so:

- by controlling the position of the cold source in relation to the sample (e.g. cold plate on which the product is placed or thermostatic bath in which the product is partially immersed);
- by isolating the product in a cold enclosure (such as a freezer or deep freezer) in which the cold is evenly distributed; or
- by any other means allowing control of the direction of the freezing front(s) in the product, such as insulating one or more faces of the product with an insulating material, for example a mould.

According to another embodiment, the object of the invention is the method as described above, which further comprises a preliminary step of preparing from a (vegetable) protein source said protein solution comprising from 1% to 30% by weight of vegetable proteins, or comprising from 1% to 30% by weight of vegetable proteins from a protein mixture comprising:

- at least 70% of proteins of plant origin with a lysine score of 50 to 150 and a glutamine score of 50 to 150 when said enzyme belongs to the class of aminoacyltransferases (e.g. transglutaminase), or
  - with a tyrosine score of 50 to 150 when said enzyme belongs to the class of oxidoreductases (e.g. laccase, tyrosinase and peroxidase); and
- no more than 30% of other proteins, whether or not of plant origin, based on the mass of the protein solution and at least 20% of said vegetable proteins being soluble in said protein solution. In particular, another embodiment of the invention relates to the method as described above, wherein said protein solution comprises from 5% to 25% by weight of vegetable proteins with respect to the weight of the protein solution. In particular, another embodiment of the invention relates to the method as described above, wherein said protein solution comprises vegetable proteins of which at least 50% are soluble in said protein solution. In particular, another embodiment of the invention also relates to the method as described above, wherein said protein solution comprises at least 0.2% by weight of soluble plant proteins based on the weight of the protein solution.

Protein source (vegetable)” means a product such as a flour, concentrate or isolate, which comprises sufficiently concentrated proteins to enable the protein solution of the invention to be prepared at the desired protein concentration. "Flour" means a powder resulting from the grinding and/or pressing of vegetable products, generally composed mainly of proteins (the concentration of which generally does not exceed 60% by mass of proteins in relation to the total mass of the powder) and sugars (simple and complex sugars, including starch).

"Concentrate" means a powder obtained after extraction of the oil and complex sugars that is finer (granule size<50 μm) than that used to obtain a flour. Its final protein concentration is generally around 55% to 65% by weight of protein in relation to the total weight of the powder.

"Isolate" means a powder obtained after various extraction stages which have optimised the extraction of oil and sugars, in order to further concentrate the powder in proteins. Its protein concentration is generally around 80-90% by weight of protein in relation to the total weight of the powder.

It should also be noted that the flour, concentrate or isolate in powder form may contain salt in the dry matter, in addition to the proteins and any other components (simple carbohydrates, lipid residues). Also, once in solution, the protein solution obtained can be considered as a "salted" protein solution which must be dialysed in order to obtain the said (non-salted) protein solution as defined above, i.e. with a salt concentration of less than 0.85% by mass in relation to the mass of the protein solution. For this purpose, for example, dialysis baths containing distilled water (conductivity s 0.001 mS/cm, which can be measured with the pHenomenal® CO 3100L from VWR) are prepared. A protein solution is also prepared after dispersing the flour, concentrate or isolate in distilled water. This is then poured into dialysis pellets (e.g. Spectra/Por, produced by Spectrum) with a cut-off below 5 kDa, 3 kDa or 1 kDa. The dialysis pellets are then placed in the dialysis baths, which lasts for 48 hours, with the dialysis baths being changed at least three times during the 48 hours. "Renewal of the dialysis baths" means the removal of the dialysis pellets from the bath in order to empty it and refill it with distilled water, before the dialysis pellets are put back in. For better efficiency, the dialysis baths can be agitated (500 rpm) using a magnetic stirrer and a magnet bar. At the end of the dialysis, a conductivity of less than 10 mS/cm may indicate that the protein solution is salt-free (i.e. salt concentration of less than 0.85% by mass in relation to the mass of the protein solution) and the conductivity is due to the protein alone.

In view of the above, it is understood that protein sources are distinguished between those of plant origin (i.e. at least 70% of the blend) allowing the previously established lysine/glutamine/tyrosine scores to be met and those of plant or non-plant origin (i.e. at most 30% of the blend).

In this respect, the sources for obtaining plant proteins with lysine/glutamine/tyrosine scores as described in the invention (i.e. at least 70% of the mixture) belong to plants selected from: almond (*Prunus dulcis*), spiked amaranth (*Amaranthus cruetus*), *hypochondriacus* amaranth (*Amaranthus hypochondriacus*), fox-tail amaranth (*Amaranthus caudatus*), peanut (*Arachis hypogaea*), avocado (*Persea americana*), oat (*Avena sativa*), spelt (*Triticum spelta*), spinach (*Spinacia oleracea*), *faba* bean (*Vicia faba*), fig (*Figus carica*), cottonseed (*Gossypium hirsutum*), sesame seed (*Sesamum indicum*), sunflower seed (*Helianthus annuus*), winged bean (*Psophocarpus tetragonolobus*), common bean (*Phaseolus vulgaris*) lima bean (*Phaseolus lunatus*), mung bean (*Vigna radiata*), green bean (*Phaseolus vulgaris*), lentil (*Lens culinaris*), flax (*Linum usitatissimum*), white lupin (*Lupinus albus*), blue lupin (*Lupinus angustifolius*), changeable lupin (*Lupinus mutabilis*), yellow lupin (*Lupinus luteus*) cassava (*Manihot esculenta*), cowpea (*Vigna unguiculata*), cashew (*Anacardium occidentale*), coconut (*Cocos nucifera*), pecan (*Carya illinoinensis*), brazil nut (*Bertholletia excelsa*), barley (*Hordeum vulgare*), sweet potato (*Ipomoea batatas*), pistachio (*Pistacia vera* L.), pea (*Pisum sativum*), Bambara pea (*Vigna subterranea*), chickpea (*Cicer arietinum*), pigeon pea (*Cajanus cajan*), Maram pea (*Tylosema esculentum*), potato (*Solanum tuberosum*), rice (*Oryza sativa*), buckwheat (*Fagopyrum esculentum*), rye (*Secale cereale* L.), soybeans (*Glycine max*) and mixtures thereof. "Their mixtures", means in the sense of the invention that the starting protein solution can be obtained from a mixture of vegetable proteins such as a mixture of soya proteins and pea proteins (e.g. ratio pea:soya=50:50) or a mixture of rice proteins and pea proteins (e.g. ratio pea:rice=80:20).

As for the sources allowing to obtain other proteins (i.e. at most 30% of the mixture) whose lysine/glutamine/tyrosine scores are not those of the invention, these may be of plant origin but also of animal origin or even from their mixture (i.e. plant and animal source). Interestingly, such sources include:

- other plant sources, such as wheat (*Triticum aestivum*), oilseed rape (*Brassica napus* subsp. *napus*), sunflower (*Helianthus annuus*), fungus (*Trigonella foenum-graecum*), sorghum (*Sorghum bicolor*), tomato (*Solanum lycopersicum* L.), etc.;
- algae, such as spirulina (*Arthrospira*), *chlorella* (*Chlorella*), wakame (*Undaria pinnatifida*);
- Mushrooms, such as the Maitake (*Grifola frondosa*) and the button mushroom (*Agaricus bisporus*);
- vegetable proteins such as gluten;
- insects, such as the mealworm (*Tenebrio molitor*) and the house cricket (*Acheta domesticus*); and
- animal proteins, such as egg protein (ovalbumin) or milk protein (whey), or bovine serum albumin (BSA).

With regard to the possible mixtures in this maximum of 30% other proteins, there may be, for example, 50% proteins of plant origin (plant, mushroom, alga) and 50% proteins of animal origin, 75% proteins of plant origin (plant, mushroom, alga) and 25% proteins of animal origin, 25% protein of plant (plant, mushroom, alga) origin and 75% protein of animal origin, 90% protein of plant (plant, mushroom, alga) origin and 10% protein of animal origin, or 10% protein of plant (plant, mushroom, alga) origin and 90% protein of animal origin.

In view of the above, it is understood that another embodiment of the invention relates to the method as described above, wherein said (vegetable) protein source (whose lysine/glutamine/tyrosine scores are those of the invention) comprises proteins of vegetable origin selected from those of almond (*Prunus dulcis*), spiked amaranth (*Amaranthus cruetus*), amaranth (*Amaranthus hypochondriacus*), fox-tail amaranth (*Amaranthus caudatus*), peanut (*Arachis hypogaea*), avocado (*Persea americana*), oats (*Avena sativa*), spelt (*Triticum spelta*), spinach (*Spinacia oleracea*), faba bean (*Vicia faba*), fig (*Figus carica*), cottonseed (*Gossypium hirsutum*), sesame seed (*Sesamum indicum*), sunflower seed (*Helianthus annuus*), winged bean (*Psophocarpus tetragonolobus*), common bean (*Phaseolus vulgaris*), lima bean (*Phaseolus lunatus*), mung bean (*Vigna radiata*), green bean (*Phaseolus vulgaris*), lentil (*Lens culinaris*), flax (*Linum usitatissimum*), white lupin (*Lupinus albus*), blue lupin (*Lupinus angustifolius*) changeable lupin (*Lupinus mutabilis*), yellow lupin (*Lupinus luteus*), cassava (*Manihot esculenta*), cowpea (*Vigna unguiculata*), cashew (*Anacardium occidentale*), coconut (*Cocos nucifera*), pecan (*Carya illinoinensis*), brazil nut (*Bertholletia excelsa*), barley (*Hordeum vulgare*), sweet potato (*Ipomoea batatas*), pistachio (*Pistacia vera* L.), pea (*Pisum sativum*), Bambara pea (*Vigna subterranea*), chickpea (*Cicer arietinum*), pigeon pea (*Cajanus cajan*), Maram pea (*Tylosema esculentum*), potato (*Solanum tuberosum*), rice (*Oryza sativa*), buckwheat (*Fagopyrum esculentum*), rye (*Secale cereale* L.), soybean (*Glycine max*) and their mixtures.

In particular, another embodiment of the invention relates to the method as described above, wherein said (vegetable) protein source (whose lysine/glutamine/tyrosine scores are those of the invention) comprises vegetable proteins selected from those of oats (*Avena sativa*) beans (*Vicia faba*), lentils (*Lens culinaris*), flax (*Linum usitatissimum*), peas (*Pisum sativum*), chickpeas (*Cicer arietinum*), potatoes (*Solanum tuberosum*), rice (*Oryza sativa*), soybeans (*Glycine max*) and mixtures thereof. In particular, another embodiment of the invention also relates to the method as described above, wherein said (vegetable) protein source (whose lysine/glutamine/tyrosine scores are those of the invention) comprises vegetable proteins selected from those of pea (*Pisum sativum*), potato (*Solanum tuberosum*), rice (*Oryza sativa*), soybean (*Glycine max*) and mixtures thereof.

According to another embodiment, the invention relates to the method as described above, wherein said preliminary step further comprises a step of mixing said protein solution with a salted solution comprising:

- NaCl; and/or
- KCl; and/or
- an alkaline earth salt selected from $CaCl_2$, $BeCl_2$, $MgCl_2$, $BaCl_2$ and mixtures thereof, to obtain a salted protein solution.

Insofar as the chosen vegetable protein source may contain one or more salts, in particular NaCl (cf. Examples), it is important to note that "salted protein solution" means a salted protein solution whose salt concentration comes from at least one external addition of salt(s). Indeed, as mentioned above, obtaining the salted protein solution requires a step of mixing the protein solution with at least one salted solution. Also "salted protein solution" means a solution whose salt concentration, in particular the NaCl concentration, is at least 0.85% by mass in relation to the mass of the salted protein solution. "At least 0.85%" means that this salt concentration may be at least 1%, at least 1.5%, at least 2%, at least 2.5%; at least 3%, at least 3.5%, at least 4%, at least 4.5% or at least 5% by weight, based on the weight of the salted protein solution.

"Alkaline earth salt selected from $CaCl_2$, $BeCl_2$, $MgCl_2$, $BaCl_2$ and mixtures thereof", means that this characteristic refers both to $CaCl_2$ as such, $BeCl_2$ as such, $MgCl_2$ as such and $BaCl_2$ as such, and to a mixture of at least 2, at least 3 or even 4 of these alkaline earth salts. Also and "their mixtures" means, for example:

- the mixture $CaCl_2$ and $BeCl_2$, the mixture $BeCl_2$ and $BaCl_2$, the mixture $CaCl_2$ and $MgCl_2$, etc.;
- the mixture $CaCl_2$, $BeCl_2$ and $MgCl_2$, the mixture $CaCl_2$, $BeCl_2$ and $BaCl_2$, etc.; and
- the mixture $CaCl_2$, $BeCl_2$, $MgCl_2$ and $BaCl_2$.

Furthermore, the expression "and/or" means that the various salts mentioned can be combined with each other and added to the protein solution. For this purpose, it is possible to add them to the protein solution:

- either one by one from separate salted solutions;
- or in one go from a salted solution comprising the mixture of the selected salts, itself prepared from a mixture of separate salted solutions.

It is also possible to add the solid salts (i.e. powder) directly to the protein solution and homogenise it so as to dissolve the added salts. Within the meaning of the invention, the step of mixing the said protein solution with a salted solution may therefore comprise the addition of one, two, three, four, five, etc. distinct salt compositions (or distinct solid salts). It should be noted that NaCl, and/or KCl, and/or $CaCl_2$, and/or $MgCl_2$ are advantageously used.

It should also be noted that another embodiment of the invention relates to the method as described above, wherein:

- the NaCl salt concentration in said salt protein solution is from greater than 0 mol/L to 1.0 mol/L; and/or
- the KCl salt concentration in said salt protein solution is from greater than 0 mol/L to 1.0 mol/L; and/or
- the salt concentration of alkaline earth salt in said salt protein solution is from a concentration of more than 0 mol/L to 1.0 mol/L.

This means that the salts can be dissolved in the salted solution before it is added to the protein solution. It also means that the salts are dissolved in the resulting salted protein solution.

Concentration greater than 0 mol/L to 1.0 mol/L" also means that the salt concentration can be from 0.2 mol/L to 1.0 mol/L, from 0.4 mol/L to 1.0 mol/L, from 0.6 mol/L to 1.0 mol/L, from 0.8 mol/L to 1.0 mol/L, from 0.2 mol/L to 0.8 mol/L, from 0.2 mol/L to 0.6 mol/L, from 0.2 mol/L to 0.4 mol/L, from 0.4 mol/L to 0.8 mol/L, a concentration of more than 0 mol/L to 0.8 mol/L, a concentration of more than 0 mol/L to 0.6 mol/L, a concentration of more than 0 mol/L to 0.4 mol/L or a concentration of more than 0 mol/L to 0.2 mol/L. Also and in particular, another embodiment of the invention relates to the method as described above, wherein:

- the NaCl salt concentration in said salt protein solution is from greater than 0 mol/L to 0.6 mol/L; and/or
- the KCl salt concentration in said salt protein solution is from greater than 0 mol/L to 0.6 mol/L; and/or
- the salt concentration of alkaline earth salt in said salt protein solution ranges from a concentration of more than 0 mol/L to 0.6 mol/L.

In order to improve the organoleptic properties of the fibrous or laminated, textured product of the invention, it is possible to add flavour enhancers at this stage or at the so-called hydration stage (see below). These flavour enhancers can be chosen from: flavourings, spices, sugars, salts, ferments, yeasts, fats and mixtures thereof. In addition to these flavour enhancers, it is also possible to add other ingredients and food additives (colourings, source of micronutrients, etc.). However, all these ingredients (i.e. flavour enhancers, food additives, etc.) must be added in proportions that do not inhibit fibre formation.

As mentioned above, the method of the invention can be completed by a step of hydrating the vegetable proteins, which is carried out at the time of the preparation of the protein solution of the invention (i.e. that comprising from 1% to 30% by mass of vegetable proteins with respect to the mass of the protein solution and of which at least 20% of said vegetable proteins are soluble in said protein solution). This step of hydrating the vegetable proteins ensures that the source of vegetable proteins (isolate, concentrate, etc.) is well dispersed in water, and that said vegetable proteins are well bound to water (i.e. well solubilized) and well adapted to the salinity of the aqueous medium (if salts are added).

According to another embodiment, it is thus understood that the invention relates to the method as described above, wherein said preliminary step further comprises a step of hydrating said vegetable proteins for a duration of at least one minute. In particular, the invention relates to the method as described above, wherein said step of hydrating said vegetable proteins is performed by stirring. In particular, the invention also relates to the method as described above, wherein said step of hydrating said vegetable proteins is performed for a duration of at least 30 minutes.

According to another embodiment, the object of the invention is the method as described above, which further comprises between the previous step and step a. a step of heating said protein solution under conditions allowing said plant proteins to present the substrate site(s) of said enzyme. For the purposes of the invention, the purpose of this heating step is to facilitate the access of the enzyme which is then to be added to the protein solution of the invention to its substrate site(s). Indeed, the effect of heat over a certain period of time allows for further unfolding/denaturing of said plant proteins so that the substrate sites are available and usable by said enzyme. Also "substrate site(s)" means the region(s) of a protein which constitutes the region(s) on which a given enzyme is able to perform its catalytic activity. These are therefore amino acid(s) capable of forming temporary bonds with the active site of the enzyme. In particular, it is therefore an object of the invention to carry out the method as described above, wherein said conditions allowing said plant proteins to present the substrate site(s) of said enzyme are appropriate time and temperature conditions.

For all intents and purposes, the appropriate [temperature; time] pairs for carrying out this heating step are provided below. These are: [75 °C; 25 min], [80 °C; 20 min], [85 °C; 15 min], [90 °C; 10 min] and [95 °C; 5 min].

According to another embodiment, the object of the invention is the method as described above, wherein the amount of enzyme added in step a. is from 0.001% to 1.0% by weight of enzyme based on the weight of the protein solution. «From 0.001% to 1.0%», means that the amount of enzyme added may be comprised from 0.01% to 1.0%, from 0.1% to 1.0%, from 0.01% to 0.5%, from 0.1% to 0.5%, from 0.5% to 1.0%, from 0.01% to 0.2%, from 0.1% to 0.2%, from 0.01% to 0.3% or from 0.1% to 0.3% by weight of enzyme based on the weight of the protein solution. This also means that this amount of enzyme can be 0.01%, 0.05%, 0.1%, 0.11%, 0.12%, 0.13%, 0.14%, 0.15%, 0.16%, 0.18%, 0.19%, 0.20%, 0.21%, 0.22%, 0.23%, 0.24%, 0.25%, 0.26 0.27%, 0.28%, 0.29%, 0.30%, 0.35%, 0.40%, 0.45%, 0.50%, 0.55%, 0.60%, 0.65%, 0.70%, 0.75%, 0.80%, 0.85%, 0.90%, 0.95% or 1.0% by weight of enzyme, based on the weight of the protein solution. In particular, the invention thus relates to the method as described above, wherein the amount of enzyme added in step a. is:

- 0.01% to 1.0%;
- 0.1% to 1.0%;
- 0.1% to 0.5%; or
- 0.5 to 1.0%, by mass of enzyme relative to the mass of the protein solution. Alternatively, and according to another embodiment, the invention relates to the method as described above, wherein the amount of enzyme added in step a. is from 0.001 U/g protein to 3.0 U/g protein. "From 0.001 U/g protein to 3.0 U/g protein" means that the amount of enzyme added can be from 0.01 U/g protein to 3.0 U/g protein, from 0.1 U/g protein to 3.0 U/g protein, from 0.1 U/g protein to 1.0 U/g protein, from 0.001 U/g protein to 1.0 U/g protein or from 1.0 U/g protein to 2.0 U/g protein. This also means that this amount of enzyme can be 0.001 U/g protein, 0.01 U/g protein, 0.1 U/g protein, 0.8 U/g protein, 1.7 U/g protein, 2.5 U/g protein or 3.0 U/g protein. In particular and when the enzyme is a transglutaminase, this amount of added enzyme is from 0.01 U/g protein to 1.7 U/g protein. In particular and when the enzyme is selected from: a laccase, a peroxidase and a tyrosinase, this amount of added enzyme is 0.8 U/g protein. Furthermore, and in addition to the information previously provided, the following pairs of [enzyme concentration; incubation time] are cited for illustration purposes to ensure that the enzyme functions (with or without agitation): [0.001 U/g of protein; 180 minutes], [0.01 U/g of protein; 150 minutes], [0.05 U/g of protein; 100 minutes], [0.1 U/g of protein; 50 minutes], [1 U/g of protein; 10 minutes], [3 U/g of protein; 1 minute].

According to another embodiment, the object of the invention is the method as described above, which further comprises between steps a. and b. a step i) of mixing said enzymatically treated protein solution with a salted solution comprising:

- an alkaline earth salt selected from $CaCl_2$, $BeCl_2$, $MgCl_2$, $BaCl_2$ and mixtures thereof; and/or
- of KCl, to obtain an enzymatically treated and salted protein solution.

Insofar as the chosen vegetable protein source may contain one or more salts, in particular NaCl (cf. Examples), it is important to note that "enzymatically treated and salted protein solution" means a salted protein solution whose salt concentration comes from at least one external addition of salt(s). Indeed, as mentioned above, obtaining the enzymatically treated and salted protein solution requires a step of mixing the protein solution with at least one salted solution. Also, "enzymatically treated and salted protein solution" means a solution whose saline concentration, in particular the NaCl concentration, is at least 0.85% by mass with respect to the mass of the salted protein solution. "At least 0.85%" means that this salt concentration may be at least 1%, at least 1.5%, at least 2%, at least 2.5%; at least 3%, at least 3.5%, at least 4%, at least 4.5% or at least 5% by weight, based on the weight of the enzymatically treated and salted protein solution.

As mentioned above, "alkaline earth salt selected from $CaCl_2$, $BeCl_2$, $MgCl_2$, $BaCl_2$ and mixtures thereof", means that this characteristic refers both to $CaCl_2$ as such, $BeCl_2$ as such, $MgCl_2$ as such and $BaCl_2$ as such, and to a mixture of at least 2, at least 3 or even 4 of these alkaline earth salts. Also "their mixtures", means, for example:

- the mixture $CaCl_2$ and $BeCl_2$, the mixture $BeCl_2$ and $BaCl_2$, the mixture $CaCl_2$ and $MgCl_2$, etc.;
- the mixture $CaCl_2$, $BeCl_2$ and $MgCl_2$, the mixture CaCl2, $BeCl_2$ and $BaCl_2$, etc.; and
- the mixture $CaCl_2$, $BeCl_2$, $MgCl_2$ and $BaCl_2$.

Furthermore, the expression "and/or" means that the various salts mentioned can be combined with each other and added to the protein solution. For this purpose, it is possible to add them to the protein solution:

- either one by one from separate salted solutions;
- or in one go from a salted solution comprising the mixture of the selected salts, itself prepared from a mixture of separate salted solutions.

It is also possible to add the solid salts (i.e. powder) directly to the protein solution and homogenize it so as to dissolve the added salts. Within the meaning of the invention, the step of mixing the said protein solution with a salted solution may therefore comprise the addition of one, two, three, four, five, etc. distinct salted compositions (or distinct solid salts). It should be noted that NaCl, and/or KCl, and/or $CaCl_2$, and/or $MgCl_2$ are advantageously used.

"Concentration greater than 0 mol/L to 1.0 mol/L" means the same definition as that previously provided (cf. supra). Also and in particular, another embodiment of the invention relates to the method as described above, wherein:

- the salt concentration of alkaline earth salt in said enzymatically treated and salted protein solution is from a concentration of more than 0 mol/L to 1.0 mol/L; and/or
- the salt concentration of KCl in said enzymatically treated and salted protein solution is in the range of more than 0 mol/L to 1.0 mol/L.

This means that the salts can be dissolved in the salted solution before it is added to the enzymatically treated protein solution. It also means that the salts are dissolved in the resulting enzymatically treated and salted protein solution.

In particular, another embodiment of the invention also relates to the method as described above, wherein:

- the salt concentration of alkaline earth salt in said enzymatically treated and salted protein solution is from a concentration of more than 0 mol/L to 0.6 mol/L; and/or
- the salt concentration of KCl in said enzymatically treated and salted protein solution is in the range of more than 0 mol/L to 0.6 mol/L.

Advantageously, the addition of said salted solution in step i) is carried out at a temperature of 1 °C to 75 °C or 40 °C to 50 °C, i.e. potentially the working temperature of the enzyme, the addition being carried out after the incubation thereof for a determined time. Therefore, it is understood that in another embodiment, the invention is about the method as described above, wherein said mixing is carried out at a temperature from 1 °C to 75 °C or from 40 °C to 50 °C "Temperature of 1 °C to 75 °C" means that the temperature may be from 5 °C to 70 °C, from 10 °C to 60 °C, from 20 °C to 50 °C, from 30 °C to 40 °C, from 50 °C to 75 °C, from 50 °C to 60 °C, from 5 °C to 50 °C, from 25 °C to 50 °C, as well as 1 °C, 5 °C, 10 °C, 15 °C, 20 °C, 25 °C, 30 °C, 35 °C, 40 °C, 45 °C, 50 °C, 55 °C, 60 °C, 65 °C, 70 °C or 75 °C. The term "from 40 °C to 50 °C means that the temperature may be from 40 °C to 48 °C, from 40 °C to 46 °C, from 40 °C to 44 °C, from 40 °C to 42 °C, from 42 °C to 50 °C, from 44 °C to 50 °C, from 46 °C to 50 °C, from 48 °C to 50 °C, as well as 40 °C, 41 °C, 42 °C, 43 °C, 44 °C, 45 °C, 46 °C, 47 °C, 48 °C, 49 °C or 50 °C.

According to another embodiment, the object of the invention is the method as described above, which further comprises before step b. a step ii) of mixing said enzymatically treated protein solution with an acid solution to obtain an enzymatically treated and acidified protein solution.

"Acidic solution" means an aqueous solution capable of lowering the pH of the enzymatically treated protein solution to a pH from 4.0 to 8.0. For this purpose, organic acids or their salts, lemon juice, glucono-δ-lactone, etc. can be used. Therefore, it is understood that another embodiment of the invention relates to the method as described above, wherein said acidic solution is selected from:

- organic acids, such as citric acid, ascorbic acid, folic acid, lactic acid or malic acid, etc, and their salts, such as sodium citrate, potassium citrate, etc. or ascorbate salts, etc.;
- lemon juice;
- glucono-δ-lactone;
- products of microbial fermentation;
- gluconic acid;
- hydrochloric acid; and
- acetic acid.

In particular, one embodiment of the invention relates to the method as described above, wherein said acid solution is selected from:

- organic acids selected from citric acid, ascorbic acid, folic acid, lactic acid and malic acid, and their salts selected from: sodium citrate, potassium citrate and ascorbate salts;
- lemon juice;
- glucono-δ-lactone;
- products of microbial fermentation;
- gluconic acid;
- hydrochloric acid; and
- acetic acid.

In particular, another embodiment of the invention relates to the method as described above, wherein said acid solution is selected from: citric acid, lemon juice and glucono-δ-lactone.

"pH from 4.0 to 8.0" means that the pH of the enzymatically treated and acidified protein solution may be from 4.0 to 7.5, from 4.0 to 7.0, from 4.0 to 6.5, from 4.0 to 6.0, from 4.0 to 5.5, from 4.0 to 5.0, from 4.0 to 4.5, from 4.5 to 8.0, from 5.0 to 8.0, from 5.5 to 8.0, from 6.0 to 8.0, from 5.5 to 8.0, from 7.0 to 8.0, from 7.5 to 8.0, from 4.5 to 6.5, from 5.0 to 6.5, from 5.5 to 6.5, from 5.0 to 6.0 or from 5.5 to 5.8. This also means that this pH can be 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9 or 8.0. Therefore, it is understood that another embodiment of the invention is the method as described above, wherein said pH of said enzymatically treated and acidified protein solution is from 4.0 to 8.0, from 6.0 to 8.0 or from 4.0 to 6.0.

In particular, another embodiment of the invention relates to the method as described above, wherein said pH of said enzymatically treated and acidified protein solution is from 6.5 to 6.5, from 5.0 to 6.5, from 5.5 to 6.5, from 5.0 to 6.0 or from 5.5 to 5.8.

Advantageously, the addition of said acidic solution in step ii) is carried out at a temperature ranging from 0 °C to 30 °C. Therefore, it is understood that in another embodiment, the invention is about the method as described above, wherein said mixing is carried out at a temperature from 0 °C to 30 °C. "Temperature from 0 °C to 30 °C" means that the temperature may be from 5 °C to 30 °C, from 10 °C to 30 °C, from 15 °C to 30 °C, from 20 °C to 30 °C, from 25 °C to 30 °C, from 0 °C to 25 °C, from 0 °C to 20 °C, from 0 °C to 15 °C, from 0 °C to 10 °C, from 0 °C to 5 °C This also means that this temperature can be 0 °C, 1 °C, 2 °C, 3 °C, 4 °C, 5 °C, 6 °C, 7 °C, 8 °C, 9 °C, 10 °C, 11 °C, 12 °C, 13 °C, 14 °C, 15 °C, 16 °C, 17 °C, 18 °C, 19 °C, 20 °C, 21 °C, 22 °C, 23 °C, 24 °C, 25 °C, 26 °C, 27 °C, 28 °C, 29 °C or 30 °C.

In particular, another embodiment of the invention relates to the method as described above, wherein said mixing is carried out at a temperature from 5 °C to 25 °C, preferably at room temperature which is from 20 °C to 24 °C.

According to another embodiment, the invention relates to the method as described above, which further comprises after step b. a step c. of precooking said fibrous or laminated, textured and frozen food product under conditions allowing to denature the enzyme to obtain a fibrous or laminated, textured and precooked food product. In particular, one embodiment relates to the method as described above, wherein said conditions for denaturing the enzyme are selected from:

appropriate time and pressure conditions, e.g. treatment at 600 MPa at 40 °C for 30-60 minutes or treatment at 0.1 MPa at 80 °C for 2 minutes (Menéndez, O., Rawel, H., Schwarzenbolz, U., & Henle, T. (2006). *Structural changes of microbial transglutaminase during thermal and high-pressure treatment*. Journal of agricultural and food chemistry, 54(5), 1716-1721;

appropriate time and ultraviolet (UV) conditions, e.g. imposition of 2537-A ultraviolet light for 10 minutes (Grist, K. L., Taylor, T., & Augenstein, L. (1965). The Inactivation of Enzymes by Ultraviolet Light. V. The Disruption of Specific Cystines in Ribonuclease The Inactivation of Enzymes by Ultraviolet Light. V. The Disruption of Specific Cystines in Ribonuclease. Radiation Research, 26(2), 198-210; McLaren, A. D., & Luse, R. A. (1961). Mechanism of Inactivation of Enzyme Proteins by Ultraviolet Light. *Science,* 134, 836-836);

appropriate salinity conditions, e.g. the addition of 2% by weight of copper sulphate $CuSO_4$ or iron (II) sulphate $FeSO_4$ (Butler, J. A. v, & Robins, A. B. (1963). Effects of Certain Metal Salts on the Inactivation of Solid Trypsin by Ionizing Radiation. *Radiation Research,* 19(4), 582-592); or for example the addition of 5 mol/NaCl (Braham, S. A., Siar, E. H., Arana-Peña, S., Carballares, D., Morellon-Sterling, R., Bavandi, H., de Andrades, D., Kornecki, J. F., & Fernandez-Lafuente, R. (2021). Effect of concentrated salted solutions on the stability of immobilized enzymes: Influence of inactivation conditions and immobilization protocol. *Molecules,* 26(4));

appropriate acidity conditions; for example, a pH of 3 or less of the medium causes inactivation of the microbial transglutaminase (Langston, J., Blinkovsky, A., Byun, T., Terribilini, M., Ransbarger, D., and Xu, F.2007. Substrate specificity of *Streptomyces* transglutaminases. Appl Biochem Biotechnol 136, 291-308);

appropriate time, temperature and ultrasound conditions; for example with ultrasound characterized by a frequency of 20 kHz, a wave amplitude of 120 μm, applied for 102.3 seconds at a medium temperature of 61 °C and 75.5 °C (Villamiel, M., & de Jong, P. (2000). Influence of high-intensity ultrasound and heat treatment in continuous flow on fat, proteins and native enzymes of milk. Journal of Agricultural and Food Chemistry, 48, 472-478); and appropriate time and temperature conditions, e.g. heating to 100 °C for 5 minutes deactivates the enzyme (Chen, Z., Shi, X., Xu, J., Du, Y., Yao, M., & Guo, S. (2016). *Gel properties of SPI modified by enzymatic cross-linking during frozen storage*. Food Hydrocolloids, 56, 445-452.).

In particular, it is also the case of the method as described above, wherein said conditions for denaturing the enzyme are appropriate time and temperature conditions. For example and according to another embodiment, the invention relates to the method as described above, wherein said pre-cooking step c. is carried out in such a way that the temperature at any point of said fibrous or laminated, textured and frozen food product is comprised from 70 °C or 250 °C for a time comprised from 15 minutes or 180 minutes. Among the possible [temperature; duration] couples are also provided as examples: [120 °C; 120 min], [180 °C; 60 min], [200 °C; 45 min] and [220 °C; 30 min]. It should be noted that this pre-cooking step offers the advantage, if necessary, of reducing the bacterial load and/or reducing the amount of water present in the product of the invention. By way of example, this pre-cooking may cause up to 20% or even 40% of water to be lost in relation to the mass of the product of the invention.

In view of the above, it is understood that one embodiment of the invention relates to the method as described above, which further comprises after step b. a step c. of precooking said fibrous or laminated, textured and frozen food product under conditions to denature the enzyme to obtain a fibrous or laminated, textured and precooked food product, in particular temperature conditions ranging from 70 °C to 250 °C and duration ranging from 15 minutes to 180 minutes.

According to another embodiment, the object of the invention is the method as described above, which further comprises after step c. a step d. of freezing or deep-freezing said fibrous or laminated, textured and precooked food product. "Freezing" and "deep-freezing" mean the techniques known in the prior art, which make it possible to freeze or deep-freeze a product of interest.

Previously, it has been mentioned that the implementation of the method of the invention is adaptable and has the advantage of allowing the production of both small and large meat substitutes pieces. In this respect and according to another embodiment, the invention relates to the method as described above, wherein said fibrous or laminated, textured and frozen food product obtained at the end of step b. has:

a. a height of at least 0.5 cm;
b. a thickness of at least 0.5 cm; and
c. a width of at least 0.5 cm.

In any event, it should be noted that the various embodiments of the invention described above are interdependent. They may therefore be combined with each other to obtain preferred embodiments of the invention not explicitly described. This is also true for all the definitions provided in this description, which apply to all aspects of the invention and its embodiments. This being the case, some possible combinations are described below in order to illustrate the potential of the invention.

According to another embodiment, the invention relates to a method for producing a fibrous or laminated, and textured food product from vegetable proteins, or a method for producing said fibrous or laminated, and textured food product as described above from vegetable proteins, or a method for producing said fibrous or laminated, and textured food product as described above from vegetable proteins, comprising at least the following steps:

a. preparing from a vegetable protein source of a protein solution comprising from 1% to 30% by mass of vegetable proteins relative to the mass of the protein solution (or comprising from 1% to 30% by mass of vegetable proteins relative to the mass of the protein solution, said vegetable proteins being derived from a mixture comprising at least 70% of proteins of vegetable origin whose lysine/glutamine/tyrosine scores are those mentioned above and at most 30% of other proteins) and of which at least 20% of said vegetable proteins are soluble in said protein solution;
b. enzymatically treating said protein solution by adding thereto an enzyme of the aminoacyltransferase class or the oxidoreductase class said protein solution added with said enzyme being incubated under conditions allowing said enzyme to catalyze at least one enzymatic reaction to obtain an enzymatically treated protein solution; and c. freezing said enzymatically treated protein solution under conditions that allow the formation of protein fibres to obtain a fibrous or laminated, textured and frozen food product.

According to another embodiment, the invention relates to a method for producing a fibrous or laminated, and textured food product from vegetable proteins, or a method for producing said fibrous or laminated, and textured food product as described above from vegetable proteins, comprising at least the following steps:

a. enzymatically treating a protein solution comprising from 1% to 30% by weight of vegetable proteins with respect to the weight of the protein solution (or comprising from 1% to 30% by weight of vegetable proteins with respect to the weight of the protein solution, said vegetable proteins being derived from a mixture comprising at least 70% of proteins of vegetable origin whose lysine/glutamine/tyrosine scores are those mentioned above and at most 30% of other proteins) and of which at least 20% of said vegetable proteins are soluble in said protein solution by adding an enzyme of the aminoacyltransferase class or the oxidoreductase class, said protein solution added with said enzyme being incubated under conditions which allow said enzyme to catalyze at least one enzymatic reaction to obtain an enzymatically treated protein solution;

b. mixing said enzymatically treated protein solution with a salted solution comprising:

an alkaline earth salt selected from $CaCl_2$, $BeCl_2$, $MgCl_2$, $BaCl_2$ and mixtures thereof; and/or of KCl, to obtain an enzymatically treated and salted protein solution; and c. freezing said enzymatically treated and salted protein solution under conditions that allow the formation of protein fibres to obtain a fibrous or laminated, textured and frozen food product.

According to another embodiment, the invention relates to a method for producing a fibrous or laminated, and textured food product from vegetable proteins, or a method for producing said fibrous or laminated, and textured food product as described above from vegetable proteins, comprising at least the following steps:

a. enzymatically treating a protein solution comprising from 1% to 30% by weight of vegetable proteins with respect to the weight of the protein solution (or comprising from 1% to 30% by weight of vegetable proteins with respect to the weight of the protein solution, said vegetable proteins being derived from a mixture comprising at least 70% of proteins of vegetable origin whose lysine/glutamine/tyrosine scores are those mentioned above and at most 30% of other proteins) and of which at least 20% of said vegetable proteins are soluble in said protein solution by adding an enzyme of the aminoacyltransferase class or the oxidoreductase class, said protein solution added with said enzyme being incubated under conditions which allow said enzyme to catalyze at least one enzymatic reaction to obtain an enzymatically treated protein solution;

b. mixing said enzymatically treated protein solution with an acidic solution to obtain an enzymatically treated and acidified protein solution; and c. freezing said enzymatically treated and acidified protein solution under conditions that allow the formation of protein fibres to obtain a fibrous or laminated, textured and frozen food product.

According to another embodiment, the invention relates to a method for producing a fibrous or laminated, and textured food product from vegetable proteins, or a method for producing said fibrous or laminated, and textured food product as described above from vegetable proteins, comprising at least the following steps:

a. enzymatically treating a protein solution comprising from 1% to 30% by weight of vegetable proteins with respect to the weight of the protein solution (or comprising from 1% to 30% by weight of vegetable proteins with respect to the weight of the protein solution, said vegetable proteins being derived from a mixture comprising at least 70% of proteins of vegetable origin whose lysine/glutamine/tyrosine scores are those mentioned above and at most 30% of other proteins) and of which at least 20% of said vegetable proteins are soluble in said protein solution by adding an enzyme of the aminoacyltransferase class or the oxidoreductase class, said protein solution added with said enzyme being incubated under conditions which allow said enzyme to catalyze at least one enzymatic reaction to obtain an enzymatically treated protein solution;

b. freezing said enzymatically treated protein solution under conditions that allow the formation of protein fibres to obtain a fibrous or laminated, textured and frozen food product; and c. precooking said fibrous or laminated, textured and frozen food product under conditions to denature the enzyme to obtain a fibrous or laminated, textured and precooked food product.

According to another embodiment, the invention relates to a method for producing a fibrous or laminated, and textured food product from vegetable proteins, or a method for producing said fibrous or laminated, and textured food product as described above from vegetable proteins, comprising at least the following steps:

a. preparing from a vegetable protein source of a protein solution comprising from 1% to 30% by mass of vegetable proteins relative to the mass of the protein solution (or comprising from 1% to 30% by mass of vegetable proteins relative to the mass of the protein solution, said vegetable proteins being derived from a mixture comprising at least 70% of proteins of vegetable origin whose lysine/glutamine/tyrosine scores are those mentioned above and at most 30% of other proteins) and of which at least 20% of said vegetable proteins are soluble in said protein solution;

b. mixing said protein solution with a salted solution comprising:

NaCl; and/or

KCl; and/or an alkaline earth salt selected from $CaCl_2$, $BeCl_2$, $MgCl_2$, $BaCl_2$ and mixtures thereof, to obtain a salted protein solution;

c. enzymatically treating said salted protein solution by adding an enzyme of the aminoacyltransferase class or of the oxidoreductase class, said salted protein solution added with said enzyme being incubated under conditions allowing said enzyme to catalyze at least one enzymatic reaction to obtain an enzymatically treated salted protein solution; and d. freezing said enzymatically treated salted protein solution under conditions that allow the formation of protein fibres to obtain a fibrous or laminated, textured and frozen food product.

According to another embodiment, the invention relates to a method for producing a fibrous or laminated, and textured food product from vegetable proteins, or a method for producing said fibrous or laminated, and textured food product as described above from vegetable proteins, comprising at least the following steps:

a. preparing from a vegetable protein source of a protein solution comprising from 1% to 30% by mass of vegetable proteins relative to the mass of the protein solution (or comprising from 1% to 30% by mass of vegetable proteins relative to the mass of the protein solution, said vegetable proteins being derived from a mixture comprising at least 70% of proteins of vegetable origin whose lysine/glutamine/tyrosine scores are those mentioned above and at most 30% of other proteins) and of which at least 20% of said vegetable proteins are soluble in said protein solution;
b. hydrating said vegetable proteins for a period of at least one minute;
c. enzymatically treating said protein solution by adding an enzyme of the aminoacyltransferase class or of the oxidoreductase class, said protein solution added with said enzyme being incubated under conditions which allow said enzyme to catalyze at least one enzymatic reaction to obtain an enzymatically treated salted protein solution; and
d. freezing said enzymatically treated protein solution under conditions that allow the formation of protein fibres to obtain a fibrous or laminated, textured and frozen food product.

According to another embodiment, the invention relates to a method for producing a fibrous or laminated, and textured food product from vegetable proteins, or a method for producing said fibrous or laminated, and textured food product as described above from vegetable proteins, comprising at least the following steps:

a. preparing from a vegetable protein source of a protein solution comprising from 1% to 30% by mass of vegetable proteins relative to the mass of the protein solution (or comprising from 1% to 30% by mass of vegetable proteins relative to the mass of the protein solution, said vegetable proteins being derived from a mixture comprising at least 70% of proteins of vegetable origin whose lysine/glutamine/tyrosine scores are those mentioned above and at most 30% of other proteins) and of which at least 20% of said vegetable proteins are soluble in said protein solution;
b. heating said protein solution under conditions allowing said plant proteins to present the substrate site(s) of an enzyme;
c. enzymatically treating said protein solution by adding an enzyme of the aminoacyltransferase class or of the oxidoreductase class, said protein solution added with said enzyme being incubated under conditions which allow said enzyme to catalyze at least one enzymatic reaction to obtain an enzymatically treated salted protein solution; and
d. freezing said enzymatically treated protein solution under conditions that allow the formation of protein fibres to obtain a fibrous or laminated, textured and frozen food product.

According to another embodiment, the invention relates to a method for producing a fibrous or laminated, and textured food product from vegetable proteins, or a method for producing said fibrous or laminated, and textured food product as described above from vegetable proteins, comprising at least the following steps:

a. preparing from a vegetable protein source of a protein solution comprising from 1% to 30% by mass of vegetable proteins relative to the mass of the protein solution (or comprising from 1% to 30% by mass of vegetable proteins relative to the mass of the protein solution, said vegetable proteins being derived from a mixture comprising at least 70% of proteins of vegetable origin whose lysine/glutamine/tyrosine scores are those mentioned above and at most 30% of other proteins) and of which at least 20% of said vegetable proteins are soluble in said protein solution;
b. enzymatically treating said protein solution by adding an enzyme of the aminoacyltransferase class or of the oxidoreductase class, said protein solution added with said enzyme being incubated under conditions which allow said enzyme to catalyze at least one enzymatic reaction to obtain an enzymatically treated protein solution;
c. mixing said enzymatically treated protein solution with a salted solution comprising:
   an alkaline earth salt selected from $CaCl_2$, $BeCl_2$, $MgCl_2$, $BaCl_2$ and mixtures thereof; and/or
   of KCl, to obtain an enzymatically treated and salted protein solution; and d. freezing said enzymatically treated and salted protein solution under conditions that allow the formation of protein fibres to obtain a fibrous or laminated, textured and frozen food product.

According to another embodiment, the invention relates to a method for producing a fibrous or laminated, and textured food product from vegetable proteins, or a method for producing said fibrous or laminated, and textured food product as described above from vegetable proteins, comprising at least the following steps:

a. preparing from a vegetable protein source of a protein solution comprising from 1% to 30% by mass of vegetable proteins relative to the mass of the protein solution (or comprising from 1% to 30% by mass of vegetable proteins relative to the mass of the protein solution, said vegetable proteins being derived from a mixture comprising at least 70% of proteins of vegetable origin whose lysine/glutamine/tyrosine scores are those mentioned above and at most 30% of other proteins) and of which at least 20% of said vegetable proteins are soluble in said protein solution;
b. enzymatically treating said protein solution by adding an enzyme of the aminoacyltransferase class or of the oxidoreductase class, said protein solution added with said enzyme being incubated under conditions which allow said enzyme to catalyze at least one enzymatic reaction to obtain an enzymatically treated protein solution;
c. mixing said enzymatically treated protein solution with an acidic solution to obtain an enzymatically treated and acidified protein solution; and
d. freezing said enzymatically treated and acidified protein solution under conditions that allow the formation of protein fibres to obtain a fibrous or laminated, textured and frozen food product.

According to another embodiment, the invention relates to a method for producing a fibrous or laminated, and textured food product from vegetable proteins, or a method for producing said fibrous or laminated, and textured food product as described above from vegetable proteins, comprising at least the following steps:

a. preparing from a vegetable protein source of a protein solution comprising from 1% to 30% by mass of vegetable proteins relative to the mass of the protein solution (or comprising from 1% to 30% by mass of vegetable proteins relative to the mass of the protein solution, said vegetable proteins being derived from a mixture comprising at least 70% of proteins of vegetable origin whose lysine/glutamine/tyrosine scores are those mentioned above and at most 30% of other proteins) and of which at least 20% of said vegetable proteins are soluble in said protein solution;
b. enzymatically treating said protein solution by adding an enzyme of the aminoacyltransferase class or of the oxidoreductase class, said protein solution added with said enzyme being incubated under conditions which allow said enzyme to catalyze at least one enzymatic reaction to obtain an enzymatically treated protein solution;
c. freezing said enzymatically treated protein solution under conditions that allow the formation of protein fibres to obtain a fibrous or laminated, textured and frozen food product; and
d. precooking said fibrous or laminated, textured and frozen food product under conditions to denature the enzyme to obtain a fibrous or laminated, textured and precooked food product.

According to another embodiment, the invention relates to a method for producing a fibrous or laminated, and textured food product from vegetable proteins, or a method for producing said fibrous or laminated, and textured food product as described above from vegetable proteins, comprising at least the following steps:

a. enzymatically treating a protein solution comprising from 1% to 30% by weight of vegetable proteins with respect to the weight of the protein solution (or comprising from 1% to 30% by weight of vegetable proteins with respect to the weight of the protein solution, said vegetable proteins being derived from a mixture comprising at least 70% of proteins of vegetable origin whose lysine/glutamine/tyrosine scores are those mentioned above and at most 30% of other proteins) and of which at least 20% of said vegetable proteins are soluble in said protein solution by adding an enzyme of the aminoacyltransferase class or the oxidoreductase class, said protein solution added with said enzyme being incubated under conditions which allow said enzyme to catalyze at least one enzymatic reaction to obtain an enzymatically treated protein solution;
b. mixing said enzymatically treated protein solution with a salted solution comprising:
    an alkaline earth salt selected from $CaCl_2$, $BeCl_2$, $MgCl_2$, $BaCl_2$ and mixtures thereof; and/or
    of KCl, to obtain an enzymatically treated and salted protein solution;
c. freezing said enzymatically treated and salted protein solution under conditions that allow the formation of protein fibres to obtain a fibrous or laminated, textured and frozen food product; and
d. precooking said fibrous or laminated, textured and frozen food product under conditions to denature the enzyme to obtain a fibrous or laminated, textured and precooked food product.

According to another embodiment, the invention relates to a method for producing a fibrous or laminated, and textured food product from vegetable proteins, or a method for producing said fibrous or laminated, and textured food product as described above from vegetable proteins, comprising at least the following steps:

a. enzymatically treating a protein solution comprising from 1% to 30% by weight of vegetable proteins with respect to the weight of the protein solution (or comprising from 1% to 30% by weight of vegetable proteins with respect to the weight of the protein solution, said vegetable proteins being derived from a mixture comprising at least 70% of proteins of vegetable origin whose lysine/glutamine/tyrosine scores are those mentioned above and at most 30% of other proteins) and of which at least 20% of said vegetable proteins are soluble in said protein solution
    by adding an enzyme of the aminoacyltransferase class or the oxidoreductase class, said protein solution added with said enzyme being incubated under conditions which allow said enzyme to catalyze at least one enzymatic reaction to obtain an enzymatically treated protein solution;
b. mixing said enzymatically treated protein solution with a salted solution comprising:
    an alkaline earth salt selected from $CaCl_2$, $BeCl_2$, $MgCl_2$, $BaCl_2$ and mixtures thereof; and/or
    of KCl, to obtain an enzymatically treated and salted protein solution;
c. mixing said enzymatically treated and salted protein solution with an acid solution to obtain an enzymatically treated and salted, and acidified protein solution; and
d. freezing said enzymatically treated and salted, and acidified protein solution under conditions that allow the formation of protein fibres to obtain a fibrous or laminated, textured and frozen food product.

According to another embodiment, the invention relates to a method for producing a fibrous or laminated, and textured food product from vegetable proteins, or a method for producing said fibrous or laminated, and textured food product as described above from vegetable proteins, comprising at least the following steps:

a. enzymatically treating a protein solution comprising from 1% to 30% by weight of vegetable proteins with respect to the weight of the protein solution (or comprising from 1% to 30% by weight of vegetable proteins with respect to the weight of the protein solution, said vegetable proteins being derived from a mixture comprising at least 70% of proteins of vegetable origin whose lysine/glutamine/tyrosine scores are those mentioned above and at most 30% of other proteins) and of which at least 20% of said vegetable proteins are soluble in said protein solution by adding an enzyme of the aminoacyltransferase class or the oxidoreductase class, said protein solution added with said enzyme being incubated under conditions which allow said enzyme to catalyze at least one enzymatic reaction to obtain an enzymatically treated protein solution;
b. mixing said enzymatically treated protein solution with an acidic solution to obtain an enzymatically treated and acidified protein solution;
c. freezing said enzymatically treated and acidified protein solution under conditions that allow the formation of protein fibres to obtain a fibrous or laminated, textured and frozen food product; and
d. precooking said fibrous or laminated, textured and frozen food product under conditions to denature the enzyme to obtain a fibrous or laminated, textured and precooked food product.

According to another embodiment, the invention relates to a method for producing a fibrous or laminated, and textured food product from vegetable proteins, or a method for producing said fibrous or laminated, and textured food product as described above from vegetable proteins, comprising at least the following steps:

a. enzymatically treating a protein solution comprising from 1% to 30% by weight of vegetable proteins with respect to the weight of the protein solution (or comprising from 1% to 30% by weight of vegetable proteins with respect to the weight of the protein solution, said vegetable proteins being derived from a mixture comprising at least 70% of proteins of vegetable origin whose lysine/glutamine/tyrosine scores are those mentioned above and at most 30% of other proteins) and of which at least 20% of said vegetable proteins are soluble in said protein solution by adding an enzyme of the aminoacyltransferase class or the oxidoreductase class, said protein solution added with said enzyme being incubated under conditions which allow said enzyme to catalyze at least one enzymatic reaction to obtain an enzymatically treated protein solution;

b. freezing said enzymatically treated protein solution under conditions that allow the formation of protein fibres to obtain a fibrous or laminated, textured and frozen food product;

c. precooking said fibrous or laminated, textured and frozen food product under conditions to denature the enzyme to obtain a fibrous or laminated, textured and precooked food product; and d. freezing or deep-freezing said pre-cooked textured fibrous or laminated food product.

According to another embodiment, the invention relates to a method for producing a fibrous or laminated, and textured food product from vegetable proteins, or a method for producing said fibrous or laminated, and textured food product as described above from vegetable proteins, comprising at least the following steps:

a. preparing from a vegetable protein source of a protein solution comprising from 1% to 30% by mass of vegetable proteins relative to the mass of the protein solution (or comprising from 1% to 30% by mass of vegetable proteins relative to the mass of the protein solution, said vegetable proteins being derived from a mixture comprising at least 70% of proteins of vegetable origin whose lysine/glutamine/tyrosine scores are those mentioned above and at most 30% of other proteins) and of which at least 20% of said vegetable proteins are soluble in said protein solution;

b. mixing said protein solution with a salted solution comprising:

NaCl; and/or

KCl; and/or an alkaline earth salt selected from $CaCl_2$, $BeCl_2$, $MgCl_2$, $BaCl_2$ and mixtures thereof, to obtain a salted protein solution;

c. hydrating said vegetable proteins for a period of at least one minute;

d. enzymatically treating said salted protein solution by adding thereto an enzyme of the aminoacyltransferase class or of the oxidoreductase class said salted protein solution added with said enzyme being incubated under conditions allowing said enzyme to catalyse at least one enzymatic reaction to obtain an enzymatically treated and salted protein solution; and e. freezing said enzymatically treated and salted protein solution under conditions that allow the formation of protein fibres to obtain a fibrous or laminated, textured and frozen food product.

According to another embodiment, the invention relates to a method for producing a fibrous or laminated, and textured food product from vegetable proteins, or a method for producing said fibrous or laminated, and textured food product as described above from vegetable proteins, comprising at least the following steps:

a. preparing from a vegetable protein source of a protein solution comprising from 1% to 30% by mass of vegetable proteins relative to the mass of the protein solution (or comprising from 1% to 30% by mass of vegetable proteins relative to the mass of the protein solution, said vegetable proteins being derived from a mixture comprising at least 70% of proteins of vegetable origin whose lysine/glutamine/tyrosine scores are those mentioned above and at most 30% of other proteins) and of which at least 20% of said vegetable proteins are soluble in said protein solution;

b. mixing said protein solution with a salted solution comprising:

NaCl; and/or

KCl; and/or an alkaline earth salt selected from $CaCl_2$, $BeCl_2$, $MgCl_2$, $BaCl_2$ and mixtures thereof, to obtain a salted protein solution;

c. heating said protein solution under conditions allowing said plant proteins to present the substrate site(s) of an enzyme;

d. enzymatically treating said salted protein solution by adding an enzyme of the aminoacyltransferase class or of the oxidoreductase class, said salted protein solution added with said enzyme being incubated under conditions allowing said enzyme to catalyze at least one enzymatic reaction to obtain an enzymatically treated and salted protein solution; and e. freezing said enzymatically treated and salted protein solution under conditions that allow the formation of protein fibres to obtain a fibrous or laminated, textured and frozen food product.

According to another embodiment, the invention relates to a method for producing a fibrous or laminated, and textured food product from vegetable proteins, or a method for producing said fibrous or laminated, and textured food product as described above from vegetable proteins, comprising at least the following steps:

a. preparing from a vegetable protein source of a protein solution comprising from 1% to 30% by mass of vegetable proteins relative to the mass of the protein solution (or comprising from 1% to 30% by mass of vegetable proteins relative to the mass of the protein solution, said vegetable proteins being derived from a mixture comprising at least 70% of proteins of vegetable origin whose lysine/glutamine/tyrosine scores are those mentioned above and at most 30% of other proteins) and of which at least 20% of said vegetable proteins are soluble in said protein solution;

b. hydrating said vegetable proteins for a period of at least one minute;

c. heating said protein solution under conditions allowing said plant proteins to present the substrate site(s) of an enzyme;

d. enzymatically treating said protein solution by adding an enzyme of the aminoacyltransferase class or of the oxidoreductase class, said protein solution added with said enzyme being incubated under conditions which allow said enzyme to catalyze at least one enzymatic reaction to obtain an enzymatically treated and salted protein solution; and e. freezing said enzymatically treated and salted protein solution under conditions that allow the formation of protein fibres to obtain a fibrous or laminated, textured and frozen food product.

According to another embodiment, the invention relates to a method for producing a fibrous or laminated, and textured food product from vegetable proteins, or a method for producing said fibrous or laminated, and textured food product as described above from vegetable proteins, comprising at least the following steps:

a. preparing from a vegetable protein source of a protein solution comprising from 1% to 30% by mass of vegetable proteins relative to the mass of the protein solution (or comprising from 1% to 30% by mass of vegetable proteins relative to the mass of the protein solution, said vegetable proteins being derived from a mixture comprising at least 70% of proteins of vegetable origin whose lysine/glutamine/tyrosine scores are those mentioned above and at most 30% of other proteins) and of which at least 20% of said vegetable proteins are soluble in said protein solution;

b. enzymatically treating said protein solution by adding an enzyme of the aminoacyltransferase class or of the oxidoreductase class, said protein solution added with said enzyme being incubated under conditions which allow said enzyme to catalyze at least one enzymatic reaction to obtain an enzymatically treated protein solution;

c. mixing said enzymatically treated protein solution with a salted solution comprising:

an alkaline earth salt selected from $CaCl_2$, $BeCl_2$, $MgCl_2$, $BaCl_2$ and mixtures thereof; and/or of KCl, to obtain an enzymatically treated and salted protein solution;

d. mixing said enzymatically treated and salted protein solution with an acid solution to obtain an enzymatically treated and salted, and acidified protein solution; and e. freezing said enzymatically treated and salted protein solution and acidifying it under conditions allowing the formation of protein fibres to obtain a fibrous or laminated, textured and frozen food product.

According to another embodiment, the invention relates to a method for producing a fibrous or laminated, and textured food product from vegetable proteins, or a method for producing said fibrous or laminated, and textured food product as described above from vegetable proteins, comprising at least the following steps:

a. preparing from a vegetable protein source of a protein solution comprising from 1% to 30% by mass of vegetable proteins relative to the mass of the protein solution (or comprising from 1% to 30% by mass of vegetable proteins relative to the mass of the protein solution, said vegetable proteins being derived from a mixture comprising at least 70% of proteins of vegetable origin whose lysine/glutamine/tyrosine scores are those mentioned above and at most 30% of other proteins) and of which at least 20% of said vegetable proteins are soluble in said protein solution;

b. enzymatically treating said protein solution by adding an enzyme of the aminoacyltransferase class or of the oxidoreductase class, said protein solution added with said enzyme being incubated under conditions which allow said enzyme to catalyze at least one enzymatic reaction to obtain an enzymatically treated protein solution;

c. mixing said enzymatically treated protein solution with a salted solution comprising:

an alkaline earth salt selected from $CaCl_2$, $BeCl_2$, $MgCl_2$, $BaCl_2$ and mixtures thereof; and/or of KCl, to obtain an enzymatically treated and salted protein solution;

d. freezing said enzymatically treated and salted protein solution under conditions that allow the formation of protein fibres to obtain a fibrous or laminated, textured and frozen food product; and e. precooking said fibrous or laminated, textured and frozen food product under conditions to denature the enzyme to obtain a fibrous or laminated, textured and precooked food product.

According to another embodiment, the invention relates to a method for producing a fibrous or laminated, and textured food product from vegetable proteins, or a method for producing said fibrous or laminated, and textured food product as described above from vegetable proteins, comprising at least the following steps:

a. preparing from a vegetable protein source of a protein solution comprising from 1% to 30% by mass of vegetable proteins relative to the mass of the protein solution (or comprising from 1% to 30% by mass of vegetable proteins relative to the mass of the protein solution, said vegetable proteins being derived from a mixture comprising at least 70% of proteins of vegetable origin whose lysine/glutamine/tyrosine scores are those mentioned above and at most 30% of other proteins) and of which at least 20% of said vegetable proteins are soluble in said protein solution;

b. enzymatically treating said protein solution by adding an enzyme of the aminoacyltransferase class or of the oxidoreductase class, said protein solution added with said enzyme being incubated under conditions which allow said enzyme to catalyze at least one enzymatic reaction to obtain an enzymatically treated protein solution;

c. freezing said enzymatically treated protein solution under conditions that allow the formation of protein fibres to obtain a fibrous or laminated, textured and frozen food product;

d. precooking said fibrous or laminated, textured and frozen food product under conditions to denature the enzyme to obtain a fibrous or laminated, textured and precooked food product; and e. freezing or deep-freezing said pre-cooked textured fibrous or laminated food product.

According to another embodiment, the invention relates to a method for producing a fibrous or laminated, and textured food product from vegetable proteins, or a method for producing said fibrous or laminated, and textured food product as described above from vegetable proteins, comprising at least the following steps:

a. enzymatically treating a protein solution comprising from 1% to 30% by weight of vegetable proteins with respect to the weight of the protein solution (or comprising from 1% to 30% by weight of vegetable proteins with respect to the weight of the protein solution, said vegetable proteins being derived from a mixture comprising at least 70% of proteins of vegetable origin whose lysine/glutamine/tyrosine scores are those mentioned above and at most 30% of other proteins) and of which at least 20% of said vegetable proteins are soluble in said protein solution by adding an enzyme of the aminoacyltransferase class or the oxidoreductase class, said protein solution added with said enzyme being incubated under conditions which allow said enzyme to catalyze at least one enzymatic reaction to obtain an enzymatically treated protein solution;

b. mixing said enzymatically treated protein solution with a salted solution comprising:

an alkaline earth salt selected from $CaCl_2$, $BeCl_2$, $MgCl_2$, $BaCl_2$ and mixtures thereof; and/or of KCl, to obtain an enzymatically treated and salted protein solution;

c. mixing said enzymatically treated and salted protein solution with an acid solution to obtain an enzymatically treated and salted, and acidified protein solution;

d. freezing said enzymatically treated and salted, and acidified protein solution under conditions that allow the formation of protein fibres to obtain a fibrous or laminated, textured and frozen food product; and e. precooking said fibrous or laminated, textured and frozen food product under conditions to denature the enzyme to obtain a fibrous or laminated, textured and precooked food product.

According to another embodiment, the invention relates to a method for producing a fibrous or laminated, and textured food product from vegetable proteins, or a method for producing said fibrous or laminated, and textured food product as described above from vegetable proteins, comprising at least the following steps:

a. enzymatically treating a protein solution comprising from 1% to 30% by weight of vegetable proteins with respect to the weight of the protein solution (or comprising from 1% to 30% by weight of vegetable proteins with respect to the weight of the protein solution, said vegetable proteins being derived from a mixture comprising at least 70% of proteins of vegetable origin whose lysine/glutamine/tyrosine scores are those mentioned above and at most 30% of other proteins) and of which at least 20% of said vegetable proteins are soluble in said protein solution by adding an enzyme of the aminoacyltransferase class or the oxidoreductase class, said protein solution added with said enzyme being incubated under conditions which allow said enzyme to catalyze at least one enzymatic reaction to obtain an enzymatically treated protein solution;

b. mixing said enzymatically treated protein solution with a salted solution comprising:

an alkaline earth salt selected from $CaCl_2$, $BeCl_2$, $MgCl_2$, $BaCl_2$ and mixtures thereof; and/or of KCl, to obtain an enzymatically treated and salted protein solution;

c. freezing said enzymatically treated and salted protein solution under conditions that allow the formation of protein fibres to obtain a fibrous or laminated, textured and frozen food product;

d. precooking said fibrous or laminated, textured and frozen food product under conditions to denature the enzyme to obtain a fibrous or laminated, textured and precooked food product; and e. freezing or deep-freezing said pre-cooked textured fibrous or laminated food product.

According to another embodiment, the invention relates to a method for producing a fibrous or laminated, and textured food product from vegetable proteins, or a method for producing said fibrous or laminated, and textured food product as described above from vegetable proteins, comprising at least the following steps:

a. enzymatically treating a protein solution comprising from 1% to 30% by weight of vegetable proteins with respect to the weight of the protein solution (or comprising from 1% to 30% by weight of vegetable proteins with respect to the weight of the protein solution, said vegetable proteins being derived from a mixture comprising at least 70% of proteins of vegetable origin whose lysine/glutamine/tyrosine scores are those mentioned above and at most 30% of other proteins) and of which at least 20% of said vegetable proteins are soluble in said protein solution by adding an enzyme of the aminoacyltransferase class or the oxidoreductase class, said protein solution added with said enzyme being incubated under conditions which allow said enzyme to catalyze at least one enzymatic reaction to obtain an enzymatically treated protein solution;

b. mixing said enzymatically treated protein solution with an acid solution to obtain an enzymatically treated and acidified protein solution;

c. freezing said enzymatically treated and acidified protein solution under conditions that allow the formation of protein fibres to obtain a fibrous or laminated, textured and frozen food product;

d. precooking said fibrous or laminated, textured and frozen food product under conditions to denature the enzyme to obtain a fibrous or laminated, textured and precooked food product; and e. freezing or deep-freezing said pre-cooked textured fibrous or laminated food product.

According to another embodiment, the invention relates to a method for producing a fibrous or laminated, and textured food product from vegetable proteins, or a method for producing said fibrous or laminated, and textured food product as described above from vegetable proteins, comprising at least the following steps:

a. preparing from a vegetable protein source of a protein solution comprising from 1% to 30% by mass of vegetable proteins relative to the mass of the protein solution (or comprising from 1% to 30% by mass of vegetable proteins relative to the mass of the protein solution, said vegetable proteins being derived from a mixture comprising at least 70% of proteins of vegetable origin whose lysine/glutamine/tyrosine scores are those mentioned above and at most 30% of other proteins) and of which at least 20% of said vegetable proteins are soluble in said protein solution;

b. mixing said protein solution with a salted solution comprising:
NaCl; and/or
KCl; and/or
an alkaline earth salt selected from $CaCl_2$, $BeCl_2$, $MgCl_2$, $BaCl_2$ and mixtures thereof,
to obtain a salted protein solution;
c. hydrating said vegetable proteins for a period of at least one minute;
d. heating said salt protein solution under conditions which allow said plant proteins to present the substrate site(s) of an enzyme;
e. enzymatically treating said salted protein solution by adding an enzyme of the aminoacyltransferase class or of the oxidoreductase class, said salted protein solution added with said enzyme being incubated under conditions allowing said enzyme to catalyze at least one enzymatic reaction to obtain an enzymatically treated and salted protein solution;
f. mixing said enzymatically treated and salted protein solution with a salted solution comprising:
an alkaline earth salt selected from $CaCl_2$, $BeCl_2$, $MgCl_2$, $BaCl_2$ and mixtures thereof; and/or
of KCl,
to obtain a enzymatically treated and salted protein solution and salted;
g. mixing said enzymatically treated and salted protein solution and salted with an acidic solution to obtain a enzymatically treated and salted protein solution, salted and acidified;
h. freezing said enzymatically treated and salted protein solution, salted and acidified under conditions that allow the formation of protein fibres to obtain a fibrous or laminated, textured and frozen food product;
i. precooking said fibrous or laminated, textured and frozen food product under conditions to denature the enzyme to obtain a fibrous or laminated, textured and precooked food product; and
j. freezing or deep-freezing said fibrous or laminated, textured and precooked food product.

As previously mentioned, one embodiment of the invention concerns a fibrous or laminated, textured and coated food product. It is thus understood that another embodiment of the invention concerns a method of coating the fibrous or laminated, and textured food product as described above with a solution of food polymers of vegetable origin in order to obtain a fibrous or laminated, textured and coated food product.

It is also understood that another embodiment of the invention concerns the method for producing a fibrous or laminated, and textured food product from vegetable proteins as described above, or the method for producing said fibrous or laminated, and textured food product from vegetable proteins as described above, which further comprises after step b. a step of coating the fibrous or laminated, textured and frozen food product as described above with a solution of food polymers of vegetable origin in order to obtain a fibrous or laminated, textured, frozen and coated food product.

To achieve this coating, it is possible:
to soak the fibrous or laminated, and textured food product of the invention in a solution of food polymers of plant origin;
to spray a solution of food polymers of plant origin onto the fibrous or laminated, and textured food product of the invention;
to coat the fibrous or laminated, and textured food product of the invention with a solution of food polymers of plant origin;
to wrap the fibrous or laminated, and textured food product of the invention with a solution of food polymers of plant origin;
to brush a solution of food polymers of plant origin onto the fibrous or laminated, and textured food product of the invention; or
to spread a solution of food polymers of plant origin onto the fibrous or laminated, and textured food product of the invention.

According to another embodiment, the coating method (or step) can be carried out in several stages, e.g. the use of a solution based on alkaline-earth salts in order to fix and/or stabilise the solution of food polymers of plant origin on the fibrous or laminated, and textured food product of the invention via the use of a solution based on alkaline-earth salts; and/or to superimpose several layers of solution of food polymers of plant origin, of different composition or not.

According to another embodiment, the invention relates to the method for producing a fibrous or laminated, and textured food product from vegetable proteins as described above, or the method for producing said fibrous or laminated, and textured food product from vegetable proteins as described above, wherein the coating step is performed upstream of the cooking step, during the cooking step or at the end of the cooking step.

According to another embodiment, the invention relates to a method for producing a fibrous or laminated, textured and coated food product from vegetable proteins, or a method for producing said fibrous or laminated, textured and coated food product as described above from vegetable proteins, comprising at least the following steps:
a. preparing from a vegetable protein source of a protein solution comprising from 1% to 30% by mass of vegetable proteins relative to the mass of the protein solution (or comprising from 1% to 30% by mass of vegetable proteins relative to the mass of the protein solution, said vegetable proteins being derived from a mixture comprising at least 70% of proteins of vegetable origin whose lysine/glutamine/tyrosine scores are those mentioned above and at most 30% of other proteins) and of which at least 20% of said vegetable proteins are soluble in said protein solution;
b. mixing said protein solution with a salted solution comprising:
NaCl; and/or
KCl; and/or
an alkaline earth salt selected from $CaCl_2$, $BeCl_2$, $MgCl_2$, $BaCl_2$ and mixtures thereof,
to obtain a salted protein solution;
c. hydrating said vegetable proteins for a period of at least one minute;
d. heating said salt protein solution under conditions which allow said plant proteins to present the substrate site(s) of an enzyme;
e. enzymatically treating said salted protein solution by adding an enzyme of the aminoacyltransferase class or of the oxidoreductase class,
said salted protein solution added with said enzyme being incubated under conditions allowing said enzyme to catalyze at least one enzymatic reaction to obtain an enzymatically treated and salted protein solution;

f. mixing said enzymatically treated and salted protein solution with a salted solution comprising:
   an alkaline earth salt selected from $CaCl_2$, $BeCl_2$, $MgCl_2$, $BaCl_2$ and mixtures thereof; and/or of KCl,
   to obtain a enzymatically treated and salted protein solution and salted;

g. mixing said enzymatically treated and salted protein solution and salted with an acidic solution to obtain a enzymatically treated and salted protein solution, salted and acidified;

h. freezing said enzymatically treated and salted protein solution, salted and acidified under conditions that allow the formation of protein fibres to obtain a fibrous or laminated, textured and frozen food product;

i. (optionally) precooking said fibrous or laminated, textured and frozen food product under conditions to denature the enzyme to obtain a fibrous or laminated, textured and precooked food product;

j. coating said fibrous or laminated, textured and (optionally) precooked food product with a solution of food polymers of vegetable origin in order to obtain a fibrous or laminated, textured, precooked and coated food product;

k. cooking said fibrous or laminated, textured, (optionally) precooked and coated food product to obtain a fibrous or laminated, textured, coated and cooked food product; and l. optionally freezing or deep-freezing said fibrous or laminated, textured, coated and cooked food product.

As previously mentioned, conditions to denature the enzyme are in particular temperature conditions ranging from 70 °C to 250 °C and duration ranging from 15 minutes to 180 minutes (e.g. 160 °C for 20 min). Same conditions may be used for implementing the cooking step k. According to another aspect, the invention relates to a fibrous or laminated, and textured food product obtainable by the method of the invention. In this respect, all the definitions, characteristics and the like applicable to the product of the invention as described in the first aspect of the invention are applicable to the fibrous or laminated, and textured food product obtainable by the method of the invention.

Again, it is recalled that the various aspects of the invention, as well as the various embodiments thereof, are interdependent. These can therefore be combined with each other to obtain preferred aspects and/or embodiments of the invention not explicitly described. This is also true for all the definitions provided in this description, which apply to all aspects of the invention and its embodiments.

In addition, the present invention is illustrated by, but not limited to, the Figures and following Examples.

EXAMPLES

Materials & Methods Common to the Examples pH and Moisture Measurement

The pH of the mixture (salted or unsalted, enzymatically treated or not) was measured by a Fisherbrand™ Accumet™ AE150 Benchtop pH meter. The electrode of the pH meter was submerged in 3 different samples until the value displayed by the machine stabilised.

The moisture content was measured on the solution and in the products of the invention with an electronic infrared moisture analyser, the Sartorius MA 37 or the Sartorius MA160. The drying of the samples is carried out at 130 °C on 2.00 g±0.20 of samples. Triplicates were performed to obtain a mean and standard deviation.

Texture Analysis

The analysis method is adapted from Skalecki et al. (P, Skalecki & Florek, Mariusz & A, Litwińczuk. (2010). Freezing-induced changes of the colour and texture of Baltic cod fillets.). Texture properties were measured with a TA.HD texturometer and a TA.XTplus texturometer (Stable Micro Systems Ltd) and Exponent Connect® software (Stable Micro Systems Ltd).

The crosshead of the TA.XTplus texturometer has been equipped with a 50 kg load cell. The TA.XTplus texturometer was also equipped with a 100 mm diameter compression plate. Samples of the products of the invention cut into either cubic or cylindrical shapes with dimensions of 15×15×5 mm were compressed to 50% of their original height by the plate. In protocola (Examples 1 to 9), the platen was moved at a speed of 1.67 mm/s during each "bite" with a pre- and post-test speed of 2 mm/s, and a release force of 0.1 N. In protocolb (Examples 10 to 17), the plate was moved at a speed of 1 mm/s during each "bite" with a pre- and post-test speed of 3 mm/s, and a trigger force of 0.1 N. A two-bite compression cycle was performed with a 3 s rest period between bites. Firmness, chewability (or compressibility), resilience, cohesion, elasticity and adhesion were measured. For each condition tested, 3 samples were taken from the centre of 3 of the products of the invention in order to obtain an averaged value and standard deviation for each sample. The tests were performed at room temperature. Table 1 below and FIG. 1 explain the sensory and instrumental definition of the selected texture profile analysis parameters and the method used to calculate them from the graphs obtained by the software.

TABLE 1

Table defining the parameters obtained by texture analysis. According to Novakovic and Tomašević (S Novaković and I Tomašević 2017 *IOP Conf. Ser.: Earth Environ. Sci.* 85 012063).

| Parameter | Sensory definition | Instrumental definition and calculation |
|---|---|---|
| Firmness (Newton [N]) | The force required to compress a food item between 2 molars. Defined as the power required to achieve a certain deformation. | The peak force obtained during the 1st compression (FIG. 1). |
| Cohesion | The ability of the product to withstand a second deformation relative to its resistance to the first deformation. | Cohesion = Area 2/Area 1 (FIG. 1) |

TABLE 1-continued

Table defining the parameters obtained by texture analysis. According to Novakovic and Tomašević (S Novaković and I Tomašević 2017 *IOP Conf. Ser.: Earth Environ. Sci.* 85 012063).

| Parameter | Sensory definition | Instrumental definition and calculation |
|---|---|---|
| Mastication/machability (N) | The energy required to chew a solid food to prepare it for swallowing. | Firmness*(Area 2/Area 1)*(Distance 2/Distance 1) (FIG. 1) |
| Elasticity (%) | The ability of a product to return to its original shape within a given time between two compressions. | It is measured in % by the ratio of Distance 2 to Distance 1 (FIG. 1) |
| Resilience (%) | Ability of the product to regain its original height | Ratio of area 4 to area 3 such that: resilience (%) = Area 4/Area 3 (FIG. 1) |

Assessment of the Degree of Fibrosity

Animal meat is characterized by its anisotropy resulting from its aligned and oriented muscle fibres, so it is essential that meat analogues reproduce this characteristic.

Figure 2:
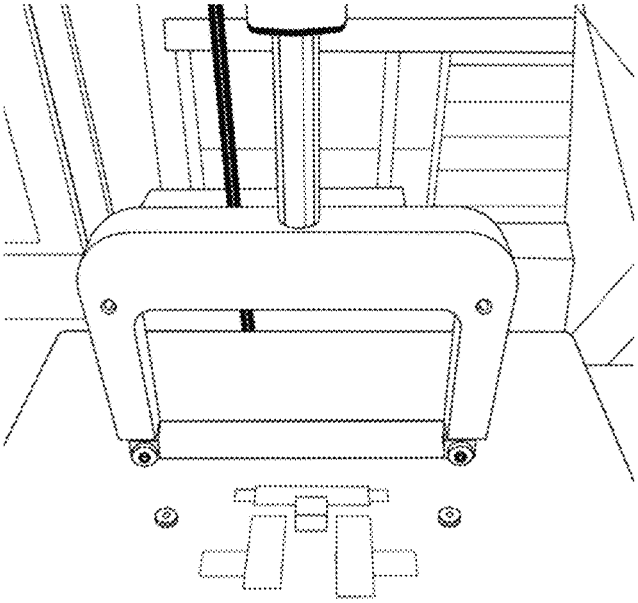
FIG. 2 shows an example of a sample under an A/ECK slide.
Figure 3:
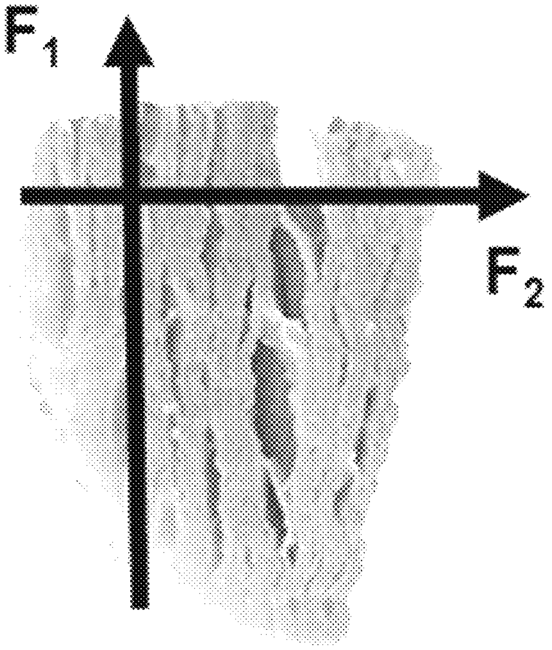
FIG. 3 shows the cutting forces parallel ($F_1$) and perpendicular ($F_2$) to the freezing flow on prepared soybean samples.

The method is based on Zhang et al (Zhang J, Liu L, Jiang Y, Faisal S, Wei L, Cao C, Yan W, Wang Q. Converting Peanut Protein Biomass Waste into "Double Green" Meat Substitutes Using a High-Moisture Extrusion Method: A Multiscale Method to Explore a Method for Forming a Meat-Like Fibrous Structure. J Agric Food Chem. 2019 Sep. 25; 67(38):10713-10725. doi: 10.1021/acs.jafc.9b02711. Epub 2019 Sep. 13. PMID: 31453702.) and was performed using the TA.XTplus texturometer described above. A sample cube of the pea isolate (PPI) or soy isolate (SPI) product of the invention (15×15×15 mm) was cut with an A/ECK blade to 75% of its original thickness at a speed of 1 mm/s in the same direction (longitudinal resistance, F1) and perpendicularly (transverse resistance, F2) to the direction of the freezing flow, respectively (FIG. 2 and FIG. 3). The degree of fibrousness can be used to indicate the formation of a fibrous structure and is expressed as the ratio between F2/F1. A degree of fibrousness greater than 1 indicates the formation of a meat substitutes fibrous structure in the direction of freezing flow. The tests were performed in triplicates for each condition tested by taking a sample from the centre of 3 products of the invention.

Measurement of Viscoelasticity

Rheological characterization of the salted or unsalted and/or enzymatically treated or untreated protein solution was carried out with a Physica MCR301 rheometer (Anton Paar), with a 50 mm diameter cone-plane geometry and an air gap of 0.499 mm. The tests were performed at 5 °C, and the temperature was controlled by a Peltier system. The measurement of tan δ was performed in a frequency sweep test from 100 Hz to 0.1 Hz, at a strain of 0.1%. Each test was performed three times per sample in order to have means and standard deviations.

Determination of the Water Holding Capacity (WHC) Using the Texturometer

Water Holding Capacity (WHC) is a measure of the ability of a product to retain its intrinsic water during the application of force, pressure, centrifugation or heat. The WHC was measured using a Ta.XTplus texturometer (Stable Micro System Ltd) equipped with a 100 mm diameter compression rotor, and Exponent Connect Lite® ver. 8.0.5.0 software. A cylindrical sample of approximately 2 g±0.50 was taken from the product of known moisture content. Two rectangular pieces of absorbent paper were positioned on the bottom surface of the compression mobile and centred under the sample. At room temperature (20 °C to 24 °C), a force of 1 kg was applied to the sample by the compression device for 5 minutes. During the compression the product was thus in contact with the two absorbent papers. After compression, the sample was weighed. The moisture content of the product was also determined using an infrared balance by the protocol given in section 2.

The water loss (WL) was determined by the following equation:

$$\text{water loss (\%)} = PE = 100 * \frac{(m_1 - m_2)}{(m_1)}$$

With $m_1$, the mass of the sample before compression and $m_2$ the mass of the sample after compression.

The WHC was calculated by the following equation:

$$WHC(\%) = 100 * \frac{(H_1 - PE)}{(H_1)}$$

With $H_1$, the water content of the sample and PE, the water loss.

Determination of Product Density by Water Displacement

The density of the product was measured at room temperature (20 °C to 24 °C) by water displacement. To do this, a volume of distilled water was poured into a 25 mL graduated cylinder to a known titration point ($V_1$), and a sample of the product was weighed ($m_1$). The sample was then placed in the test tube and left there for 1 minute to allow for water absorption by the product.

Once the minute had elapsed, the new volume indicated by the graduated cylinder was noted ($V_2$), and the sample was then removed from the cylinder and weighed again ($m_1$). Again, the volume indicated by the test tube was noted $(V)._3$ The following equations were used to determine the density of the product:

$$m_2 - m_1 = m_{absorbed\ water}$$

$$m_{absorbed\ water}(\text{g}) = V_{absorbed\ water}(\text{mL})$$

$$V_{sample} = V_2 - V_{absorbed\ water} - V_1$$

$$d\text{-}_{sample} = m_1 / V_{sample}$$

Microscopic Observation of the Slurry

The observation of the particles composing the slurry was carried out by an Olympus BX43 optical microscope (Olympus®). A sample of slurry was taken after the acidification phase at a temperature of 5 °C to 10 °C and then diluted 10-fold with distilled water. A drop of this solution was placed on a slide and covered with a coverslip. The sample was observed under the X10 objective. A set of photographs was taken by Capture Ver.2.3 software and treated by ImageJ software. The shape of the particles was classified into 2 categories; predominantly globular or predominantly amorphous; the mean particle size and associated standard deviation were measured.

Photography and Image Analysis

The thawed samples were cut in the centre to observe the fibrous structure. The sample was photographed on a ruler in order to have a size scale. For better image quality and accuracy during analysis, it is recommended to place the product in a black box with a single white light source.

The image analysis was performed with the free software ImageJ ver. 1.53 k. The image to be analysed was opened with ImageJ, then a line was drawn between two ruler marks to indicate the scale to the software ("Set Scale" function). Once the scale was in place, the image was reduced to a box containing fibres, and absent from the peripheries of the product ("Crop" function). The thickness of the fibres and the inter-fibre distance can then be measured by drawing a line across the diameter of a fibre and between two fibres respectively and using the "Measure" function.

Figure 21:
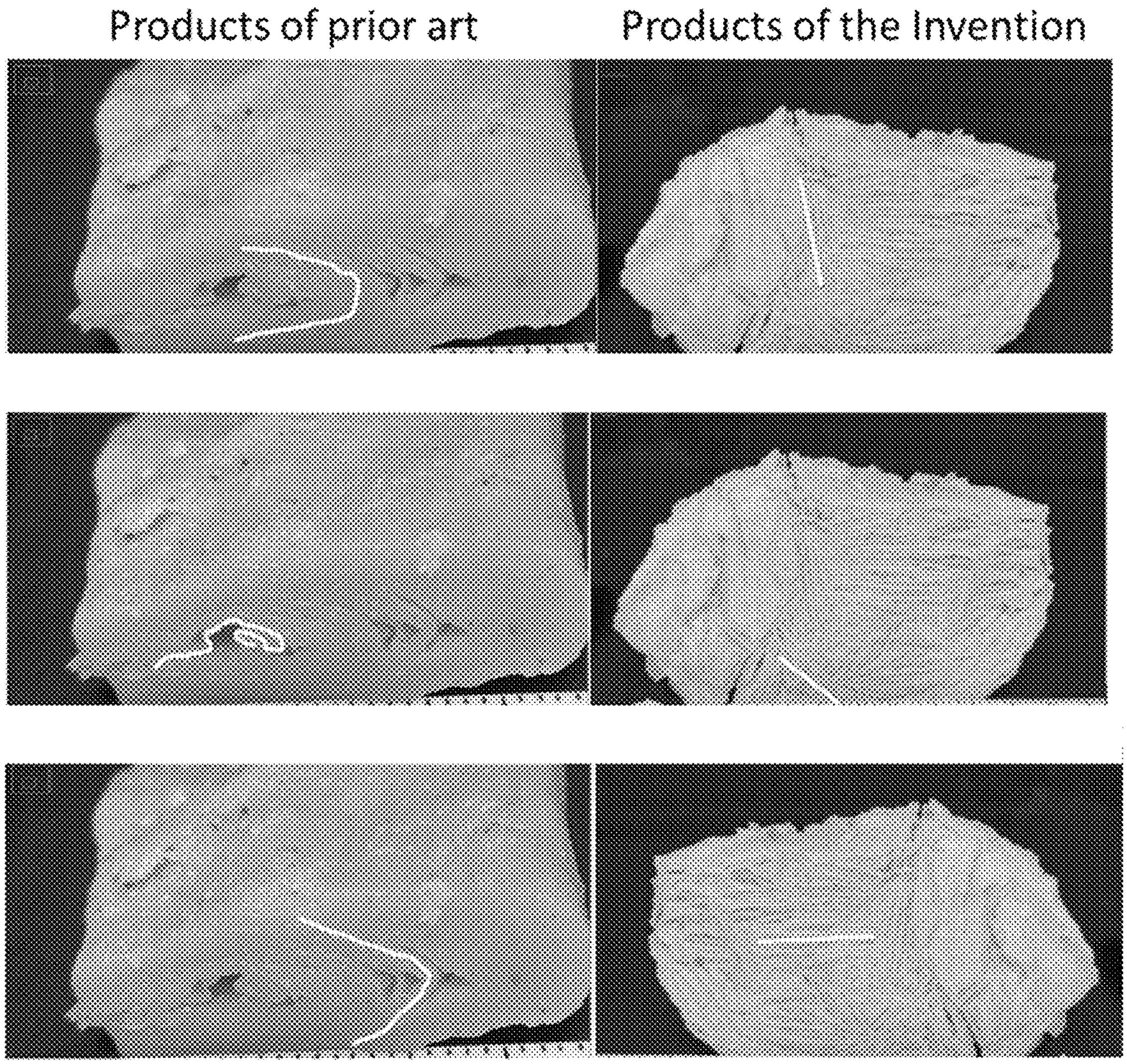
FIG. 21 shows the image analysis carried out on the left on products of the prior art and on the right on those of the invention.

Finally, fibre length could be measured by following a fibre from one end to the other (see FIG. 21: left, products from the market; right, products from the invention).

The image was then binarised using the "Type→8 bit" function, which allows the image to be coloured in shades of grey, and "Adjust→Threshold", which allows the fibres and inter-fibre spaces to be separated into black and white elements. The fibre density could then be measured with the "Measure" function, which indicates the percentage of the image occupied by black elements.

Statistics

The tests were performed in triplicates, unless otherwise stated. A two-way analysis of variance (ANOVA) was used to determine the variable parameters with a significant influence on the characteristics of the finished product, combined with a Tukey test to check the statistical significance between samples at the 95% confidence level. The analyses were performed with the XLSTAT Software® version 2021.2 (Addinsoft, Paris, France).

For each of the characteristics (firmness, cohesion, degree of fibrousness, chewability, moisture content), a different superscript letter between 2 samples indicates a significant difference, while the same letter indicates statistically similar samples. Measurements and exponents cannot be compared between 2 different characteristics.

Example 1

1. Materials & Methods 1.1 Recipe

TABLE 2

Recipes using soy protein isolate (SPI)

| Ingredients (for 100 g) | Recipe #1 Acid-free | Recipe #2 With acid |
|---|---|---|
| | Quantity (g) | |
| Initial mix | | |
| Soy protein isolate (SPI) | 13.33 | 13.33 |
| Amount of protein | 11.66 | 11.66 |
| NaCl from the isolate | 0.37 | 0.37 |
| Moisture from the isolate | 0.57 | 0.57 |
| NaCl | 0.66 | 0.66 |
| Distilled water | 84.13 | 84.13 |
| 1st addition | | |
| Enzyme solution | 1.38 | 1.38 |
| Microbial transglutaminase (mTG) powder | 0.23 | 0.23 |
| Distilled water | 1.15 | 1.15 |
| Adding water | 0 | 0 |
| 2nd addition | | |
| Citric acid solution | 0 | 0.5 |
| Citric acid monohydrate | 0 | 0.25 |
| Real citric acid from citric acid monohydrate | 0 | 0.22 |
| Moisture from citric acid monohydrate | 0 | 0.03 |
| Distilled water | 0 | 0.25 |
| Adding water | 0.5 | 0 |
| Total | 100 | 100 |
| Total water mass (g) | 86.35 | 86.13 |
| Total solid mass (g) | 13.65 | 13.87 |
| Total NaCl mass (g) | 1.03 | 1.03 |

TABLE 3

Recipes using pea protein isolate (PPI)

| Ingredients (for 100 g) | Recipe #1 Acid-free | Recipe #2 With acid |
|---|---|---|
| | Quantity (g) | |
| Initial mix | | |
| Pea protein isolate (PPI) | 17.86 | 17.86 |
| Amount of protein | 14.29 | 14.29 |
| NaCl from the isolate | 0.45 | 0.45 |
| Moisture from the isolate | 1.16 | 1.16 |
| NaCl | 0.58 | 0.58 |
| Distilled water | 78.88 | 78.88 |
| 1st addition | | |
| Enzyme solution | 1.74 | 1.74 |
| Microbial transglutaminase (mTG) powder | 0.29 | 0.29 |
| Distilled water | 1.45 | 1.45 |
| Adding water | 0 | 0 |
| 2nd addition | | |
| Citric acid solution | 0 | 0.94 |
| Citric acid monohydrate | 0 | 0.47 |
| Real citric acid from citric acid monohydrate | 0 | 0.42 |
| Moisture from citric acid monohydrate | 0 | 0.05 |
| Distilled water | 0 | 0.47 |
| Adding water | 0.94 | 0 |
| Total | 100 | 100 |
| Total water mass (g) | 82.43 | 82.01 |
| Total solid mass (g) | 17.57 | 17.99 |
| Total NaCl mass (g) | 1.03 | 1.03 |

1.2. Protocol

The amount of enzyme (BDF PROBIND® TXo) was set at the maximum amount recommended by the supplier (BDF Ingredients) i.e. 0.02 g/g of protein and mixtures of 400 g (i.e. 4 times the amount in the tables below) were prepared for each of the tests below The NaCl was first dissolved in distilled water in a cutting robot (Cook robot, marketed by Robot-Coupe®) at 250 rpm for 2 minutes at room temperature. The pea or soy protein was then added and left to hydrate for 30 minutes under agitation at 250 rpm to obtain a salted protein solution. The cutting robot was then fitted with 2 thermocouples to monitor the surface and core temperatures of the salted protein solution. The cutting robot was heated to 50 °C and the stirring speed was increased to 360 rpm. The salted protein solution was then transferred to a bowl and incubated for 1 h or 2 h at 50 °C in an oven in the presence of enzyme. Afterwards, the bowl was placed in a freezer (−24 °C) in order to cool the salted and enzyme-treated protein solution to 5 °C. The salted and enzymatically treated protein solutions made from pea proteins were then mixed with a spatula to homogenise them. The salted and enzymatically treated protein solutions made from soy protein were remixed in the food method or at 4,500 rpm for 3×3 seconds to homogenise them. A citric acid solution was then gradually added to part of the said salted and enzymatically treated protein solutions until a pH of 5.6 was reached (Recipe #2). The same amount of water was added to the other enzymatically treated salt protein solutions (Recipe #1). 55 g of the said salted, enzymatically treated and optionally acidified protein solutions were poured into 4 insulated aluminium cups and then covered with plastic film before being placed in a freezer at −24 °C. (GGPv 1470 Profiline, Liebherr, Germany, with a non-ventilated cooling system and a coolant) 40 h later, the cups were heated to 180 °C for 18 minutes for the soy-based recipes and 25 minutes for the pea-based recipes in a preheated forced-air oven so as to cook said salted, enzymatically treated and optionally acidified protein solutions. After this cooking, the said salted, enzymatically treated, optionally acidified and cooked protein solutions were removed from the mould (hereinafter referred to as samples).

1.3 Measuring pH and Moisture Content

See above.

1.4. Texture Analysis

See above.

1.5. Assessment of the Degree of Fibrosity

See above.

1.6. Measurement of Viscoelasticity

See above.

1.7 Statistics

See above.

1.8. Products & Suppliers

Soy protein SUPRO® 620 IP (Solae)
Pea protein Empro® E 86 HV (Emsland-Starke GmbH)
NaCl Sodium Chloride≥99.5% (Fisher Scientific)
Transglutaminase PROBIND® TXo (BDF Ingredients)
Citric acid (Citric Acid Monohydrate, Caldic)

2. Results 2.1. Texture, Anisotropy and Moisture Content Analyses

TABLE 4

Results of texture (protocol a), anisotropy and moisture content analyses

| Samples | Firmness (g) | Cohesion | Chewability (g) | Degree of fibrousness | Moisture content (%) |
|---|---|---|---|---|---|
| Peas 1 h, acid-free | | | | >1 | |
| Peas 1 h, with acid | 1396 ± 61[c] | 0.71 ± 0.02[c] | 994 ± 37[a] | >1 | 72.89 ± 0.73[a] |
| Peas 2 h, acid-free | 878 ± 68[d] | 0.54 ± 0.06[b] | 473 ± 24[b] | <1 | 76.46 ± 0.18[b] |
| Peas 2 h, with acid | 1436 ± 107[c] | 0.69 ± 0.03[c] | 995 ± 116[a] | >1 | 72.39 ± 0.73[a] |
| Soya 1 h, acid-free | 1166 ± 156[c] | 0.91 ± 0.16[b] | 1045 ± 102[a] | >1 | 80.73 ± 0.91[b] |
| Soya 1 h, with acid | 1311 ± 87[b] | 0.77 ± 0.04[b] | 1004 ± 87[a, b] | >1 | 78.10 ± 0.49[c] |
| Soya 2 h, acid-free | 792 ± 110[c] | 0.86 ± 0.02[b] | 684 ± 105[b] | >1 | 81.73 ± 0.61[b] |
| Soya 2 h, with acid | 1125 ± 95[b, c] | 0.82 ± 0.01[b] | 926 ± 83[a, b] | >1 | 78.22 ± 0.28[c] |

All values are the mean ± standard deviation of three replicates. Means in a column with different letters are significantly different ($p < 0.05$) and data were treated separately for each of the SPI and PPI.

After the implementation of this example it was found that:

- The addition of acid increases the firmness of the product after 1 hour of incubation and even more after 2 hours;
- the addition of acid increases the chewability of the product after 1 hour and after 2 hours of incubation when using pea proteins;
- Samples with acid are less elastic and easier to break than those without acid, and they also have less moisture;
- Soy products are firmer and more "chewy" than pea products.

2.2 Measurement of Viscoelasticity

All the protein solution samples (salted or not and/or enzymatically treated or not) showed a viscoelasticity tan δ lower than 1 over the range.

2.3. Photographs

Figure 4:
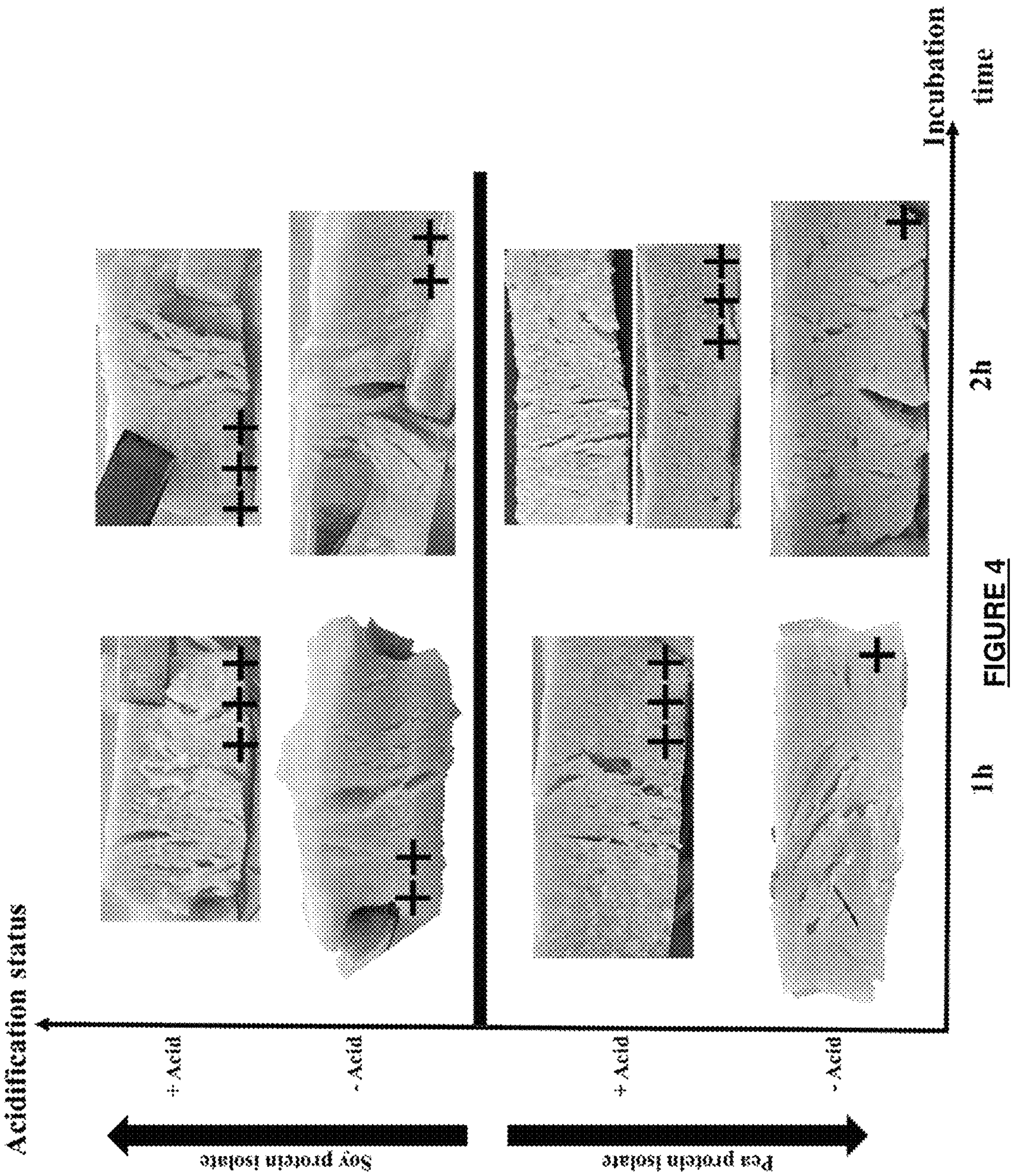
FIG. 4 shows all the fibrous or laminated, and textured food products obtained after the implementation of Example 1.

After the implementation of this example, the resulting fibrous or laminated, and textured food products were photographed (see FIG. 4).

Example 2

1. Materials & Methods
1.1 Recipe

TABLE 5

| Recipes using soy protein isolate (SPI) | | |
|---|---|---|
| Ingredients | Original recipe for 100 g Quantity (g) | Recipe for 800 g Quantity (g) |
| Initial mix | | |
| Soy protein isolate | 13.33 | 106.64 |
| Amount of protein | 11.66 | 93.28 |
| NaCl from the isolate | 0.37 | 2.96 |
| Moisture from the isolate | 0.57 | 4.56 |
| NaCl | 0.66 | 5.28 |
| Distilled water | 85.39 | 683.12 |
| Sunflower oil | 5 | 40 |
| 1st addition | | |
| Enzyme solution | 0.12 | 0.96 |
| Microbial transglutaminase (mTG) powder | 0.12 | 0.96 |
| Distilled water | 0 | 0 |
| Adding water | 0 | 0 |
| 2nd addition: acid until target pH is reached | | |
| Citric acid solution | 0.5 | 4 |
| Citric acid monohydrate | 0.25 | 2 |
| Real citric acid from citric acid monohydrate | 0.22 | 1.76 |
| Moisture from citric acid monohydrate | 0.03 | 0.24 |
| Distilled water | 0.25 | 2 |
| Adding water | 0 | 0 |
| Total | 100 | 800 |
| Total water mass (g) | 86.24 | 685.36 |
| Total solid mass (g) | 13.76 | 114.64 |
| Total NaCl mass (g) | 1.03 | 5.28 |

1.2. Protocol
1.2.1. Saline Protein Solution and Hydration

The water and NaCl were mixed in a blender (Cook robot, commercialised by Robot-Coupe®) at 250 rpm for 2 min to diffuse the NaCl into the water. The protein isolate powder was then added and mixed at 250 rpm for 5 min. The edges of the bowl were scraped to avoid the accumulation of unhydrated powder on the sides and the resulting saline protein solution was again mixed at 250 rpm for 25 min, for a total hydration time of 30 min.

1.2.2. Adding the Oil

Oil was added and mixed at 250 rpm for 10 min.

1.2.3. Enzymatic Treatment

The mixer was equipped with 2 thermocouples to measure the surface and core temperatures of the mixture. The salted protein solution was heated by holding the mixture at 250 rpm until the core temperature reached 50 °C. Once this temperature was reached, the enzyme (or enzyme solution if dispersed in water) was added and incubated for 1 hour with gentle agitation.

1.2.4. Heating

Heating to 95 °C was programmed on the mixer while restarting a mixing speed of 250 rpm. Once a core temperature of 80 °C was reached, the salted and enzymatically treated protein solution was kept under agitation for 10 min at 80 °C.

1.2.5. Cooling and Acidification

The enzymatically treated salt protein solution was cooled as quickly as possible. For this purpose, the container containing the enzymatically treated and salted solution was placed in a water bath at 4 °C and the enzymatically treated salted solution was stirred by hand with a spatula. The temperature was monitored by a thermocouple immersed in the protein solution until it reached 5 °C core temperature. The salted and enzymatically treated protein solution was then separated into 2 samples, and one of the two samples was acidified with citric acid until a pH of 5.6 was reached.

1.2.6. Freezing

The above 2 samples (acidified and non-acidified) were then frozen in a conventional convection freezer at −24 °C.

1.3. Products & Suppliers

Soy protein SUPRO® 620 IP (Solae)
Vegetable oil Sunflower oil (Buttercup)®
NaCl Sodium Chloride≥99.5% (Fisher Scientific)
Transglutaminase PROBIND® TXo (BDF Ingredients)
Citric acid (Citric Acid Monohydrate, Caldic)

2. Results

Figure 5:
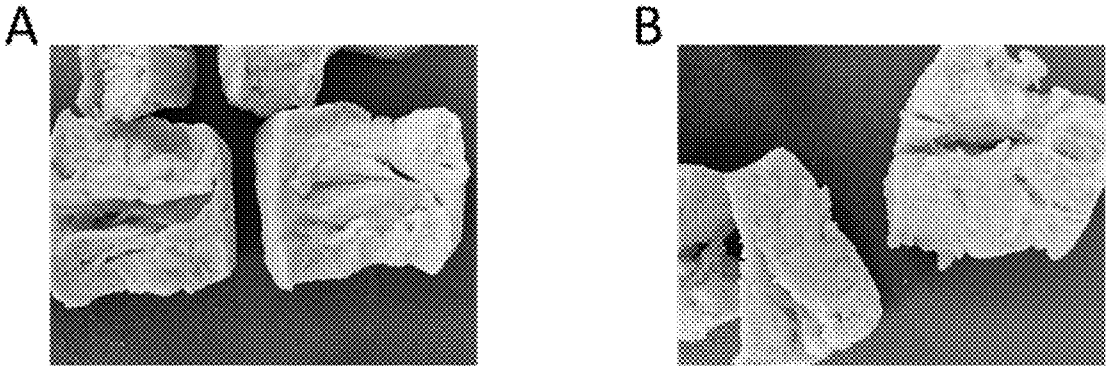
FIG. 5 shows all the fibrous or laminated, and textured food products obtained after the implementation of Example 2. (A) The salted and enzymatically treated protein solution was not acidified (pH 7.5). (B) The salted and enzymatically treated protein solution was acidified (pH 5.6)

After the implementation of this example, the resulting fibrous or laminated, and textured food products were photographed (see FIG. 5). Briefly:

- the salted, enzymatically treated, non-acidified protein solution (pH 7.5) resulted, after freezing, in a very firm, cohesive, fibrous or laminated, and textured food product with fibres throughout (see FIG. 5A); and
- The salted, enzymatically treated, acidified protein solution (pH 5.6) resulted, after freezing, in a firm, cohesive, fibrous, laminated, textured food product with a slightly granular appearance (see FIG. 5B).

It was also found that:

- the fat, in a concentration from 0% to 20% of the total mass of the product, does not prevent the formation of fibres;
- the acid is not necessary for the formation of the fibres.
- micronutrients do not prevent fibre formation
- the aromatic molecules in a concentration from 0% to 10% of the total mass of the product do not prevent the formation of fibres
- the dietary fibres, in a concentration from 0% to 5% of the total mass of the product, do not prevent the formation of fibres.

Example 3

1. Materials & Methods
1.1 Recipe

TABLE 6

| Recipe using soy protein isolate (SPI) | |
|---|---|
| Ingredients | Recipe for 2 102 g Quantity (g) |
| Initial mix | |
| Soy protein isolate | 213.28 |
| Amount of protein | 186.56 |
| NaCl from the isolate | 5.92 |
| Moisture from the isolate | 9.12 |
| NaCl | 10.56 |
| Distilled water | 1 848.08 |
| 1st addition | |
| Enzyme solution | 22.08 |
| Microbial transglutaminase (mTG) powder | 3.68 |
| Distilled water | 18.4 |
| Adding water | 0 |

TABLE 6-continued

| Recipe using soy protein isolate (SPI) | |
|---|---|
| Ingredients | Recipe for 2 102 g Quantity (g) |
| 2nd addition: acid until target pH is reached | |
| Citric acid solution | 8 |
| Citric acid monohydrate | 4 |
| Real citric acid from citric acid monohydrate | 3.52 |
| Moisture from citric acid monohydrate | 0.48 |
| Distilled water | 4 |
| Adding water | 0 |
| Total | 2 102 |
| Total water mass (g) | 1 880.08 |
| Total solid mass (g) | 221.92 |
| Total NaCl mass (g) | 16.48 |

1.2. Protocol 1.2.1. Mixing and Hydration

The water and NaCl were mixed in a blender (Cook robot, commercialised by Robot-Coupe®) at 250 rpm for 2 min to diffuse the NaCl into the water. The protein isolate powder was then added and mixed at 250 rpm for 5 min. The edges of the bowl were scraped to avoid the accumulation of unhydrated powder on the sides and the resulting saline protein solution was again mixed at 250 rpm for 25 min, for a total hydration time of 30 min.

1.2.2. Enzymatic Treatment

The mixer was equipped with 2 thermocouples to measure the surface and core temperatures of the mixture. The salted protein solution was heated by holding the mixture at 250 rpm until the core temperature reached 50 °C. Once this temperature was reached, the enzyme (or enzyme solution if dispersed in water) was added and incubated for 1 hour with gentle agitation.

1.2.3. Heating

Heating to 95 °C was programmed on the mixer while restarting a mixing speed of 250 rpm. Once a core temperature of 80 °C was reached, the salted and enzymatically treated protein solution was kept under agitation for 10 min at 80 °C.

1.2.4. Cooling and Acidification

The enzymatically treated salt protein solution was cooled as quickly as possible. For this purpose, the container containing the enzymatically treated salted solution was placed in a water bath at 4 °C and the enzymatically treated salted solution was stirred by hand with a spatula. The temperature was monitored by a thermocouple immersed in the protein solution until it reached 5 °C core temperature. The enzymatically treated saline protein solution was then separated into 7 samples, 6 of which were respectively acidified with citric acid to a pH of 6.5, 6, 5.5, 5, 4.5 and 4.

1.2.5. Freezing

The above 7 samples (acidified and non-acidified) were then frozen in a conventional convection freezer at −24 °C.

1.3. Products & Suppliers

Soy protein SUPRO® 620 IP (Solae)

NaCl Sodium Chloride≥99.5% (Fisher Scientific)

Transglutaminase PROBIND® TXo (BDF Ingredients)

Citric acid (Citric Acid Monohydrate, Caldic)

2. Results

Figure 6:
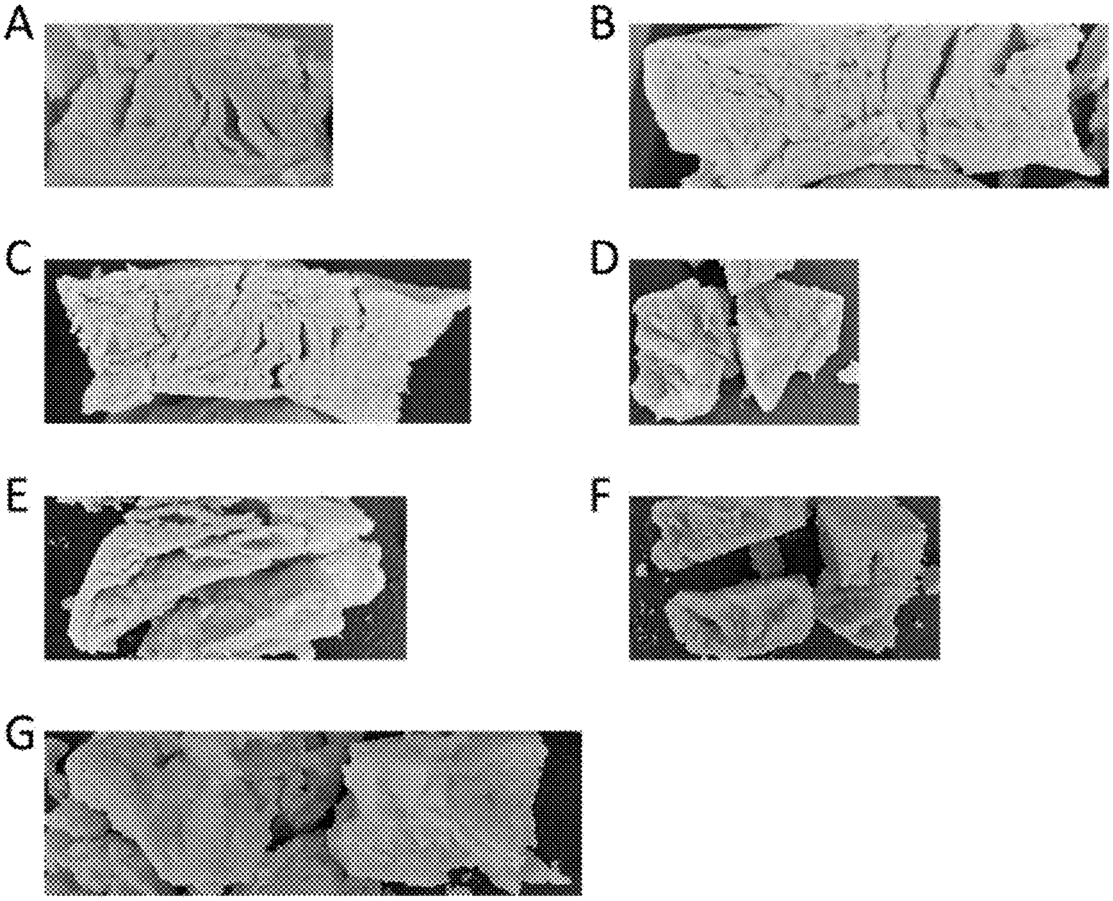
FIG. 6 shows all the fibrous or laminated, and textured food products obtained after the implementation of Example 3. (A) The enzymatically treated salted protein solution has not been acidified (pH 7.2). (B) The enzymatically treated salt protein solution was acidified (pH 6.5). (C) The enzymatically treated saline protein solution was acidified (pH 6). (D) The enzymatically treated saline protein solution was acidified (pH 5.5). (E) The enzymatically treated saline protein solution was acidified (pH 5). (F) The enzymatically treated saline protein solution was acidified (pH 4.5). (G) The enzymatically treated salted protein solution was acidified (pH 4).

After the implementation of this example the resulting fibrous and textured food products were photographed (see FIG. 6). Briefly:

The salted, enzymatically treated, non-acidified protein solution (pH 7.2) resulted, after freezing, in a fibrous and textured food product that was not brittle, firm and cohesive, and had visible fibres (see FIG. 6A);

The salted, enzymatically treated, acidified protein solution (pH 6.5) resulted, after freezing, in a fibrous and textured food product that was not brittle, firm and cohesive, and had visible fibres (see FIG. 6B);

The salted, enzymatically treated, acidified protein solution (pH 6) resulted, after freezing, in a fibrous and textured food product that was not brittle, firm and cohesive, and with visible fibres (see FIG. 6C);

The enzymatically treated, acidified (pH 5.5), salted protein solution resulted in a fibrous, textured food product with visible fibres after freezing (see FIG. 6D);

The enzymatically treated, acidified (pH 5), salted protein solution resulted in a fibrous, textured food product with visible fibres after freezing (see FIG. 6E);

the enzymatically treated, acidified (pH 4.5), salted protein solution resulted in a fibrous, textured food product with visible fibres after freezing (see FIG. 6F); and The enzymatically treated, acidified (pH 4), salted protein solution resulted in a fibrous, textured food product with visible fibres after freezing (see FIG. 6G).

Example 4

1. Materials & Methods 1.1 Recipe

TABLE 7

| Recipe using soy protein isolate (SPI) | |
|---|---|
| Ingredients | Recipe for 2 102 g Quantity (g) |
| Initial mix | |
| Soy protein isolate | 213.28 |
| Amount of protein | 186.56 |
| NaCl from the isolate | 5.92 |
| Moisture from the isolate | 9.12 |
| NaCl | 10.56 |
| Distilled water | 1,848.08 |
| 1st addition | |
| Enzyme solution | 22.08 |
| Microbial transglutaminase (mTG) powder | 3.68 |
| Distilled water | 18.4 |
| Adding water | 0 |
| 2nd addition | |
| Citric acid solution | 8 |
| Citric acid monohydrate | 4 |
| Real citric acid from citric acid monohydrate | 3.52 |
| Moisture from citric acid monohydrate | 0.48 |
| Distilled water | 4 |
| Adding water | 0 |
| Total | 2,102 |
| Total water mass (g) | 1,880.08 |
| Total solid mass (g) | 221.92 |
| Total NaCl mass (g) | 16.48 |

1.2. Protocol 1.2.1. Mixing and Hydration

The water and NaCl were mixed in a blender (Cook robot, commercialised by Robot-Coupe®) at 250 rpm for 2 min to diffuse the NaCl into the water. The protein isolate powder was then added and mixed at 250 rpm for 5 min. The edges of the bowl were scraped to avoid the accumulation of unhydrated powder on the sides and the resulting saline protein solution was again mixed at 250 rpm for 25 min, for a total hydration time of 30 min.

1.2.2. Enzymatic Treatment

The mixer was equipped with 2 thermocouples to measure the surface and core temperatures of the mixture. The salted protein solution was heated by holding the mixture at 250 rpm until the core temperature reached 50 °C. Once this temperature was reached, the enzyme (or enzyme solution if dispersed in water) was added and incubated for 1 hour with gentle agitation.

1.2.3. Heating

Heating to 95 °C was programmed on the mixer while restarting a mixing speed of 250 rpm. Once a core temperature of 80 °C was reached, the salted and enzymatically treated protein solution was kept under agitation for 10 min at 80 °C.

1.2.4. Cooling and Acidification

The enzymatically treated salt protein solution was cooled as quickly as possible. For this purpose, the container containing the enzymatically treated salted solution was placed in a water bath at 4 °C and the enzymatically treated salted solution was stirred by hand with a spatula. The temperature was monitored by a thermocouple immersed in the protein solution until it reached 5 °C core temperature. The salted and enzymatically treated protein solution was then acidified with citric acid to a pH of 5.5.

1.2.5. Freezing

Prior to freezing, the salted, enzymatically treated, acidified protein solution was separated into several samples, which were placed either in a canister, a double-walled cup or a silicone cylinder. These samples were then frozen in a conventional convection freezer at −24 °C.

1.3. Products & Suppliers

Soy protein SUPRO® 620 IP (Solae)

NaCl Sodium Chloride≥99.5% (Fisher Scientific)

Transglutaminase PROBIND® TXo (BDF Ingredients)

Citric acid (Citric Acid Monohydrate, Caldic)

2. Results

Figure 7:
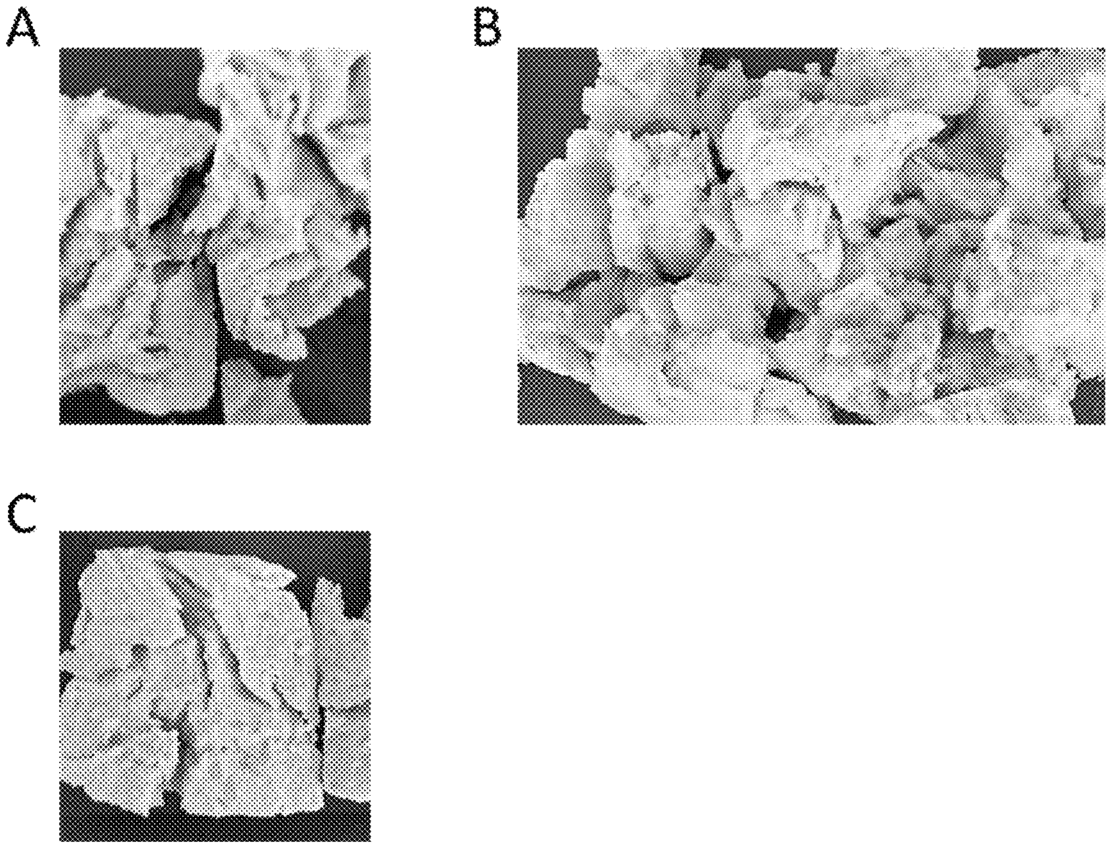
FIG. 7 shows all the fibrous or laminated, and textured food products obtained after the implementation of Example 4. (A) The enzymatically treated, acidified (pH 5.5), salted protein solution was frozen in a can. (B) The enzymatically treated, acidified (pH 5.5), salted protein solution was frozen in a double-walled cup. (C) The enzymatically treated, acidified (pH 5.5), salted protein solution was frozen in a silicone cylinder.

After the implementation of this example, the resulting fibrous or laminated, and textured food products were photographed (see FIG. 7). Briefly:

The enzymatically treated, acidified (pH 5.5), salted protein solution frozen in a can resulted in a 6 cm high fibrous or laminated, and textured food product with visible fibres (see FIG. 7A);

the salted, enzymatically treated, acidified (pH 5.5) protein solution frozen in a double-walled cup resulted in a 5 cm high fibrous or laminated, and textured food product with visible fibres (see FIG. 7B); and The enzymatically treated, acidified (pH 5.5), salted protein solution frozen in a silicone cylinder resulted in a textured, fibrous or laminated food product 6 cm high with visible fibres (see FIG. 7C).

Example 5

1. Materials & Methods 1.1 Recipe

TABLE 8

| Recipe using soy protein isolate (SPI) | |
|---|---|
| Ingredients | Recipe for 100 g Quantity (g) |
| Initial mix | |
| Soy protein isolate | 13.33 |
| Amount of protein | 11.66 |
| NaCl from the isolate | 0.37 |
| Moisture from the isolate | 0.57 |
| NaCl | 0.66 |
| Distilled water | 85.92 |
| 1st addition | |
| Enzyme solution | 0.12 |
| Microbial transglutaminase (mTG) powder | 0.12 |
| Distilled water | 0 |
| Adding water | 0 |
| Adding water | 0 |
| Total | 100 |
| Total water mass (g) | 86.49 |
| Total solid mass (g) | 13.51 |
| Total NaCl mass (g) | 1.03 |

1.2. Protocol 1.2.1. Mixing and Hydration

The water and NaCl were mixed in a blender (Cook robot, commercialised by Robot-Coupe®) at 250 rpm for 2 min to diffuse the NaCl into the water. The protein isolate powder was then added and mixed at 250 rpm for 5 min. The edges of the bowl were scraped to avoid the accumulation of unhydrated powder on the sides and the resulting saline protein solution was again mixed at 250 rpm for 25 min, for a total hydration time of 30 min.

1.2.2. Enzymatic Treatment

The mixer was equipped with 2 thermocouples to measure the surface and core temperatures of the mixture. The salted protein solution was heated by holding the mixture at 250 rpm until the core temperature reached 50 °C. Once this temperature was reached, the enzyme (or enzyme solution if dispersed in water) was added and incubated for 1 hour with gentle agitation.

1.2.3. Heating

Heating to 95 °C was programmed on the mixer while restarting a mixing speed of 250 rpm. Once a core temperature of 80 °C was reached, the salted and enzymatically treated protein solution was kept under agitation for 10 min at 80 °C.

1.2.4. Cooling

The enzymatically treated salt protein solution was cooled as quickly as possible. For this purpose, the container containing the enzymatically treated salted solution was placed in a water bath at 4 °C and the enzymatically treated salted solution was stirred by hand with a spatula. The temperature was monitored by a thermocouple immersed in the protein solution until it reached 4 °C core temperature (cold water bath). The salted and enzymatically treated protein solution was then stored for 17 hours at 4 °C.

1.2.5. Freezing

Prior to freezing, the salted and enzymatically treated protein solution was remixed in a blender and then distributed in samples in silicone cylinders or insulated cans. It was then frozen either in a Silversas™ (Air Liquide) at −120 °C or in a cryogenic chamber (DOH-BOX Model 4300, by Dohmeyer) at 0 °C which goes down to −25 °C at a rate of −5 °C/h.

1.2.6. Cooking

One week after freezing, the samples were baked at 180 °C for 18 minutes in a preheated forced-air oven.

1.3. Products & Suppliers

Soy protein SUPRO® 620 IP (Solae)

NaCl Sodium Chloride≥99.5% (Fisher Scientific)

Transglutaminase PROBIND® TXo (BDF Ingredients)

2. Results

Figure 8:
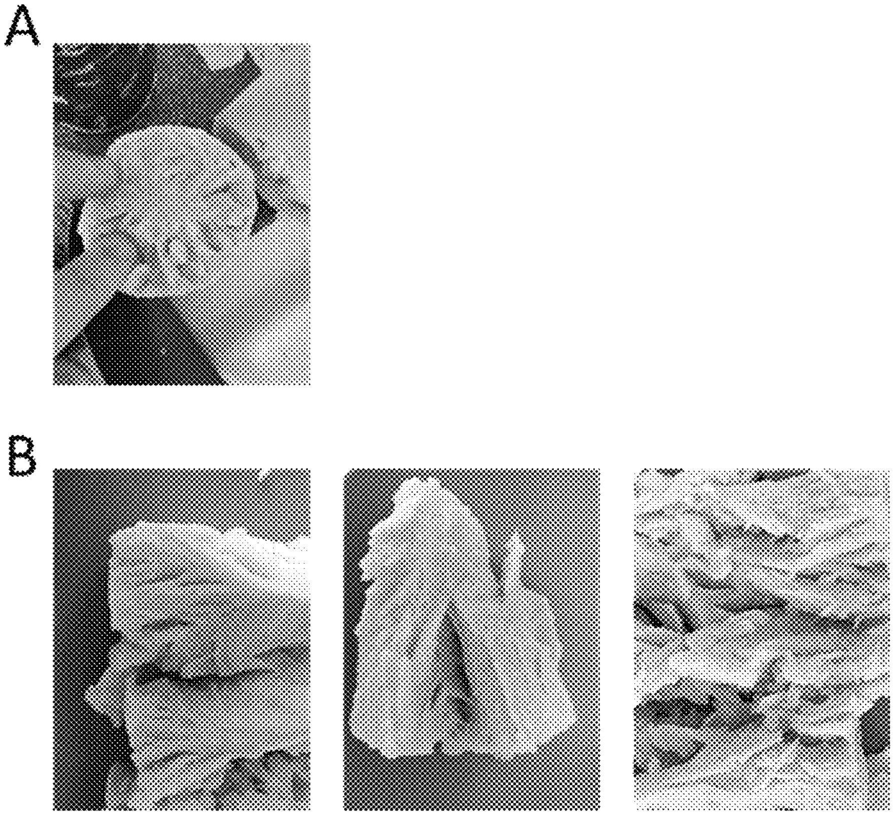
FIG. 8 shows all the fibrous or laminated, and textured food products obtained after the implementation of Example 5. (A) The enzymatically treated salted protein solution (pH 7.5) was frozen in Silversas at −120 °C (B) The enzymatically treated salted protein solution (pH 7.5) was frozen in a cryogenic chamber, from 0 to −25 °C at a rate of −5 °C/min.

After the implementation of this example the resulting fibrous or laminated, and textured food products were photographed (see FIG. 8). Briefly, the results were similar between the samples frozen in silicone and those frozen in insulated cans.

Example 6

1. Materials & Methods 1.1 Recipe

TABLE 9

| Recipe using soy protein isolate (SPI) | |
|---|---|
| Ingredients (for 100 g) | Recipe #1<br>No added acid<br>30 min enzyme incubation<br>Quantity (g) |
| Initial mix | |
| Soy protein isolate | 13.33 |
| Amount of protein | 11.66 |
| NaCl from the isolate | 0.37 |
| Moisture from the isolate | 0.57 |
| NaCl | 0.66 |
| Distilled water | 85.92 |
| 1st addition | |
| Enzyme solution | 0.72 |
| Microbial transglutaminase (mTG) powder | 0.12 |
| Distilled water | 0.6 |
| Adding water | 0 |
| Adding water | 0 |
| Total | 100 |
| Total water mass (g) | 86.46 |
| Total solid mass (g) | 13.54 |
| Total NaCl mass (g) | 1.03 |

TABLE 10

| Recipes using soy protein isolate (SPI) | |
|---|---|
| Ingredients (for 100 g) | Recipe #2<br>No added acid<br>1 h enzyme incubation -<br>25% enzyme<br>Quantity (g) |
| Initial mix | |
| Soy protein isolate | 13.33 |
| Amount of protein | 11.66 |
| NaCl from the isolate | 0.37 |
| Moisture from the isolate | 0.57 |
| NaCl | 0.66 |
| Distilled water | 85.65 |
| 1st addition | |
| Enzyme solution | 0.36 |
| Microbial transglutaminase (mTG) powder | 0.06 |
| Distilled water | 0.3 |
| Adding water | 0 |
| Adding water | 0 |
| Total | 100 |
| Total water mass (g) | 86.52 |
| Total solid mass (g) | 13.48 |
| Total NaCl mass (g) | 1.03 |

1.2. Protocol 1.2.1. Mixing and Hydration

The water and NaCl were mixed in a blender (Cook robot, commercialised by Robot-Coupe®) at 250 rpm for 2 min to diffuse the NaCl into the water. The protein isolate powder was then added and mixed at 250 rpm for 5 min. The edges of the bowl were scraped to avoid the accumulation of unhydrated powder on the sides and the resulting saline protein solution was again mixed at 250 rpm for 25 min, for a total hydration time of 30 min.

1.2.2. Enzymatic Treatment

The mixer was equipped with 2 thermocouples to measure the surface and core temperatures of the mixture. The salted protein solution was heated by holding the mixture at 250 rpm until the core temperature reached 50 °C. Once this temperature was reached, the enzyme (or enzyme solution if dispersed in water) was added and incubated for 30 minutes (#1) or 1 hour (#2) with gentle agitation.

1.2.3. Heating

Heating to 95 °C was programmed on the mixer while restarting a mixing speed of 250 rpm. Once a core temperature of 80 °C was reached, the salted and enzymatically treated protein solution was kept under agitation for 10 min at 80 °C.

1.2.4. Cooling

The enzymatically treated salt protein solution was cooled as quickly as possible. For this purpose, the container containing the enzymatically treated salted solution was placed in a water bath at 4 °C and the enzymatically treated salted solution was stirred by hand with a spatula. The temperature was monitored by a thermocouple immersed in the protein solution until it reached 4 °C core temperature (cold water bath).

1.2.5. Freezing

Prior to freezing, the salted and enzymatically treated protein solution was divided into samples in insulated aluminium cups and then frozen in a conventional freezer at −24 °C.

1.2.6. Cooking

The day after freezing, the frozen samples were baked at 180 °C for 18 minutes in a preheated forced-air oven.

1.3. Products & Suppliers

Soy protein SUPRO® 620 IP (Solae)

NaCl Sodium Chloride≥99.5% (Fisher Scientific)

Transglutaminase PROBIND® TXo (BDF Ingredients)

2. Results

Figure 9:
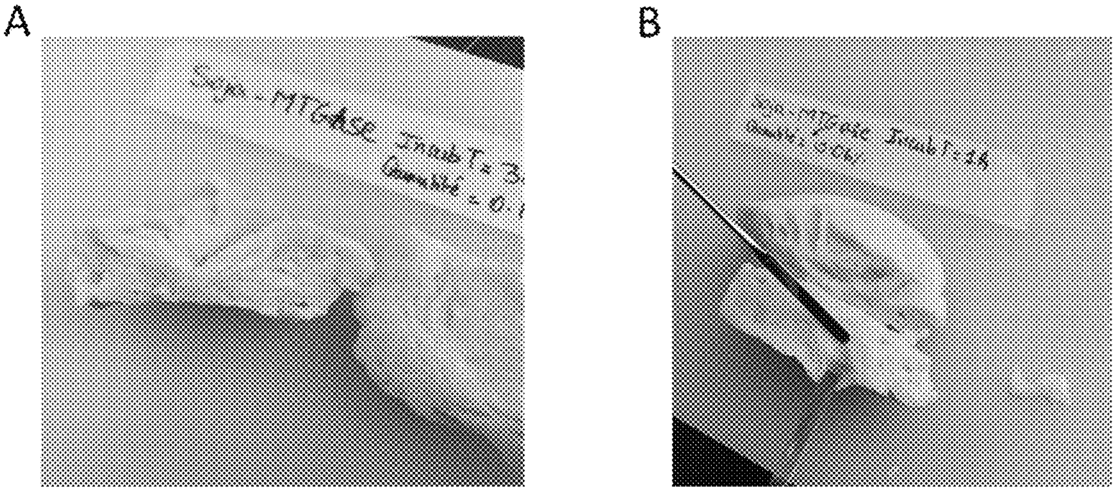
FIG. 9 shows all the fibrous or laminated, and textured food products obtained after the implementation of Example 6. (A) The salted protein solution was enzymatically treated with 0.12% enzyme incubated for 30 min at 50 °C (pH before freezing=7.3). (B) The saline protein solution was enzymatically treated with 0.06% enzyme incubated for 1 h at 50 °C (pH before freezing=7.3).

After the implementation of this example, the resulting fibrous or laminated, and textured food products were photographed (see FIG. 9). Briefly, the results showed that both samples (#1 and #2) have fibres and that the result is repeatable. The fibrous or laminated, and textured food products obtained are elastic.

Example 7

1. Materials & Methods 1.1 Recipe

TABLE 11

| Recipes using soy protein isolate (SPI) | | | |
|---|---|---|---|
| Ingredients (for 100 g) | Recipe #1 | Recipe #2 | Recipe #3 |
| | Quantity (g) | | |
| Initial mix | | | |
| Soy protein isolate (SPI) | 13.33 | 13.33 | 13.33 |
| Amount of protein | 11.66 | 11.66 | 11.66 |
| NaCl from the isolate | 0.37 | 0.37 | 0.37 |
| Moisture from the isolate | 0.57 | 0.57 | 0.57 |
| NaCl | 0.66 | 0.66 | 0.66 |
| Distilled water | 84.79 | 84.79 | 85.92 |
| 1st addition | | | |
| Enzyme solution | 0.72 | 0.72 | 0.09 |
| Microbial transglutaminase (mTG) powder | 0.12 | 0.12 | 0.09 |
| Distilled water | 0.6 | 0.6 | 0 |
| Adding water | 0 | 0 | 0 |
| 2nd addition (optional) | | | |
| Citric acid solution | 0.5 | 0 | 0 |
| Citric acid monohydrate | 0.25 | 0 | 0 |
| Real citric acid from citric acid monohydrate | 0.22 | 0 | 0 |
| Moisture from citric acid monohydrate | 0.03 | 0 | 0 |
| Distilled water | 0.25 | 0 | 0 |
| Adding water | 0 | 0.5 | 0 |
| Total | 100 | 100 | 100 |
| Total water mass (g) | 86.46 | 86.46 | 86.49 |
| Total solid mass (g) | 13.54 | 13.54 | 13.51 |
| Total NaCl mass (g) | 1.03 | 1.03 | 1.03 |

Recipe #1: The saline protein solution was enzymatically treated with 0.12% enzyme incubated for 30 min at 50 °C, then acidified to pH=6. Recipe #2: The saline protein solution was enzymatically treated with 0.12% enzyme incubated for 30 min at 50 °C (not acidified). Recipe #3: The saline protein solution was enzymatically treated with 0.09% enzyme incubated for 30 min at 50 °C (not acidified).

1.2. Protocol 1.2.1. Mixing and Hydration

The water and NaCl were mixed in a blender (Cook robot, commercialised by Robot-Coupe®) at 250 rpm for 2 min to diffuse the NaCl into the water. The protein isolate powder was then added and mixed at 250 rpm for 5 min. The edges of the bowl were scraped to avoid the accumulation of unhydrated powder on the sides and the resulting saline protein solution was again mixed at 250 rpm for 25 min, for a total hydration time of 30 min.

1.2.2. Enzymatic Treatment

The mixer was equipped with 2 thermocouples to measure the surface and core temperatures of the mixture. The salted protein solution was heated by holding the mixture at 250 rpm until the core temperature reached 50 °C. Once this temperature was reached, the enzyme (or enzyme solution if dispersed in water) was added at a concentration of 0.12% (Recipes #1 and #2) or 0.09% (Recipe #3) and incubated for 30 minutes.

1.2.3. Heating

Heating to 95 °C was programmed on the mixer while restarting a mixing speed of 250 rpm. Once a core temperature of 80 °C was reached, the salted and enzymatically treated protein solution was kept under agitation for 10 min at 80 °C.

1.2.4. Cooling (and Optionally Acidification)

The enzymatically treated salt protein solution was cooled as quickly as possible. For this purpose, the container containing the enzymatically treated salted solution was placed in a water bath at 4 °C and the enzymatically treated salted solution was stirred by hand with a spatula. The temperature was monitored by a thermocouple immersed in the protein solution until it reached 4 °C core temperature (cold water bath). If desired, the salted and enzymatically treated protein solution was acidified with citric acid to a pH of 6 (Recipe #1).

1.2.5. Freezing

Prior to freezing, the salted, enzymatically treated, and optionally acidified protein solution was sampled in insulated aluminium cups and then frozen in a conventional freezer at −24 °C.

1.2.6. Cooking

The day after freezing, the frozen samples were baked at 180 °C for 18 minutes in a preheated forced-air oven.

1.3. Products & Suppliers

Soy protein SUPRO® 620 IP (Solae)

NaCl Sodium Chloride≥99.5% (Fisher Scientific)

Transglutaminase PROBIND® TXo (BDF Ingredients)

Citric acid (Citric Acid Monohydrate, Caldic)

2. Results

Figure 10:
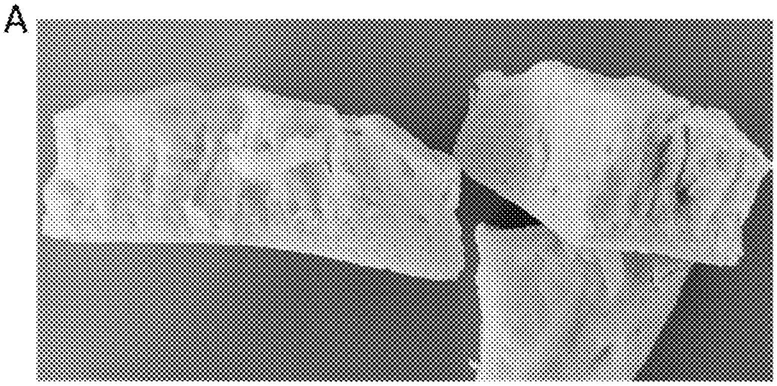
FIG. 10 shows all the fibrous or laminated, and textured food products obtained after the implementation of Example 7. (A) The salted protein solution was enzymatically treated with 0.12% enzyme incubated for 30 min at 50 °C and then acidified to pH=6. (B) The salted protein solution was enzymatically treated with 0.12% enzyme incubated for 30 min at 50 °C (not acidified). (C) The saline protein solution was enzymatically treated with 0.09% enzyme incubated for 30 min at 50 °C (not acidified).
Figure 10:
Figure 10:

After the implementation of this example, the resulting fibrous or laminated, and textured food products were photographed (see FIG. 10). Briefly:

- The salted protein solution, enzymatically treated (0.12% enzyme), and acidified (pH 6) resulted, after freezing and cooking, in a firm, elastic, fibrous or laminated, and textured food product with many visible fibres (see FIG. 10A);
- the salted, enzymatically treated (0.12% enzyme), non-acidified protein solution resulted, after freezing and cooking, in a firm, elastic, fibrous or laminated, and textured food product with visible fibres (see FIG. 10B); and
- The salted, enzymatically treated (0.09% enzyme), non-acidified protein solution resulted, after freezing and cooking, in a firm, elastic, fibrous or laminated, and textured food product with visible fibres (see FIG. 10C).

Example 8

1. Materials & Methods 1.1 Recipe

TABLE 12

Recipes using pea protein isolate (PPI)

| Ingredients (for 100 g) | Recipe #1 | Recipe #2 | Recipe #3 | Recipe #4 |
|---|---|---|---|---|
| | Quantity (g) | | | |
| Initial mix | | | | |
| Pea protein isolate (PPI) | 14.29 | 14.29 | 14.29 | 14.29 |
| Amount of protein | 12.00 | 12.00 | 12.00 | 12.00 |
| NaCl from the isolate | 0.36 | 0.36 | 0.36 | 0.36 |
| Moisture from the isolate | 0.87 | 0.87 | 0.87 | 0.87 |
| NaCl | 0.35 | 0.35 | 0.35 | 0.35 |
| Distilled water | 60.84 | 60.84 | 60.84 | 60.84 |
| 1st addition | | | | |
| $CaCl_2$ | 0.09 | 0.09 | 0.09 | 0.09 |
| Water of hydration $CaCl_2$ | 0.37 | 0.37 | 0.37 | 0.37 |
| 1st solution $CaCl_2$ | 0.47 | 0.47 | 0.47 | 0.47 |
| 2nd addition | | | | |
| Enzyme solution | 1.44 | 1.44 | 1.44 | 1.44 |
| Microbial transglutaminase (mTG) powder | 0.24 | 0.24 | 0.24 | 0.24 |
| Distilled water | 1.20 | 1.20 | 1.20 | 1.20 |
| 3rd addition | | | | |
| $CaCl_2$ | 0.33 | 0.33 | 0.33 | 0.33 |
| Water of hydration $CaCl_2$ | 1.32 | 1.32 | 1.32 | 1.32 |
| 2nd solution $CaCl_2$ | 1.65 | 1.65 | 1.65 | 1.65 |
| 4th addition (optional) | | | | |
| Citric acid solution | 0 | 0.96 | 0 | 0.96 |
| Citric acid monohydrate | 0 | 0.16 | 0 | 0.16 |
| Distilled water | 0 | 0.80 | 0 | 0.80 |
| Total | 80 | 80 | 80 | 80 |
| Total water mass (g) | 64.6 | 65.4 | 64.6 | 65.4 |
| Total solid mass (g) | 13.01 | 13.17 | 13.01 | 13.17 |
| Total NaCl mass (g) | 0.35 | 0.35 | 0.35 | 0.35 |

Recipe #1: The saline protein solution was enzymatically treated with 0.3% enzyme incubated for 60 min at 50 °C following the 2nd addition of $CaCl_2$. Recipe #2: The saline protein solution was enzymatically treated with 0.3% enzyme incubated for 60 min at 50 °C following the 2nd addition of $CaCl_2$. It was then cooled to 5 °C and acidified to pH=5.6. Recipe #3: The salted protein solution was enzymatically treated with 0.3% enzyme and incubated for 60 min at 50 °C before adding the 2nd addition of $CaCl_2$. Recipe #4: The saline protein solution was enzymatically treated with 0.3% enzyme incubated for 60 min at 50 °C before adding the 2nd addition of $CaCl_2$. It was then cooled to 5 °C and acidified to pH=5.6.

1.2. Protocol 1.2.1. Mixing and Hydration

The water and NaCl were mixed in a blender (Cook robot, commercialised by Robot-Coupe®) at 250 rpm for 2 min to diffuse the NaCl into the water. The protein isolate powder was then added and mixed at 250 rpm for 5 min. The edges of the bowl were scraped to avoid the accumulation of unhydrated powder on the sides and the resulting saline protein solution was again mixed at 250 rpm for 25 min, for a total hydration time of 30 min.

1.2.2. 1st Addition of $CaCl_2$)

The mixer was equipped with 2 thermocouples to measure the surface and core temperatures of the mixture. The 1st $CaCl_2$ solution was added to the mixer, then the salted protein solution was heated in the mixer to a core temperature of 70 °C, while maintaining a mixing speed of 250 rpm.

1.2.3. Enzymatic Treatment and 2nd Addition of CaCl2

The salted protein solution was cooled in a water bath at room temperature to a core temperature of 50 °C.

For recipes #1 and #2, the 2nd $CaCl_2$ solution was added, followed by the enzyme solution at a concentration of 0.3%. The enzyme was incubated for 60 min.

For recipes #3 and #4, the enzyme solution was added at a concentration of 0.3% and the enzyme was incubated for 60 min. The 2nd $CaCl_2$ solution was then added.

1.2.4. Cooling (and Optionally Acidification)

The enzymatically treated salt protein solution was cooled as quickly as possible. For this purpose, the container containing the enzymatically treated salted solution was placed in a water bath at 4 °C and the enzymatically treated salted solution was stirred by hand with a spatula. The temperature was monitored by a thermocouple immersed in the protein solution until it reached 4 °C core temperature (cold water bath). If desired, the salted and enzymatically treated protein solution was acidified with citric acid to a pH of 5.6 (Recipe #2 and Recipe #4).

1.2.5. Freezing

Prior to freezing, the salted, enzymatically treated, and optionally acidified protein solution was sampled in insulated aluminium dishes and then frozen in a conventional freezer at −24 °C.

1.2.6. Cooking

The day after freezing, the frozen samples were baked at 180 °C for 25 minutes in a preheated forced-air oven.

1.3. Products & Suppliers

Pea protein Empro® E 86 HV (Emsland-Starke GmbH)
NaCl Sodium Chloride≥99.5% (Fisher Scientific)
$CaCl_2$ Calcium Chloride>99% (Acros Organics)
Transglutaminase PROBIND® TXo (BDF Ingredients)
Citric acid (Citric Acid Monohydrate, Caldic)

2. Results

Figure 11:
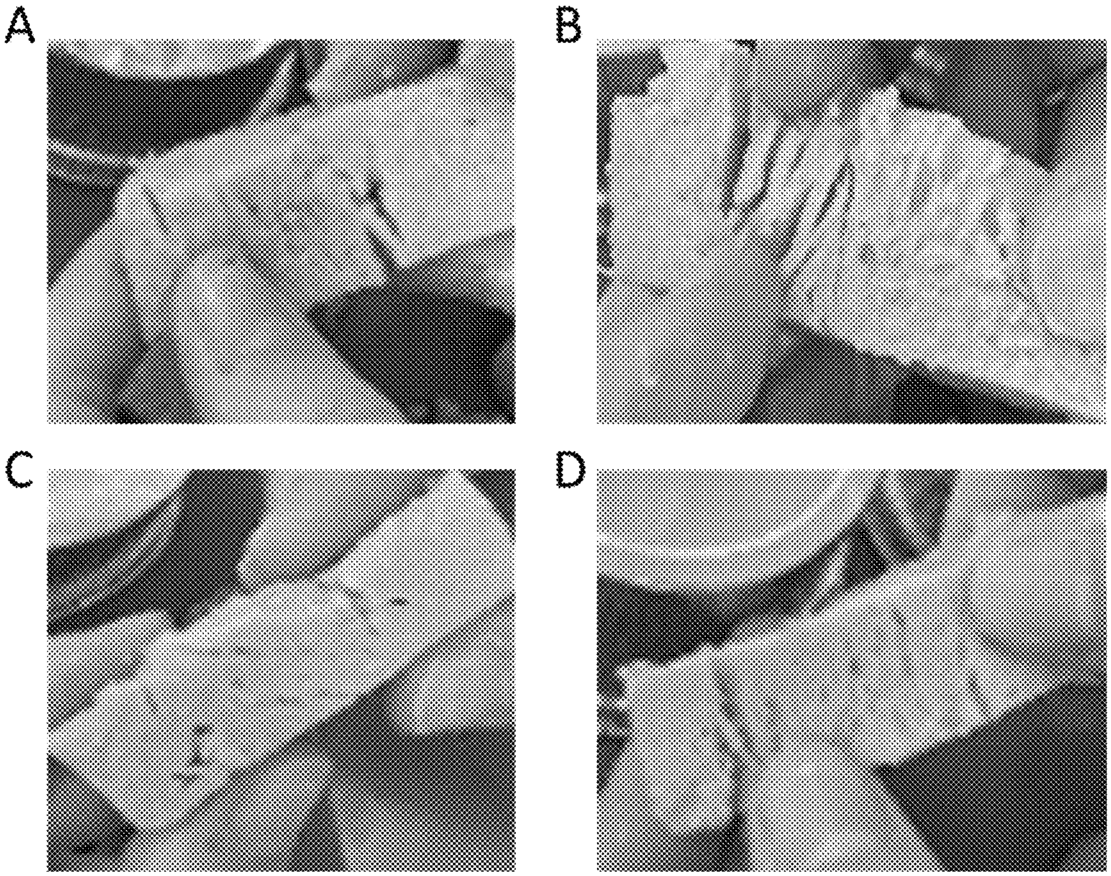
FIG. 11 shows all the fibrous or laminated, and textured food products obtained after the implementation of Example 8. (A) The salted protein solution was enzymatically treated (0.3% enzyme) after addition of the 2nd $CaCl_2$ solution. (B) The salted protein solution was enzymatically (0.3% enzyme) after addition of the 2nd $CaCl_2$ solution, and then acidified (pH 5.6). (C) The saline protein solution was enzymatically treated (0.3% enzyme) before addition of the 2nd $CaCl_2$ solution. (D) The saline protein solution was enzymatically treated (0.3% enzyme) before addition of the 2nd $CaCl_2$ solution, and then acidified (pH 5.6).

After the implementation of this example, the resulting fibrous or laminated, and textured food products were photographed (see FIG. 11). Briefly:

- The salted and enzymatically treated protein solution (0.3% enzyme) after addition of the 2nd $CaCl_2$ solution resulted, after freezing and cooking, in a firm and cohesive fibrous or laminated, and textured food product (see FIG. 11A);
- The salted protein solution, enzymatically treated (0.3% enzyme) after addition of the 2nd $CaCl_2$ solution, and then acidified (pH 5.6) resulted, after freezing and cooking, in a fibrous or laminated, and textured food product that was firm and cohesive (see FIG. 11B);
- the salted and enzymatically treated protein solution (0.3% enzyme) prior to the addition of the 2nd $CaCl_2$ solution resulted, after freezing and cooking, in a firm and cohesive fibrous or laminated, and textured food product (see FIG. 11C); and
- The salted protein solution, enzymatically treated (0.3% enzyme) prior to the addition of the 2nd $CaCl_2$ solution, and then acidified (pH 5.6) resulted, after freezing and cooking, in a fibrous or laminated, and textured food product that was firm and slightly cohesive (see FIG. 11D).

Example 9

1. Materials & Methods 1.1 Recipe

TABLE 13

Recipes using soy protein isolate (SPI) and pea protein isolate (SPI)

| Ingredients (for 100 g) | Recipe #1 Quantity (g) | Recipe #2 Quantity (g) |
|---|---|---|
| Initial mix | | |
| | Soy protein (SPI) | Pea protein (PPI) |
| Protein isolate | 13.33 | 17.86 |
| Amount of protein | 11.66 | 14.29 |
| NaCl from the isolate | 0.37 | 0.45 |
| Moisture from the isolate | 0.57 | 1.16 |
| Distilled water | 85.45 | 83.36 |
| 1st addition | | |
| Enzyme solution | 0.72 | 0.72 |
| Microbial transglutaminase (mTG) powder | 0.12 | 0.12 |
| Distilled water | 0.6 | 0.6 |
| 2nd addition | | |
| Citric acid solution | 0.5 | 0.5 |
| Citric acid monohydrate | 0.25 | 0.25 |
| Real citric acid from citric acid monohydrate | 0.22 | 0.22 |
| Moisture from citric acid monohydrate | 0.03 | 0.03 |
| Distilled water | 0.25 | 0.25 |
| Adding water | 0 | 0 |
| Total | 100 | 100 |
| Total water mass (g) | 86.90 | 84.24 |
| Total solid mass (g) | 12.37 | 15.08 |
| Total NaCl mass (g) | 0.37 | 0.45 |

Recipe #1: The protein solution is formed from soy protein. It is enzymatically treated with 0.12% enzyme, incubated for 30 minutes at 50 °C, and then acidified to pH=5.6. Recipe #2: The protein solution is formed from pea protein. It is enzymatically treated with 0.12% enzyme incubated for 30 min at 50 °C, then acidified to pH=5.6.

1.2. Protocol 1.2.1. Mixing and Hydration

The water and protein isolate powder were mixed at 250 rpm for 5 min in a blender (Cook robot, marketed by Robot-Coupe®). The edges of the bowl were scraped to avoid the accumulation of unhydrated powder on the sides and the resulting protein solution was again mixed at 250 rpm for 25 min, for a total hydration time of 30 min.

1.2.2. Enzymatic Treatment

The mixer was equipped with 2 thermocouples to measure the surface and core temperatures of the mixture. The protein solution was heated by holding the mixture at 250 rpm until the core temperature reached 50 °C. Once this temperature was reached, the enzyme (or enzyme solution if dispersed in water) was added at a concentration of 0.12%.

1.2.3. Cooling and Acidification)

The enzymatically treated protein solution was cooled as quickly as possible. For this purpose, the container containing the enzyme-treated protein solution was placed in a water bath at 4 °C and the enzyme-treated protein solution was stirred by hand with a spatula. The temperature was monitored by a thermocouple immersed in the protein solution until it reached 4 °C core temperature (cold water bath). The enzymatically treated protein solution was also acidified with citric acid to a pH of 5.6.

1.2.4. Freezing

Prior to freezing, the enzymatically treated and optionally acidified protein solution was sampled in insulated aluminium cups and then frozen in a conventional freezer at −24 °C.

1.2.6. Cooking

The day after freezing, the frozen samples were baked at 180 °C for 18 or 25 minutes in a preheated forced-air oven.

1.3. Products & Suppliers

Soy protein SUPRO® 620 IP (Solae)

Pea protein Empro® E 86 HV (Emsland-Starke GmbH)

Transglutaminase PROBIND® TXo (BDF Ingredients)

Citric acid (Citric Acid Monohydrate, Caldic)

2. Results

Figure 12:
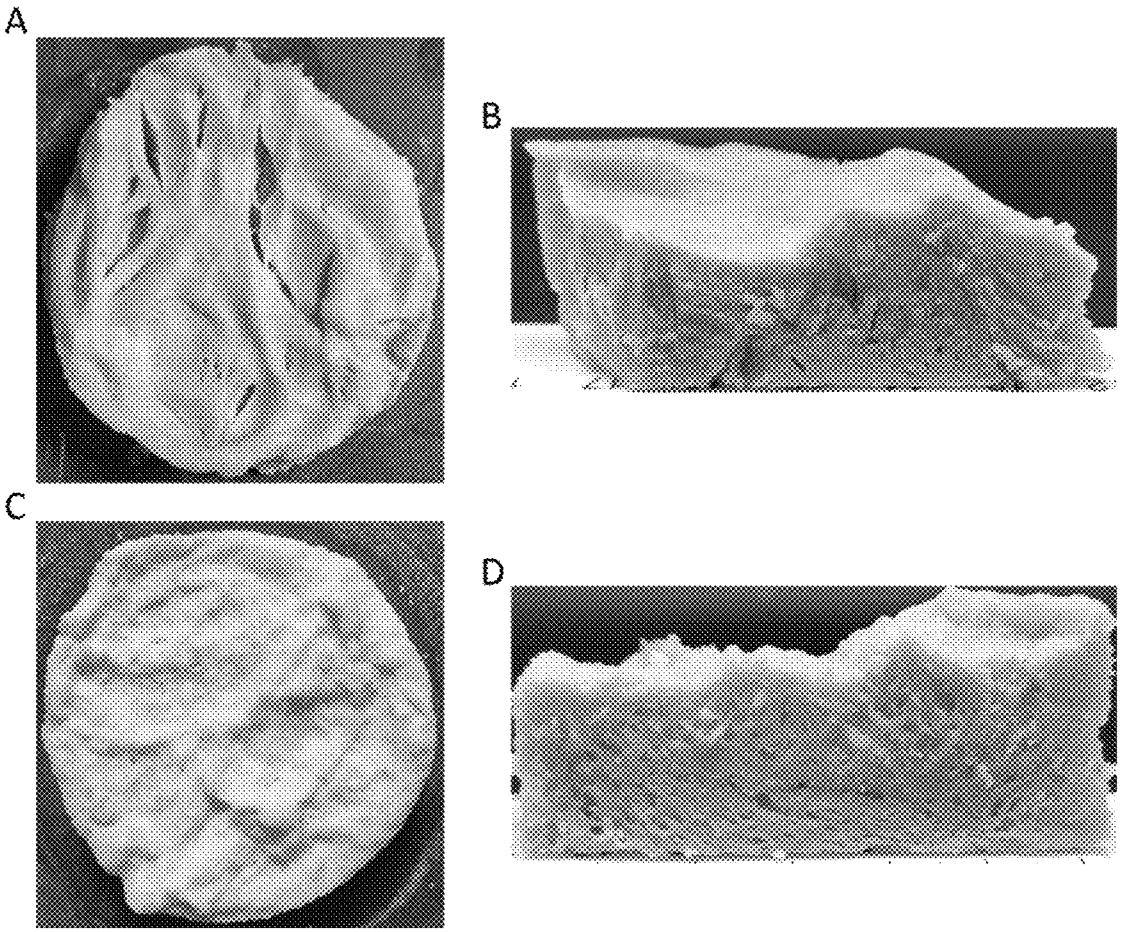
FIG. 12 shows all of the fibrous or laminated, and textured food products obtained after the implementation of Example 9. (A) The salted protein solution formed from enzymatically treated and acidified pea proteins (pH 5.6) was frozen in static cold at −25 °C (B) The fibrous, cohesive and textured food product of FIG. 12A has fibres with an average length of 8 mm and an average thickness of 0.26 mm. (C) The salted protein solution formed from enzymatically treated and acidified soy protein (pH 5.6) was frozen in static cold at −25 °C (D) The fibrous, cohesive, textured food product in FIG. 13C has an average fibre length of 7 mm and an average thickness of 0.18 mm.

After the implementation of this example the resulting fibrous and textured food products were photographed (see FIG. 12). Briefly:

- the salted protein solution formed from the pea proteins, enzymatically treated and acidified (pH 5.6) allowed to obtain, after freezing in static cold at −25 °C, a fibrous, cohesive and textured food product with fibres of an average length of 8 mm and an average thickness of 0.26 mm (FIGS. 12A-B); and
- The salted protein solution formed from enzymatically treated and acidified soy proteins (pH 5.6) resulted, after static freezing at −25 °C, in a fibrous, cohesive and textured food product with an average fibre length of 7 mm and an average thickness of 0.18 mm (FIGS. 12C-D)

Example 10

1. Materials & Methods 1.1 Recipe

TABLE 14

Recipes using pea protein isolate (PPI)

| Ingredients | Original recipe for 100 g Quantity (g) | Recipe for 600 g Quantity (g) |
|---|---|---|
| Initial mix | | |
| Pea protein isolate | 14.17 | 85.00 |
| NaCl | 0.66 | 3.96 |
| Distilled water | 85.17 | 510.32 |
| 1st addition | | |
| Microbial transglutaminase (mTG) powder | 0.12 | 0.72 |
| 2nd addition: acid until target pH is reached | | |
| Total | 100.00 | 600.00 |

1.2. Protocol 1.2.1. Saline Protein Solution and Hydration

The water and NaCl were mixed in a blender (Cook robot, commercialised by Robot-Coupe®) at 250 rpm for 2 min to diffuse the NaCl into the water. The protein isolate powder was then added and mixed at 250 rpm for 5 min. The edges of the bowl were scraped to avoid the accumulation of unhydrated powder on the sides and the resulting saline protein solution was again mixed at 250 rpm for 25 min, for a total hydration time of 30 min.

1.2.2. Enzymatic Treatment

The mixer was equipped with 2 thermocouples to measure the surface and core temperatures of the mixture. The saline protein solution was heated by holding the mixture at 250 rpm until the core temperature reached 50 °C. Once this temperature was reached, the enzyme was added and incubated for 30 min with gentle agitation.

1.2.3. Cooling and Acidification

The enzymatically treated salt protein solution was cooled as quickly as possible. For this purpose, the container containing the enzymatically treated salted solution was placed in a water bath at 4 °C and the enzymatically treated salted solution was stirred by hand with a spatula. The temperature was monitored by a thermocouple immersed in the protein solution until it reached 5 °C core temperature. The salted and enzymatically treated protein solution was then acidified with citric acid until a pH of 5.6 was reached.

1.2.4. Freezing

The salted, enzymatically treated, cooled and acidified protein solution was then separated into two solutions, one frozen in a conventional static freezer at −25 °C and the other frozen in a conventional blast freezer at −18 °C.

1.2.5. Cooking

After freezing, the salted, enzymatically treated and acidified protein solutions were baked in a standard oven. The core temperature in said solutions was raised to 95 °C and then said solutions were removed from the oven and allowed to cool for at least 15 minutes (in particular for 15 min) at room temperature. The salted, enzymatically treated, acidified and baked protein solutions can be characterized as is or undergo negative cold storage prior to characterization.

1.2.6. $2^{nde}$ Freezing

In the case of cold storage, the salted, enzymatically treated, cooled, acidified, frozen and cooked protein solution was then placed back in a conventional static freezer at −25 °C 1.2.7 Thawing After storage in a conventional freezer, the cooked salted protein solutions were thawed at room temperature for 4 hours. At the end of this stage, the various characterization measurements could be carried out.

1.3. Products & Suppliers

Plant-Meat Protein (Green Boy)

NaCl Sodium Chloride≥99.5% (Fisher Scientific)

Transglutaminase PROBIND® TXo (BDF Ingredients)

Citric acid (Citric Acid Monohydrate, Caldic)

2. Results

Figure 13:
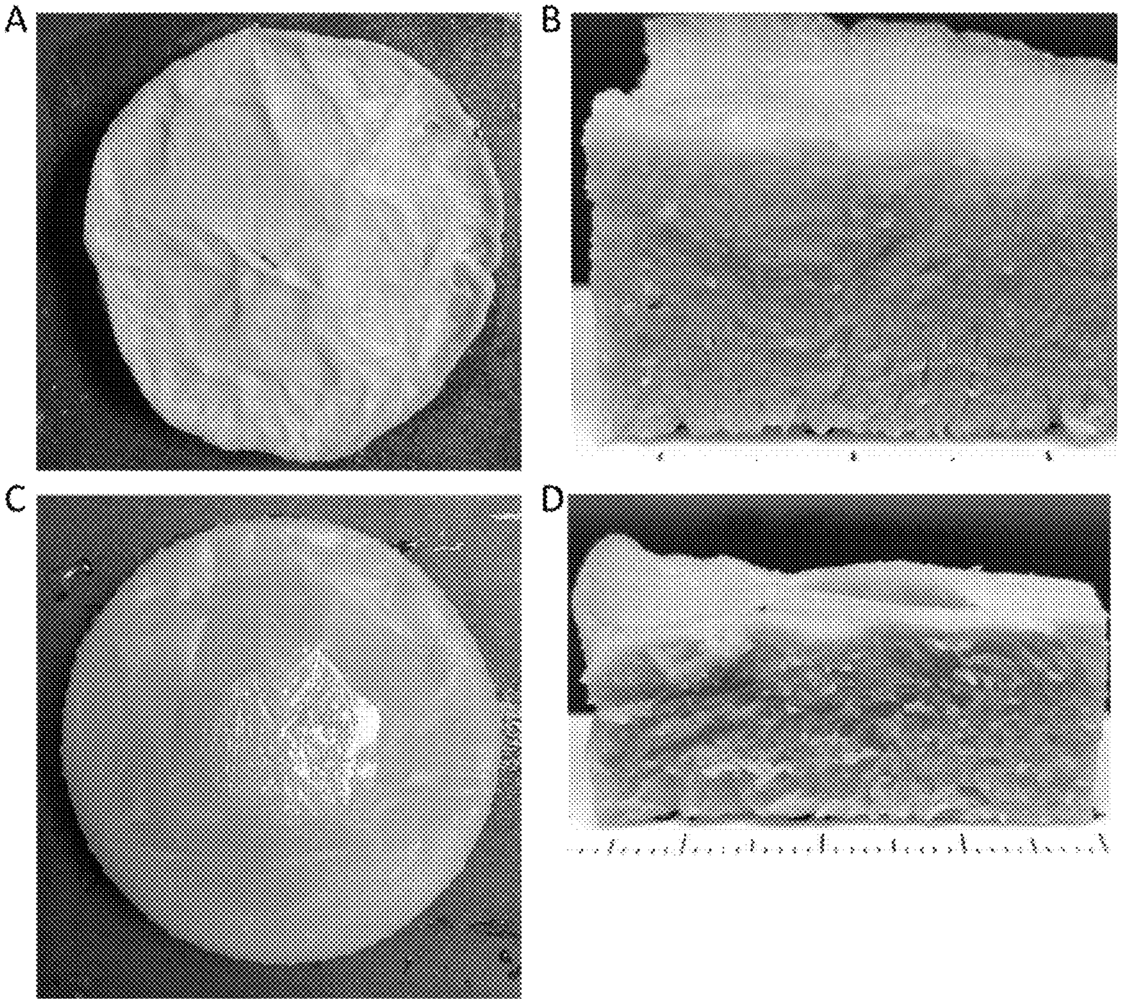
FIG. 13 shows all of the fibrous or laminated, and textured food products obtained after the implementation of Example 10. (A) The enzymatically treated, acidified (pH 5.6), salted protein solution was frozen in static cold at −25 °C (B) The fibrous, cohesive, textured food product in FIG. 13A has fibres with an average length of 5 mm and an average thickness of 0.28 mm. (C) The salted, enzymatically treated and acidified protein solution (pH 5.6) was frozen in static cold at −18 °C (D) The fibrous, cohesive and textured food product in FIG. 13C has an average fibre length of 8 mm and an average thickness of 0.28 mm.

After the implementation of this example the resulting fibrous and textured food products were photographed (see FIG. 13). Briefly:

The salted protein solution, enzymatically treated, acidified (pH 5.6) and frozen in static cold at −25 °C resulted, after freezing, in a fibrous, cohesive and textured food product (cf. FIG. 13A), with a density of 1.83 g/cm3, a water retention capacity of 73%, a firmness of 36 N and an elasticity of 73%; with an average fibre length of 5 mm and an average thickness of 0.28 mm (see FIG. 13B). The salted, enzymatically treated, acidified (pH 5.6) and frozen protein solution in static cold at −18 °C resulted, after freezing, in a fibrous, cohesive and textured food product (cf. FIG. 13C), with a density of 1.78 g/cm3, a water retention capacity of 80%, a firmness of 44 N and an elasticity of 47%; presenting fibres with an average length of 8 mm and an average thickness of 0.28 mm (see FIG. 13D). The physicochemical properties of the product are detailed in Table 22.

Example 11

1. Materials & Methods 1.1 Recipe

TABLE 15

Recipes using soy protein isolate (SPI)

| Ingredients | Original recipe for 100 g Quantity (g) | Recipe for 600 g Quantity (g) |
|---|---|---|
| Initial mix | | |
| Soy protein isolate | 13.33 | 80.00 |
| Distilled water | 85.80 | 514.80 |
| NaCl | 0.67 | 4.00 |
| CaCl2 (1st addition) | 0.03 | 0.20 |
| 1st addition | | |
| Microbial transglutaminase (mTG) powder | 0.03 | 0.20 |
| CaCl2 ($2^{ème}$ addition) | 0.13 | 0.80 |
| 2nd addition: acid until target pH is reached | | |
| Citric acid solution (50% acid) | 0.50 | 3.00 |
| Total | 100.00 | 600.00 |

1.2. Protocol 1.2.1. Saline Protein Solution and Hydration

The water and NaCl were mixed in a blender (Cook robot, commercialised by Robot-Coupe®) at 250 rpm for 2 min to diffuse the NaCl into the water. The protein isolate powder was then added and mixed at 250 rpm for 5 min. The edges of the bowl were scraped to avoid the accumulation of unhydrated powder on the sides and the resulting saline protein solution was again mixed at 250 rpm for 20 min. A first dose of $CaCl_2$ (0.03 g per 100 g solution) was then added and the protein solution was mixed for 5 min. The total time of the mixing and hydration phase of the compounds was 30 min.

1.2.2. Enzymatic Treatment

The mixer was equipped with 2 thermocouples to measure the surface and core temperatures of the mixture. The saline protein solution was heated by holding the mixture at 250 rpm until the core temperature reached 50 °C. Once this temperature was reached, the enzyme was added and incubated for 30 min with gentle agitation.

1.2.3. Cooling and Second Addition of CaCl2

The enzymatically treated salt protein solution was rapidly cooled to 40 °C. For this purpose, the vessel containing the enzymatically treated salt protein solution was placed in a water bath at 4 °C and the enzymatically treated salt protein solution was stirred by hand with a spatula. A second dose of CaCl2 (0.13 g per 100 g of solution) was added and the solution was vigorously mixed with a spatula for 5 min.

1.2.4. Acidification

The salted and enzymatically treated protein solution was further cooled in the water bath at 4 °C until it reached 5 °C at the core. The temperature was monitored by a thermocouple immersed in the protein solution. The salted and enzymatically treated protein solution was then acidified with citric acid until a pH of 5.6 was reached.

1.2.5. Freezing

The salted, enzymatically treated, cooled and acidified protein solution was then separated into two solutions, one frozen in a conventional static freezer at −25 °C and the other frozen in a conventional blast freezer at −18 °C.

1.2.5. Cooking

After freezing, the salted, enzymatically treated and acidified protein solutions were baked in a standard oven. The core temperature in said solutions was raised to 95 °C and then said solutions were removed from the oven and allowed to cool for at least 15 minutes (in particular for 15 min) at room temperature. The salted, enzymatically treated, acidified and baked protein solutions can be characterized as is or undergo negative cold storage prior to characterization.

1.2.6. $2^{nde}$ Freezing

In the case of cold storage, the salted, enzymatically treated, cooled, acidified, frozen and cooked protein solution was then placed back in a conventional static freezer at −25 °C.

1.2.7 Thawing

After storage in a conventional freezer, the cooked salted protein solutions were thawed at room temperature for 4 hours. At the end of this stage, the various characterization measurements could be carried out.

1.3. Products & Suppliers

Soy protein SOLPRO® 920 IP (Solbar)

NaCl Sodium Chloride≥99.5% (Fisher Scientific)

$CaCl_2$ Calcium Chloride 2-hydrate 99.9% (Panreac)

Transglutaminase PROBIND® TXo (BDF Ingredients)

Citric acid (Citric Acid Monohydrate, Caldic)

2. Results

Figure 14:
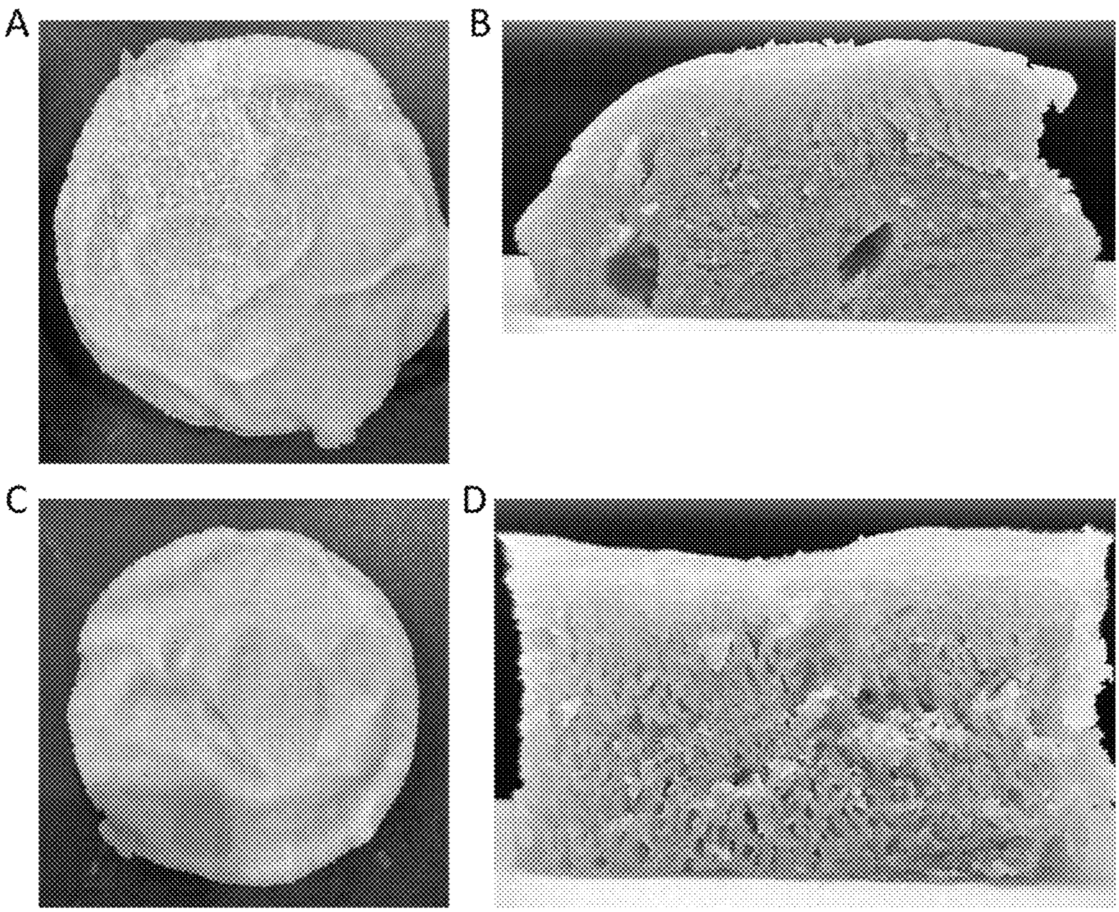
FIG. 14 shows all of the fibrous or laminated, and textured food products obtained after the implementation of Example 11. (A) The enzymatically treated, acidified (pH 5.6), salted protein solution was frozen in static cold. (B) The fibrous, cohesive, textured food product of FIG. 14A has fibres with an average length of 3 mm and an average thickness of 0.42 mm. (C) The salted, enzymatically treated and acidified (pH 5.6) protein solution was frozen in a ventilated cold state. (D) The fibrous, cohesive and textured food product in FIG. 14C has an average fibre length of 5 mm and an average thickness of 0.38 mm.

After the implementation of this example the resulting fibrous and textured food products were photographed (see FIG. 14). Briefly:

The salted protein solution, enzymatically treated, acidified (pH 5.6) and frozen in static cold resulted, after freezing, in a fibrous, cohesive and textured food product (cf. FIG. 14A), with a density of 1.68 g/cm$^3$, a water retention capacity of 69%, a firmness of 21 N and an elasticity of 26%; presenting fibres with an average length of 3 mm and an average thickness of 0.42 mm (see FIG. 14B). The salted, enzymatically treated, acidified (pH 5.6) and frozen protein solution in ventilated cold resulted, after freezing, in a fibrous, cohesive and textured food product (cf. FIG. 14C), with a density of 1.78 g/cm$^3$, a water retention capacity of 66%, a firmness of 18 N and an elasticity of 26%; presenting fibres with an average length of 5 mm and an average thickness of 0.38 mm (see FIG. 14D). The physicochemical properties of the product are detailed in Table 22.

Example 12—Soy-Gluten Hybrid

1. Materials & Methods 1.1 Recipe

TABLE 16

Recipes using soy protein isolate (SPI) and gluten protein concentrate

| Ingredients | Original recipe for 100 g Quantity (g) | Recipe for 600 g Quantity (g) |
|---|---|---|
| Initial mix | | |
| Soy protein isolate | 10.00 | 60.00 |
| Gluten protein concentrate | 3.75 | 22.50 |
| NaCl | 0.66 | 3.96 |
| Distilled water | 85.47 | 512.82 |

TABLE 16-continued

Recipes using soy protein isolate (SPI) and gluten protein concentrate

| Ingredients | Original recipe for 100 g Quantity (g) | Recipe for 600 g Quantity (g) |
|---|---|---|
| 1st addition | | |
| Microbial transglutaminase (mTG) powder | 0.12 | 0.72 |
| 2nd addition: acid until target pH is reached | | |
| Citric acid solution (concentrated to 50% acid) | 0.50 | 3.00 |
| Total | 100.00 | 600.00 |

1.2. Protocol 1.2.1. Saline Protein Solution and Hydration

The water and NaCl were mixed in a blender (Cook robot, commercialised by Robot-Coupe®) at 250 rpm for 2 min to diffuse the NaCl into the water. The mixture of isolate powder and protein concentrate powder was then added and mixed at 250 rpm for 5 min. The edges of the bowl were scraped to avoid the accumulation of unhydrated powder on the sides and the resulting saline protein solution was again mixed at 250 rpm for 25 min, for a total hydration time of 30 min.

1.2.2. Enzymatic Treatment

The mixer was equipped with 2 thermocouples to measure the surface and core temperatures of the mixture. The saline protein solution was heated by holding the mixture at 250 rpm until the core temperature reached 50 °C. Once this temperature was reached, the enzyme was added and incubated for 30 min with gentle agitation.

1.2.3. Cooling and Acidification

The enzymatically treated salt protein solution was cooled as quickly as possible. For this purpose, the container containing the enzymatically treated salted solution was placed in a water bath at 4 °C and the enzymatically treated salted solution was stirred by hand with a spatula. The temperature was monitored by a thermocouple immersed in the protein solution until it reached 5 °C core temperature. The salted and enzymatically treated protein solution was then acidified with citric acid until a pH of 5.5 was reached.

1.2.4. Freezing

The salted, enzymatically treated, cooled and acidified protein solution was then separated into two solutions, one frozen in a conventional static freezer at −25 °C and the other frozen in a conventional blast freezer at −18 °C.

1.2.5. Cooking

After freezing, the salted, enzymatically treated and acidified protein solutions were baked in a standard oven. The core temperature in said solutions was raised to 95 °C and then said solutions were removed from the oven and allowed to cool for at least 15 minutes (in particular for 15 min) at room temperature. The salted, enzymatically treated, acidified and baked protein solutions can be characterized as is or undergo negative cold storage prior to characterization.

1.2.6. $2^{nde}$ Freezing

In the case of cold storage, the salted, enzymatically treated, cooled, acidified, frozen and cooked protein solution was then placed back in a conventional static freezer at −25 °C.

1.2.7. Thawing

After storage in a conventional freezer, the cooked salted protein solutions were thawed at room temperature for 4 hours. At the end of this stage, the various characterization measurements could be carried out.

1.3. Products & Suppliers

Soy protein SUPRO® 620 IP (Solae)

Gluvital 21020 (Caldic) gluten proteins

NaCl Sodium Chloride≥99.5% (Fisher Scientific)

Transglutaminase AB enzyme

Citric acid (Citric Acid Monohydrate, Caldic)

2. Results

Figure 15:
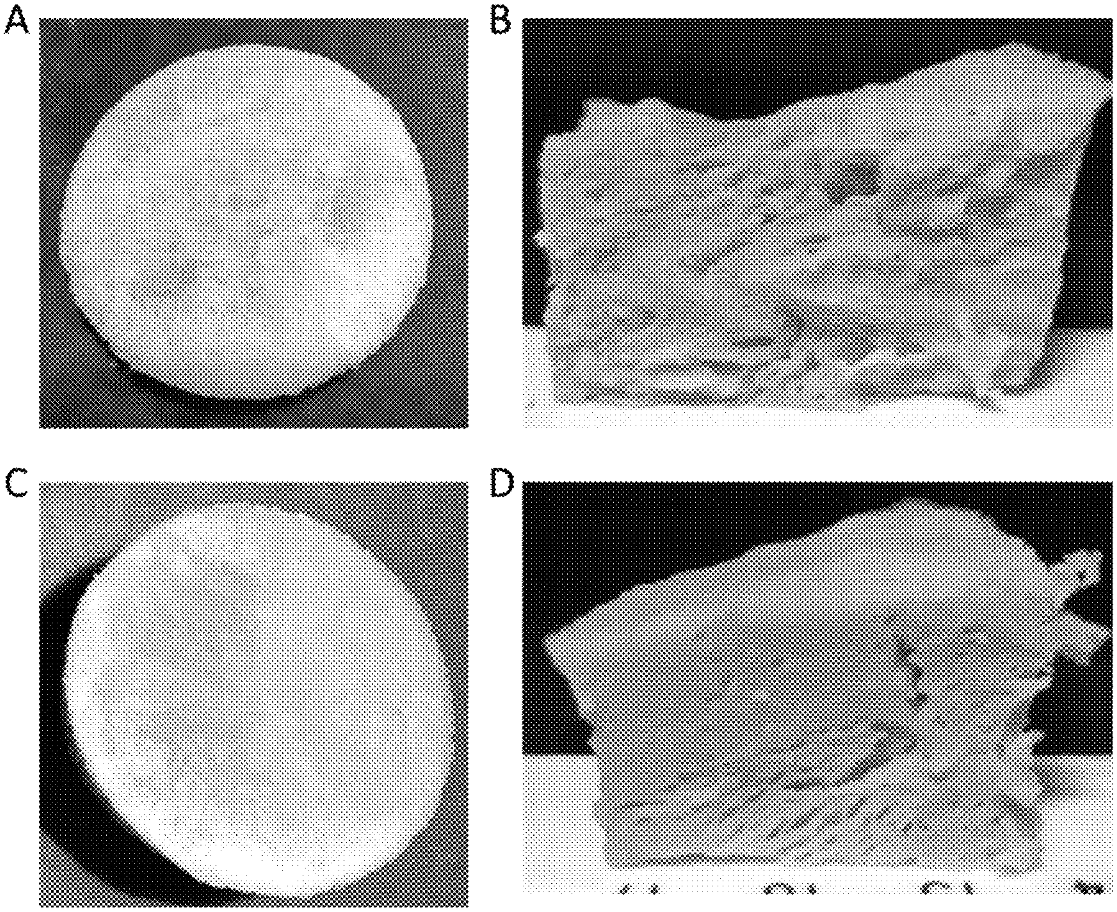
FIG. 15 shows all of the fibrous or laminated, and textured food products obtained after the implementation of Example 12. (A) The enzymatically treated, acidified (pH 5.6), salted protein solution was frozen in static cold. (B) The fibrous, cohesive, textured food product of FIG. 15A has fibres with an average length of 6 mm and an average thickness of 0.21 mm. (C) The salted, enzymatically treated and acidified (pH 5.6) protein solution was frozen in a ventilated cold state. (D) The fibrous, cohesive and textured food product in FIG. 15C has an average fibre length of 5 mm and an average thickness of 0.22 mm.

After the implementation of this example the resulting fibrous and textured food products were photographed (see FIG. 15). Briefly:

The salted, enzymatically treated and acidified (pH 5.6) protein solution and frozen in static cold resulted, after freezing, in a fibrous, cohesive and textured food product (cf. FIG. 15A), with a density of 1.71 g/cm$^3$, a water retention capacity of 64%, a firmness of 27 N and an elasticity of 36%; presenting fibres with an average length of 6 mm and an average thickness of 0.21 mm (see FIG. 15B). The salted, enzymatically treated, acidified (pH 5.6) and blast-frozen protein solution resulted, after freezing, in a fibrous, cohesive and textured food product (cf. FIG. 15C), with a density of 1.74 g/cm$^3$, a water retention capacity of 63%, a firmness of 22 N and an elasticity of 39%; presenting fibres with an average length of 5 mm and an average thickness of 0.22 mm (see FIG. 15D). The physicochemical properties of the product are detailed in Table 22.

Example 13—Faba Bean Meal

1. Materials & Methods 1.1 Recipe

TABLE 17

| Recipes made from faba bean meal | | |
|---|---|---|
| Ingredients | Recipe for 100 g Quantity (g | Recipe for 600 g Quantity (g) |
| Initial mix | | |
| Broad bean flour | 18.50 | 111.00 |
| NaCl | 0.66 | 3.96 |
| Distilled water | 80.72 | 484.32 |
| 1st addition | | |
| Microbial transglutaminase | 0.12 | 0.72 |
| 2nd addition: acid until target pH is reached | | |
| Total | 100.00 | 600.00 |

1.2. Protocol 1.2.1. Saline Protein Solution and Hydration

The water and NaCl were mixed in a blender (Cook robot, marketed by Robot-Coupe®) at 250 rpm for 2 min to diffuse the NaCl into the water. The protein flour powder was then added and mixed at 350 rpm for 5 min. The edges of the bowl were scraped to avoid the accumulation of unhydrated powder on the sides and the resulting salted protein solution was again mixed at 350 rpm for 25 min, for a total hydration time of 30 min.

1.2.2. Heat Treatment

The mixer was equipped with a thermocouple to measure the core temperature of the mixture. The salted protein solution was heated to 70 °C core temperature. After 30 min at 70 °C core, the salted protein solution was heated to 80 °C core, held for 20 min at this core temperature, then heated to 95 °C core and held for 10 min at this core temperature. A mixture of the salted protein solution was maintained at 350 rpm throughout the heat treatment.

1.2.3. Enzymatic Treatment

The heat-treated saline protein solution was cooled by maintaining the mixture at 350 rpm until the core temperature reached 50 °C. Once this temperature was reached, the enzyme was added and incubated for 30 min, still mixing at 300 rpm.

1.2.4. Cooling and Acidification

The heat-treated and enzyme-treated salt protein solution was cooled as quickly as possible. For this purpose, the vessel containing the heat-treated and enzymatically treated saline protein solution was placed in a water bath at −25 °C. The temperature was monitored by a thermocouple immersed in the protein solution until it reached a core temperature of 10 °C. The salted, heat-treated and enzymatically treated protein solution was then acidified with citric acid until a pH of 5.6 was reached.

1.2.5. Determination

The salted, heat-treated, enzymatically treated, cooled and acidified protein solution was dosed into moulds at a rate of 200 g of solution per mould.

1.2.6. Freezing

The samples were then frozen in a conventional static freezer at −25 °C.

1.2.7. Cooking

After freezing, the salted, enzymatically treated and acidified protein solutions were baked in a standard oven. The core temperature in said solutions was raised to 95 °C and then said solutions were removed from the oven and allowed to cool for at least 15 minutes (in particular for 15 min) at room temperature. The salted, enzymatically treated, acidified and baked protein solutions can be characterized as is or undergo negative cold storage prior to characterization.

1.2.8. 2$^{nde}$ Freezing

In the case of cold storage, the salted, enzymatically treated, cooled, acidified, frozen and cooked protein solution was then placed back in a conventional static freezer at −25 °C.

1.2.9. Thawing

After storage in a conventional freezer, the cooked salted protein solutions were thawed at room temperature for 4 hours. At the end of this stage, the various characterization measurements could be carried out.

1.3. Products & Suppliers

De-bittered faba bean flour (Viridi Foods)

Untreated fine salt (Colin Ingredients)

Transglutaminase PROBIND® TXo (BDF Ingredients)

Citric acid (Citric Acid Monohydrate, Kirsch Pharma)

2. Results

Figure 16:
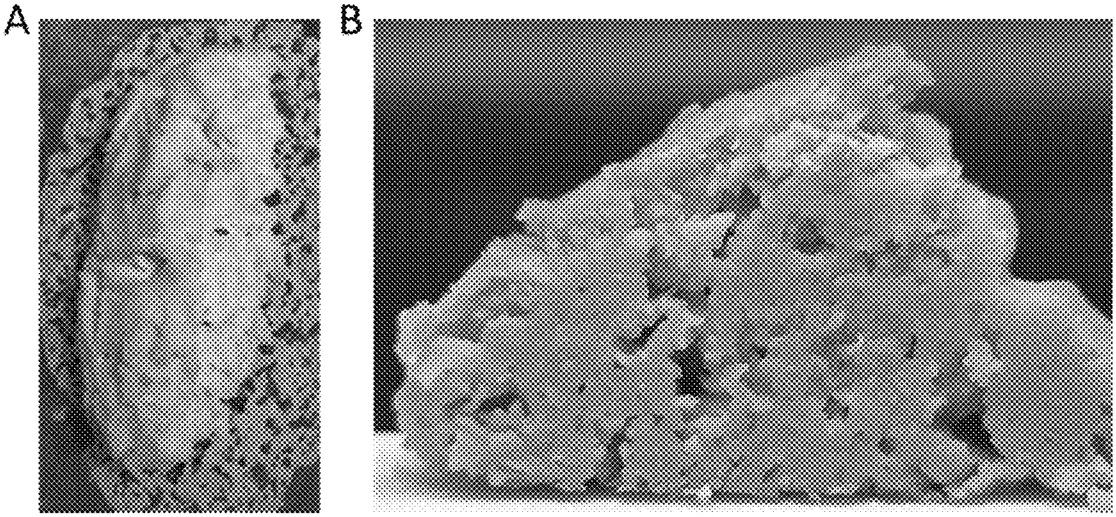
FIG. 16 shows all of the fibrous or laminated, and textured food products obtained after the implementation of Example 13. (A) The enzymatically treated, acidified (pH 5.6), salted protein solution was frozen in static cold. (B) The fibrous, cohesive, textured food product in FIG. 16A has fibres with an average length of 5 mm and an average thickness of 0.5 mm.

After the implementation of this example the resulting fibrous and textured food products were photographed (see FIG. 16). Briefly:

The salted, enzymatically treated, acidified protein solution (pH 5.6) resulted, after freezing, in a fibrous, cohesive and textured food product (cf. FIG. 16A), with a density of 1.6 g/cm$^3$, a water retention capacity of 80%, a firmness of 12 N and an elasticity of 19%; presenting fibres with an average length of 5 mm and an average thickness of 0.5 mm (see FIG. 16B). The physicochemical properties of the product are detailed in Table 22.

Example 14—Potato Protein Isolate

1. Materials & Methods 1.1 Recipe

TABLE 18

| Recipes using soy protein isolate (SPI) | | |
|---|---|---|
| Ingredients | Recipe for 100 g<br>Quantity (g) | Recipe for 600 g |
| Initial mix | | |
| Potato protein isolate | 13.00 | 78.00 |
| NaCl | 0.66 | 3.96 |
| Distilled water | 86.22 | 517.32 |
| 1st addition | | |
| Enzyme | 0.12 | 0.72 |
| 2nd addition: acid until target pH is reached | | |
| Total | 100.00 | 600.00 |

1.2. Protocol 1.2.1. Saline Protein Solution and Hydration

The water and NaCl were mixed in a blender (Cook robot, marketed by Robot-Coupe®) at 250 rpm for 2 min to diffuse the NaCl into the water. The protein isolate powder was then added and mixed at 350 rpm for 5 min. The edges of the bowl were scraped to avoid the accumulation of unhydrated powder on the sides and the resulting saline protein solution was again mixed at 350 rpm for 25 min, for a total hydration time of 30 min.

1.2.2. Enzymatic Treatment

The mixer was fitted with a thermocouple to measure the core temperature of the mixture. The saline protein solution was heated to 50 °C core temperature, while maintaining mixing action at 350 rpm. Once this temperature was reached, the enzyme was added and incubated for 30 min, still with mixing at 300 rpm.

1.2.3. Cooling and Acidification

The salted and enzymatically treated protein solution was cooled as quickly as possible. For this purpose, the vessel containing the salted and enzymatically treated protein solution was placed in a water bath at −25 °C. The temperature was monitored by a thermocouple immersed in the protein solution until it reached a core temperature of 10 °C. The salted and enzymatically treated protein solution was then acidified with lactic acid until a pH of 5.6 was reached.

1.2.4. Determination

The salted, heat-treated, enzymatically treated, cooled and acidified protein solution was dosed into moulds at a rate of 200 g of solution per mould.

1.2.5. Freezing

The samples were then frozen in a conventional static freezer at −25 °C.

1.2.6. Cooking

After freezing, the salted, enzymatically treated and acidified protein solutions were baked in a standard oven. The core temperature in said solutions was raised to 95 °C and then said solutions were removed from the oven and allowed to cool for at least 15 minutes (in particular for 15 min) at room temperature. The salted, enzymatically treated, acidified and baked protein solutions can be characterized as is or undergo negative cold storage prior to characterization.

1.2.7. 2$^{nde}$ Freezing

In the case of cold storage, the salted, enzymatically treated, cooled, acidified, frozen and cooked protein solution was then placed back in a conventional static freezer at −25 °C.

1.2.8. Thawing

After storage in a conventional freezer, the cooked salted protein solutions were thawed at room temperature for 4 hours. At the end of this stage, the various characterization measurements could be carried out.

1.3. Products & Suppliers

Potato protein isolate Solanic (Avebe)
Untreated fine salt (Colin Ingredients)
Transglutaminase PROBIND® TXo (BDF Ingredients)
Natural lactic acid 85% (Sigma-Aldrich)

2. Results

Figure 17:
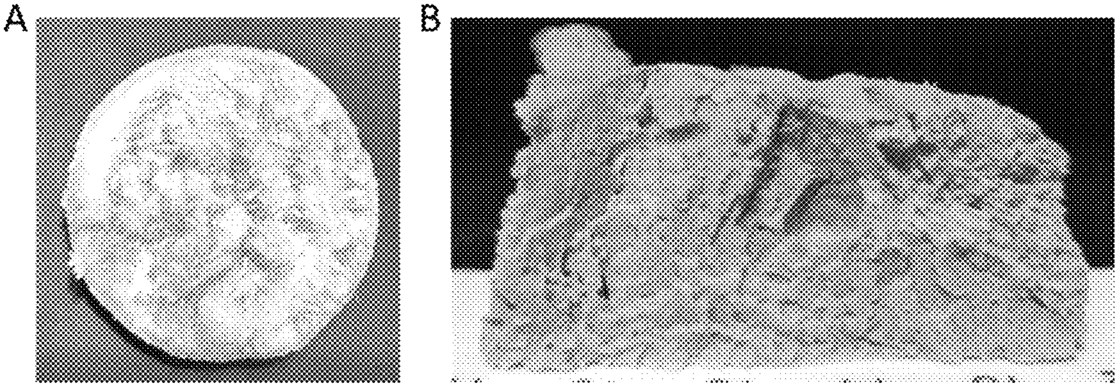
FIG. 17 shows all of the fibrous or laminated, and textured food products obtained after the implementation of Example 14. (A) The enzymatically treated, acidified (pH 5.6), salted protein solution was frozen in static cold. (B) The fibrous, cohesive, textured food product of FIG. 17A has fibres with an average length of 5 mm and an average thickness of 0.9 mm.

After the implementation of this example the resulting fibrous and textured food products were photographed (see FIG. 17). Briefly:

The salted, enzymatically treated, acidified protein solution (pH 5.6) resulted, after freezing, in a fibrous, cohesive and textured food product (cf. FIG. 17A), with a density not measurable by the water displacement method due to the crumbly texture, a water retention capacity of 83%, a firmness of 19 N and an elasticity of 44%; presenting fibres with an average length of 5 mm and an average thickness of 0.9 mm (see FIG. 17B). The physicochemical properties of the product are detailed in Table 22.

Example 15—Pea-Rice Hybrid

1. Materials & Methods 1.1 Recipe

TABLE 19

| Recipes using pea protein isolate (PPI) and rice protein isolate (RPI) | | |
|---|---|---|
| Ingredients | Recipe for 100 g<br>Quantity (g) | Recipe for 600 g |
| Initial mix | | |
| Pea protein isolate | 11.60 | 69.60 |
| Rice protein isolate | 2.90 | 17.40 |
| NaCl | 0.66 | 3.96 |
| Distilled water | 84.72 | 508.32 |
| 1st addition | | |
| Enzyme | 0.12 | 0.72 |
| 2nd addition: acid until target pH is reached | | |
| Total | 100.00 | 600.00 |

1.2. Protocol 1.2.1. Saline Protein Solution and Hydration

The water and NaCl were mixed in a blender (Cook robot, marketed by Robot-Coupe®) at 250 rpm for 2 min to diffuse the NaCl into the water. The protein isolate powders were then added together and mixed at 350 rpm for 5 min. The edges of the bowl were scraped to avoid the accumulation of unhydrated powder on the sides and the resulting saline protein solution was again mixed at 350 rpm for 25 min, for a total hydration time of 30 min.

1.2.2. Enzymatic Treatment

The mixer was fitted with a thermocouple to measure the core temperature of the mixture. The saline protein solution was heated to 50 °C core temperature, while maintaining mixing action at 350 rpm. Once this temperature was reached, the enzyme was added and incubated for 30 min, still with mixing at 300 rpm.

1.2.3. Cooling and Acidification

The salted and enzymatically treated protein solution was cooled as quickly as possible. For this purpose, the vessel containing the salted and enzymatically treated protein solution was placed in a water bath at −25 °C. The temperature was monitored by a thermocouple immersed in the protein solution until it reached a core temperature of 10 °C. The salted and enzymatically treated protein solution was then acidified with citric acid until a pH of 5.6 was reached.

1.2.4. Determination

The salted, heat-treated, enzymatically treated, cooled and acidified protein solution was dosed into moulds at a rate of 200 g of solution per mould.

1.2.5. Freezing

The salted, enzymatically treated, cooled and acidified protein solution was then separated into two solutions, one frozen in a conventional static freezer at −25 °C and the other frozen in a conventional blast freezer at −18 °C.

1.2.6. Cooking

After freezing, the salted, enzymatically treated and acidified protein solutions were baked in a standard oven. The core temperature in said solutions was raised to 95 °C and then said solutions were removed from the oven and allowed to cool for at least 15 minutes (in particular for 15 min) at room temperature. The salted, enzymatically treated, acidified and baked protein solutions can be characterized as is or undergo negative cold storage prior to characterization.

1.2.7. $2^{nde}$ Freezing

In the case of cold storage, the salted, enzymatically treated, cooled, acidified, frozen and cooked protein solution was then placed back in a conventional static freezer at −25 °C.

1.2.8. Thawing

After storage in a conventional freezer, the cooked salted protein solutions were thawed at room temperature for 4 hours. At the end of this stage, the various characterization measurements could be carried out.

1.3. Products & Suppliers

Rice protein isolate F80 (Unirice)
Pea isolate (Green Boy)
Untreated fine salt (Colin Ingredients)
Transglutaminase PROBIND® TXo (BDF Ingredients)
Citric acid (Citric Acid Monohydrate, Kirsch Pharma)

2. Results

Figure 18:
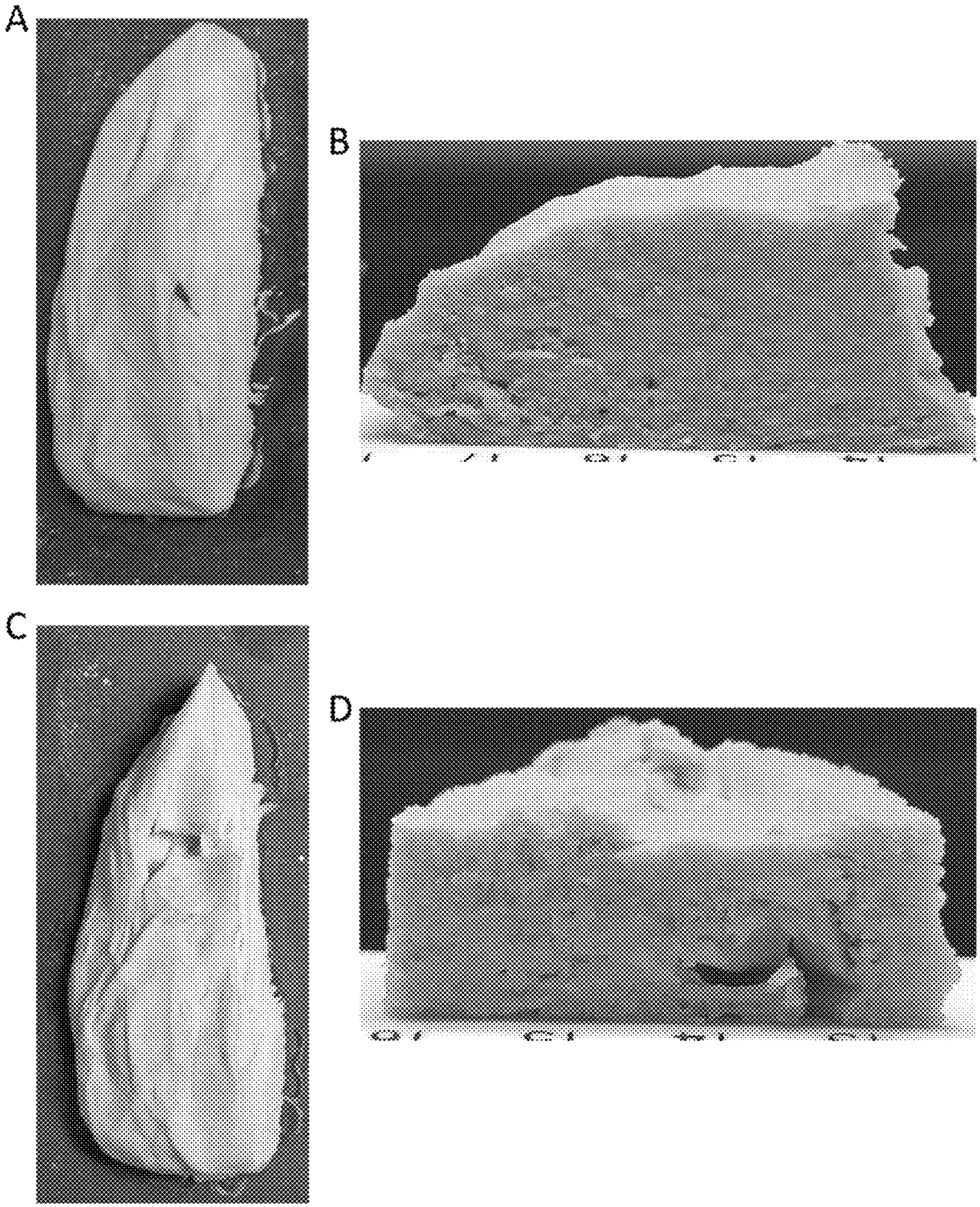
FIG. 18 shows all of the fibrous or laminated, and textured food products obtained after the implementation of Example 15. (A) The enzymatically treated, acidified (pH 5.6), salted protein solution was frozen in static cold. (B) The fibrous, cohesive, textured food product in FIG. 18A has fibres with an average length of 4 mm and an average thickness of 0.23 mm. (C) The salted, enzymatically treated and acidified (pH 5.6) protein solution was frozen in a ventilated cold state. (D) The fibrous, cohesive and textured food product in FIG. 18C has an average fibre length of 3 mm and an average thickness of 0.21 mm.

After the implementation of this example the resulting fibrous and textured food products were photographed (see FIG. 18). Briefly:

The salted, enzymatically treated and acidified (pH 5.6) protein solution and frozen in static cold resulted, after freezing, in a fibrous, cohesive and textured food product (cf. FIG. 18A), with a density of 1.69 g/$cm^3$, a water retention capacity of 82%, a firmness of 45 N and an elasticity of 52%; presenting fibres with an average length of 4 mm and an average thickness of 0.23 mm (see FIG. 18B). The salted, enzymatically treated, acidified (pH 5.6) and blast-frozen protein solution resulted, after freezing, in a fibrous, cohesive and textured food product (cf. FIG. 18C), with a density of 1.58 g/$cm^3$, a water retention capacity of 80%, a firmness of 44 N and an elasticity of 51%; presenting fibres with an average length of 3 mm and an average thickness of 0.21 mm (see FIG. 18D). The physicochemical properties of the product are detailed in Table 22.

Example 16—Pea-Soya Hybrid

1. Materials & Methods 1.1 Recipe

TABLE 20

Recipes using soy protein isolates (SPI) and pea protein PPI

| Ingredients | Recipe for 100 g | Recipe for 600 g |
|---|---|---|
| | Quantity (g) | |
| Initial mix | | |
| Pea protein isolate | 7.00 | 42.00 |
| Soy protein isolate | 7.00 | 42.00 |
| NaCl | 0.66 | 3.96 |
| Distilled water | 85.22 | 511.32 |
| 1st addition | | |
| Enzyme | 0.12 | 0.72 |
| 2nd addition: acid until target pH is reached | | |
| Total | 100.00 | 600.00 |

1.2. Protocol 1.2.1. Saline Protein Solution and Hydration

The water and NaCl were mixed in a blender (Cook robot, marketed by Robot-Coupe®) at 250 rpm for 2 min to diffuse the NaCl into the water. The protein isolate powders were then added together and mixed at 350 rpm for 5 min. The edges of the bowl were scraped to avoid the accumulation of unhydrated powder on the sides and the resulting saline protein solution was again mixed at 350 rpm for 25 min, for a total hydration time of 30 min.

1.2.2. Enzymatic Treatment

The mixer was fitted with a thermocouple to measure the core temperature of the mixture. The saline protein solution was heated to 50 °C core temperature, while maintaining mixing action at 350 rpm. Once this temperature was reached, the enzyme was added and incubated for 30 min, still with mixing at 300 rpm.

1.2.3. Cooling and Acidification

The salted and enzymatically treated protein solution was cooled as quickly as possible. For this purpose, the vessel containing the salted and enzymatically treated protein solution was placed in a water bath at −25 °C. The temperature was monitored by a thermocouple immersed in the protein solution until it reached a core temperature of 10 °C. The salted and enzymatically treated protein solution was then acidified with citric acid until a pH of 5.6 was reached.

1.2.4. Determination

The salted, heat-treated, enzymatically treated, cooled and acidified protein solution was dosed into moulds at a rate of 200 g of solution per mould.

1.2.5. Freezing

The salted, enzymatically treated, cooled and acidified protein solution was then separated into two solutions, one frozen in a conventional static freezer at −25 °C; and the other frozen in a conventional static freezer at −18 °C.

1.2.6. Cooking

After freezing, the salted, enzymatically treated and acidified protein solutions were baked in a standard oven. The core temperature in said solutions was raised to 95 °C and then said solutions were removed from the oven and allowed to cool for at least 15 minutes (in particular for 15 min) at room temperature. The salted, enzymatically treated, acidified and baked protein solutions can be characterized as is or undergo negative cold storage prior to characterization.

1.2.7. $2^{nde}$ Freezing

In the case of cold storage, the salted, enzymatically treated, cooled, acidified, frozen and cooked protein solution was then placed back in a conventional static freezer at −25 °C.

1.2.8. Thawing

After storage in a conventional freezer, the cooked salted protein solutions were thawed at room temperature for 4 hours. At the end of this stage, the various characterization measurements could be carried out.

1.3. Products & Suppliers

Soy protein isolate SUPRO® 620 IP (Solae)
Pea isolate (Green Boy)
Untreated fine salt (Colin Ingredients)
Transglutaminase PROBIND® TXo (BDF Ingredients)
Citric acid (Citric Acid Monohydrate, Kirsch Pharma)

2. Results

Figure 19:
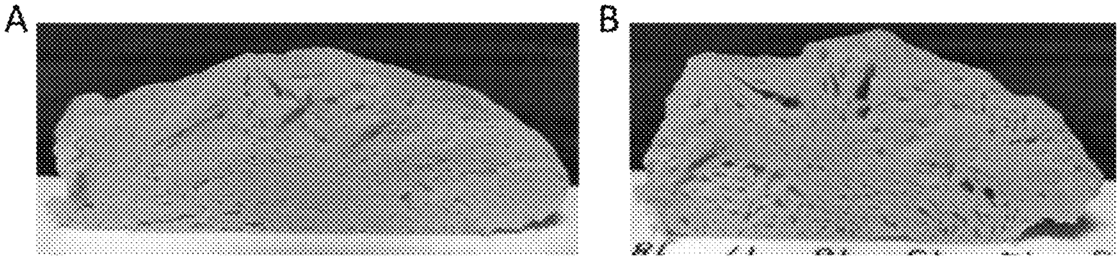
FIG. 19 shows all the fibrous or laminated, and textured food products obtained after the implementation of Example 16. The enzymatically treated and acidified (pH 5.6) salted protein solution was frozen in static cold and resulted in a fibrous, cohesive and textured food product with an average fibre length of 6 mm and an average thickness of 0.32 mm. (B) The salted, enzymatically treated and acidified protein solution (pH 5.6) was frozen in a ventilated cold state and resulted in a fibrous, cohesive and textured food product with an average fibre length of 7 mm and an average thickness of 0.41 mm.

After the implementation of this example the resulting fibrous and textured food products were photographed (see FIG. 19). Briefly:

The enzymatically treated salted protein solution, acidified (pH 5.6) and frozen in static cold (−25 °C) resulted, after freezing, in a fibrous, cohesive and textured food product (cf. FIG. 19A), with a density of 1.7 g/cm$^3$, a water retention capacity of 77%, a firmness of 25 N and an elasticity of 43%; presenting fibres with an average length of 6 mm and an average thickness of 0.32 mm (see FIG. 19A). The salted protein solution, enzymatically treated, acidified (pH 5.6) and frozen in static cold (−18 °C) allowed, after freezing, to obtain a fibrous, cohesive and textured food product (cf. FIG. 19B), with a density of 1.6 g/cm$^3$, a water retention capacity of 76%, a firmness of 18 N and an elasticity of 39%; presenting fibres with an average length of 7 mm and an average thickness of 0.41 mm (see FIG. 19B). The physicochemical properties of the product are detailed in Table 22.

Example 17—Lactic Acid

1. Materials & Methods 1.1 Recipe

TABLE 21

Recipes using soy protein isolate (SPI)

| Ingredients | Recipe for 100 g Quantity (g) | Recipe for 600 g Quantity (g) |
|---|---|---|
| Initial mix | | |
| Soy protein isolate | 13.33 | 79.98 |
| NaCl | 0.66 | 3.96 |
| Distilled water | 85.89 | 515.34 |
| 1st addition | | |
| Enzyme | 0.12 | 0.72 |
| 2nd addition: acid until target pH is reached | | |
| Total | 100.00 | 600.00 |

1.2. Protocol 1.2.1. Saline Protein Solution and Hydration

The water and NaCl were mixed in a blender (Cook robot, marketed by Robot-Coupe®) at 250 rpm for 2 min to diffuse the NaCl into the water. The protein isolate powder was then added and mixed at 350 rpm for 5 min. The edges of the bowl were scraped to avoid the accumulation of unhydrated powder on the sides and the resulting saline protein solution was again mixed at 350 rpm for 25 min, for a total hydration time of 30 min.

1.2.2. Enzymatic Treatment

The mixer was fitted with a thermocouple to measure the core temperature of the mixture. The saline protein solution was heated to 50 °C core temperature, while maintaining mixing action at 350 rpm. Once this temperature was reached, the enzyme was added and incubated for 30 min, still with mixing at 300 rpm.

1.2.3. Cooling and Acidification

The salted and enzymatically treated protein solution was cooled as quickly as possible. For this purpose, the vessel containing the salted and enzymatically treated protein solution was placed in a water bath at −25 °C. The temperature was monitored by a thermocouple immersed in the protein solution until it reached a core temperature of 10 °C. The salted and enzymatically treated protein solution was then acidified with citric acid until a pH of 5.6 was reached.

1.2.4. Determination

The salted, heat-treated, enzymatically treated, cooled and acidified protein solution was dosed into moulds at a rate of 200 g of solution per mould.

1.2.5. Freezing

The samples were then frozen in a conventional static freezer at −25 °C.

1.2.6. Cooking

After freezing, the salted, enzymatically treated and acidified protein solutions were baked in a standard oven. The core temperature in said solutions was raised to 95 °C and then said solutions were removed from the oven and allowed to cool for at least 15 minutes (in particular for 15 min) at room temperature. The salted, enzymatically treated, acidified and baked protein solutions can be characterized as is or undergo negative cold storage prior to characterization.

1.2.7. $2^{nde}$ Freezing

In the case of cold storage, the salted, enzymatically treated, cooled, acidified, frozen and cooked protein solution was then placed back in a conventional static freezer at −25 °C.

1.2.8. Thawing

After storage in a conventional freezer, the cooked salted protein solutions were thawed at room temperature for 4 hours. At the end of this stage, the various characterization measurements could be carried out.

1.3. Products & Suppliers

Soy protein isolate SUPRO® 620 IP (Solae)
Untreated fine salt (Colin Ingredients)
Transglutaminase PROBIND® TXo (BDF Ingredients)
Lactic acid (Lactic acid—natural≥85%, Sigma-Aldrich)

2. Results

Figure 20:
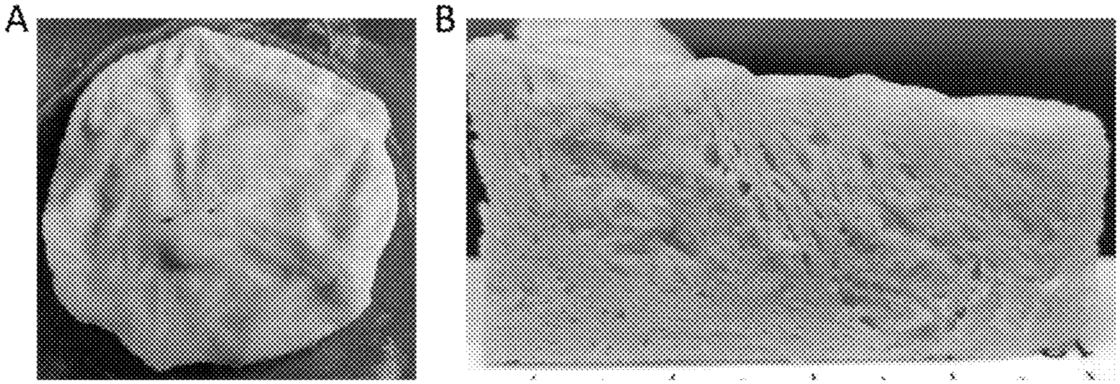
FIG. 20 shows all of the fibrous or laminated, and textured food products obtained after the implementation of Example 17. (A) The enzymatically treated, acidified (pH 5.6), salted protein solution was frozen in static cold. (B) The fibrous, cohesive, textured food product of FIG. 20A has fibres with an average length of 7 mm and an average thickness of 0.22 mm.

After the implementation of this example the resulting fibrous and textured food products were photographed (see FIG. 20). Briefly:

The salted, enzymatically treated, acidified protein solution (pH 5.6) resulted, after freezing, in a fibrous, cohesive and textured food product (cf. FIG. 20A), with a density of 1.7 g/cm$^3$, a water retention capacity of 68%, a firmness of 32 N and an elasticity of 51%; with fibres with an average length of 7 mm and an average thickness of 0.22 mm (see FIG. 20B). The physicochemical properties of the product are detailed in Table 22 below.

TABLE 22

Physicochemical properties of the product of the invention produced according to Examples 9 to 17

| | | Example 9 | | Example 10 100% peas | | Example 11 | | Example 13 |
|---|---|---|---|---|---|---|---|---|
| | | Pea | Soy | static | static | $CaCl_2$ + enzyme | | Broad |
| | | isolate | isolate | −25° C. | −18° C. | static | ventilated | Bean Flour |
| Texturometry | Firmness (N) | 16.86 | 22.97 | 35.53 | 44.43 | 21.42 | 17.62 | 12.25 |
| | Resilience (%) | 13.8 | 15.78 | 11.58 | 23.06 | 11.60 | 11.77 | 5.10 |
| | Cohesion (—) | 0.35 | 0.41 | 0.32 | 0.55 | 0.33 | 0.33 | 0.16 |
| | Elasticity (%) | 33 | 32.3 | 24.06 | 47.35 | 26.01 | 26.47 | 18.96 |
| | Chewability (N) | 197.58 | 308 | 278.06 | 1185.30 | 187.88 | 158.66 | 36.46 |
| Physical chemistry | Dry matter (g/100 g) | 30.35 | 23.02 | 27.00 | 26.18 | 21.32 | 24.36 | 29.63 |
| | Humidity (%) | 70 | 77 | 73% | 74% | 79% | 76% | 70% |
| | Water retention capacity (%) | 99.01 | 98.29 | 73% | 80% | 69% | 66% | 80% |
| | Water retention capacity as a function of dry matter | 1.42 | 1.28 | 1.00 | 1.08 | 0.88 | 0.87 | 1.14 |
| | Product density ($g/cm^3$) | 1.7 | 1.42 | 1.83 | 1.78 | 1.68 | 1.78 | 1.59 |
| Image analysis | Fibre density (%) | 63.97 | 71.07 | 67.75 | 53.18 | 83.45 | 75.19 | 79.38 |
| | Fibre thickness (mm) | 0.26 | 0.22 | 0.27 | 0.28 | 0.42 | 0.38 | 0.48 |
| | Fibre length (mm) | 6.38 | 7.5 | 5.24 | 8.02 | 2.92 | 4,.53 | 4.99 |
| | Interfibre space (mm) | 0.15 | 0.12 | 0.14 | 0.26 | 0.47 | 0.57 | 0.11 |
| | Length (mm) | 85 | 85 | 86 | 90 | 133 | 90 | 137 |
| | Width (mm) | 85 | 85 | 86 | 90 | 58 | 90 | 55 |
| | Height (mm) | 19 | 21 | 18.5 | 19 | 23 | 22 | 33 |
| | Fibre length versus product length | 0.08 | 0.09 | 0.06 | 0.09 | 0.02 | 0.05 | 0.04 |
| | Length of the fibres in relation to the width of the product | 0.08 | 0.09 | 0.06 | 0.09 | 0.05 | 0.05 | 0.09 |
| | Length of the fibres as a function of the height of the product | 0.34 | 0.36 | 0.28 | 0.42 | 0.13 | 0.21 | 0.15 |

| | | Example 15 | | Example 16 Pea-soya hybrid | | Example 12 | | Example 14 |
|---|---|---|---|---|---|---|---|---|
| | | Pea-rice hybrid | | static | static | Soy-gluten hybrid | | PdT |
| | | static | ventilated | −25° C. | −18° C. | static | ventilated | isolate |
| Texturometry | Firmness (N) | 45.19 | 44.22 | 25.29 | 17.96 | 27.27 | 21.55 | 18.80 |
| | Resilience (%) | 21.20 | 22.41 | 20.90 | 19.08 | 17.94 | 18.91 | 16.87 |
| | Cohesion (—) | 0.50 | 0.51 | 0.50 | 0.47 | 0.47 | 0.48 | 0.36 |
| | Elasticity (%) | 51.61 | 50.92 | 42.94 | 38.99 | 36.47 | 38.85 | 44.03 |
| | Chewability (N) | 1181.58 | 1178.08 | 555.89 | 334.99 | 474.49 | 414.06 | 291.49 |
| Physical chemistry | Dry matter (g/100 g) | 28.22 | 30.82 | 26.62 | 27.02 | 25.07 | 28.77 | 27.01 |
| | Humidity (%) | 72% | 69% | 73% | 73% | 75% | 71% | 73% |
| | Water retention capacity (%) | 82% | 80% | 77% | 76% | 64% | 63% | 83% |

TABLE 22-continued

Physicochemical properties of the product of the invention produced according to Examples 9 to 17

| | | | | | | | | |
|---|---|---|---|---|---|---|---|---|
| | Water retention capacity as a function of dry matter | 1.14 | 1.16 | 1.05 | 1.04 | 0.85 | 0.88 | 1.14 |
| | Product density (g/cm$^3$) | 1.69 | 1.58 | 1.69 | 1.60 | 1.71 | 1.74 | Not measurable |
| Image analysis | Fibre density (%) | 76.00 | 71.57 | 73.04 | 70.10 | 77.10 | 81.60 | 68.80 |
| | Fibre thickness (mm) | 0.23 | 0.21 | 0.32 | 0.41 | 0.21 | 0.22 | 0.86 |
| | Fibre length (mm) | 3.81 | 2.90 | 6.08 | 7.20 | 6.38 | 5.24 | 5.19 |
| | Interfibre space (mm) | 0.13 | 0.12 | 0.20 | 0.28 | 0.22 | 0.23 | 0.11 |
| | Length (mm) | 118 | 90 | 125 | 87 | 128 | 80 | 126 |
| | Width (mm) | 42 | 90 | 46 | 87 | 44 | 80 | 45 |
| | Height (mm) | 32 | 17 | 25 | 24 | 25 | 23 | 36 |
| | Fibre length versus product length | 0.03 | 0.03 | 0.05 | 0.08 | 0.05 | 0.07 | 0.04 |
| | Length of the fibres in relation to the width of the product | 0.09 | 0.03 | 0.13 | 0.08 | 0.15 | 0.07 | 0.12 |
| | Length of the fibres as a function of the height of the product | 0.12 | 0.17 | 0.24 | 0.30 | 0.26 | 0.23 | 0.14 |

Example 18—Microbiology of an Example of the Product of the Invention

The product of the invention obtained according to example 9 recipe #1 was frozen in a silicone mould in a conventional freezer at −25 °C for 24 hours. The resulting product was then baked to reach a core temperature of 95 °C. The product was cooled to room temperature and then vacuum sealed in a plastic bag with a benchtop heat sealer (E2900, Geryon, France). The product was stored in the dark at 4 °C for 50 days in a closed refrigerator-type cabinet. The microbiology of the product was analysed by an external laboratory (Wessling, Germany) and the results are presented in the table below.

TABLE 23

Microbiology of an example of the product of the invention

| Parameters | Target | Criterion | Method |
|---|---|---|---|
| Aerobic mesophilic microorganisms at 30° C. (cfu/g) | <10 000 | <100 000 | ISO 4833 |
| Lactic acid bacteria 30° C. (cfu/g) | <1000 | | ISO 15214 |
| *Escherichia coli* B glucuronidase + 44° C. (cfu/g) | <10 | <100 | ISO 16649 |
| Coagulase-positive staphylococci 37° C. (cfu/g) | <10 | <100 | ISO 6888 |
| Presumptive *Bacillus cereus* at 30° C. (cfu/g) | <100 | <100 | ISO 7932 |
| *Salmonella*/25 g | Absence | Absence | BRD July 2011-December 2005 |
| *Listeria monocytogenes*/25 g | Absence | Absence | AES October 2003-September 2000 (ALOA ONE DAY) |
| Yeast and Mold (cfu/g) | <100 | <1 000 | NF V08-059 |
| Enterobacteriaceae (cfu/g) | <100 | <1 000 | ISO 21528-2 |

Under these storage conditions, the product remains edible 50 days after the date of production according to European legislation on ready-to-eat products (Commission Regulation (EC) No 2073/2005, 2005. *Official Journal of the European Commission*. L 338/1; Health and protection agency, 2009. *Guidelines for Assessing the Microbiological Safety of Ready-to-Eat Foods Placed on the Market*; fcd, 2021. *Microbiological criteria applicable from* 2022 *to private labels, premium brands and raw materials in their original industrial packaging*).

Example 19

1. Materials & Methods 1.1 Recipe

TABLE 24

| Recipes using soy protein isolate (SPI) and whey protein | | |
|---|---|---|
| Ingredients | Original recipe for 100 g<br>Quantity (g) | Recipe for 600 g |
| Initial mix | | |
| Soy protein isolate | 10.00 | 60.00 |
| Whey protein isolate | 2 | 12 |
| NaCl | 0.4 | 2.4 |
| Distilled water | 86.98 | 521.88 |
| 1st addition | | |
| Microbial transglutaminase (mTG) powder | 0.12 | 0.72 |
| 2nd addition: acid until target pH is reached | | |
| Citric acid solution (concentrated to 50% acid) | 0.50 | 3.00 |
| Total | 100.00 | 600.00 |

1.2. Protocol

See protocols example 12

Example 20

1. Materials & Methods 1.1 Recipe

TABLE 25

| Recipes using soy protein isolate (SPI) and ovalbumin protein | | |
|---|---|---|
| Ingredients | Original recipe for 100 g<br>Quantity (g) | Recipe for 600 g |
| Initial mix | | |
| Soy protein isolate | 10.00 | 60.00 |
| Ovalbumin protein isolate | 1 | 6 |
| NaCl | 0.4 | 2.4 |
| Distilled water | 87.98 | 527.88 |
| 1st addition | | |
| Microbial transglutaminase (mTG) powder | 0.12 | 0.72 |
| 2nd addition: acid until target pH is reached | | |
| Citric acid solution (concentrated to 50% acid) | 0.50 | 3.00 |
| Total | 100.00 | 600.00 |

1.2. Protocol

See protocols example 12

Example 21

1. Materials & Methods 1.1 Recipe

TABLE 26

| Recipes using soy protein isolate (SPI) and BSA protein | | |
|---|---|---|
| Ingredients | Original recipe for 100 g<br>Quantity (g) | Recipe for 600 g |
| Initial mix | | |
| Soy protein isolate | 10.00 | 60.00 |
| BSA protein isolate | 0.5 | 3 |
| NaCl | 0.2 | 1.2 |
| Distilled water | 88.68 | 532.08 |
| 1st addition | | |
| Microbial transglutaminase (mTG) powder | 0.12 | 0.72 |
| 2nd addition: acid until target pH is reached | | |
| Citric acid solution (concentrated to 50% acid) | 0.50 | 3.00 |
| Total | 100.00 | 600.00 |

1.2. Protocol

See protocols example 12

Example 22

1. Materials & Methods 1.1 Recipe

TABLE 27

| Recipes using soy protein isolate and oat fibres | | |
|---|---|---|
| Ingredients | Original recipe for 100 g<br>Quantity (g) | Recipe for 800 g |
| Initial mix | | |
| Soy protein isolate | 13.2 | 105.6 |
| Oat fibres | 1.0 | 8.0 |
| NaCl | 0.3 | 2.4 |
| Distilled water | 78.87 | 630.96 |
| Vegetable oil | 3.0 | 24.0 |
| 1st addition | | |
| Microbial transglutaminase (mTG) powder | 0.18 | 1.44 |
| Aromatic mix | 3.05 | 24.4 |
| Adding water | 0 | 0 |

TABLE 27-continued

| Recipes using soy protein isolate and oat fibres | | |
|---|---|---|
| Ingredients | Original recipe for 100 g<br>Quantity (g) | Recipe for 800 g |
| 2nd addition: acid until target pH is reached | | |
| Citric acid solution | 0.4 | 3.2 |
| Citric acid monohydrate | 0.2 | 1.6 |
| Distilled water | 0.2 | 1.6 |
| Total | 100.0 | 800.0 |

TABLE 28

| Recipes of the "skin" for coating the fibrous or laminated, and textured food product | | |
|---|---|---|
| Ingredients | Original recipe for 100 g<br>Quantity (g)<br>Initial mix | Recipe for 400 g |
| Vegetable oil | 35.0 | 140.0 |
| Sunflower lecithin | 0.3 | 1.2 |
| Soy protein isolate | 10.0 | 40.0 |
| Distilled water | 54.7 | 218.8 |
| Total | 100.0 | 400.0 |

1.2. Protocol 1.2.1. Saline Protein Solution and Hydration

The water and NaCl were mixed in a blender (Cook robot, commercialised by Robot-Coupe®) at 200 rpm for 2 min to diffuse the NaCl into the water. The protein isolate powder and the oat fibres were then added and mixed at 350 rpm for 5 min. The edges of the bowl were scraped to avoid the accumulation of unhydrated powder on the sides. Vegetable oil was then added and the resulting saline protein solution was again mixed at 350 rpm for 25 min, for a total hydration time of 30 min.

1.2.2. Flavouring and Enzymatic Treatment

The mixer was equipped with 2 thermocouples to measure the surface and core temperatures of the mixture. The salted protein solution was heated by holding the mixture at 350 rpm until the core temperature reached 50 °C. Once this temperature was reached, the aromatic mix and the enzyme (or enzyme solution if dispersed in water) were added and incubated for 30 min hour with gentle agitation.

1.2.3. Cooling and Acidification

The enzymatically treated salt protein solution was cooled as quickly as possible. For this purpose, the container containing the enzymatically treated salted solution was placed in a double-jacket cooler with water circulating at 4 °C. The temperature was monitored by a thermocouple immersed in the protein solution until it reached 10 °C core temperature. The salted and enzymatically treated protein solution was then acidified with citric acid until a pH of 5.6 was reached.

1.2.4. Freezing

The salted, enzymatically treated, cooled and acidified protein solution was then frozen in a cryocabinet at −12 °C.

1.2.5. Process for Producing the Polymer Solution

Distilled water and Soy protein were mixed for 10 min. Sunflower lecithin was added to the mixture. Vegetable oil was then added and the polymer solution was mixed for 25 min.

1.2.6. Cooking and Coating

After freezing, the salted, enzymatically treated and acidified protein solution was baked in a standard oven. The core temperature in said solution was raised to 95 °C and then said solution was removed from the oven and allowed to cool for at least 15 minutes (in particular for 15 min) at room temperature.

The salted, enzymatically treated, acidified and precooked protein solution was then soaked in the polymer solution.

The salted, enzymatically treated, acidified, precooked and coated protein solution was baked a second time in a standard oven. The core temperature in said solution was raised to 95 °C and then said solution was removed from the oven and allowed to cool for at least 15 minutes (in particular for 15 min) at room temperature.

The fibrous or laminated, textured, coated and cooked food product obtained can be characterized as is or undergo deep-freezing.

1.2.7. Deep-Freezing

In the case of cold storage, the fibrous or laminated, textured and coated food product was placed back in a conventional static freezer at −25 °C.

1.2.8. Thawing

After storage in a conventional freezer, the fibrous or laminated, textured and coated food product was thawed at room temperature for 4 hours. At the end of this stage, the various characterization measurements could be carried out.

1.3. Products & Suppliers

Soy protein SOLPRO® 920 IP (Solbar)
NaCl Sodium Chloride≥99.5% (Fisher Scientific)
Transglutaminase PROBIND® TXo (BDF Ingredients)
Citric acid (Citric Acid Monohydrate, Caldic)
Sunflower lecithin (Louis Frangois)
Shea Butter Akoplanet PBM 132-46 (AAK)
Oat fibre (JRS)

2. Results

Figure 22:
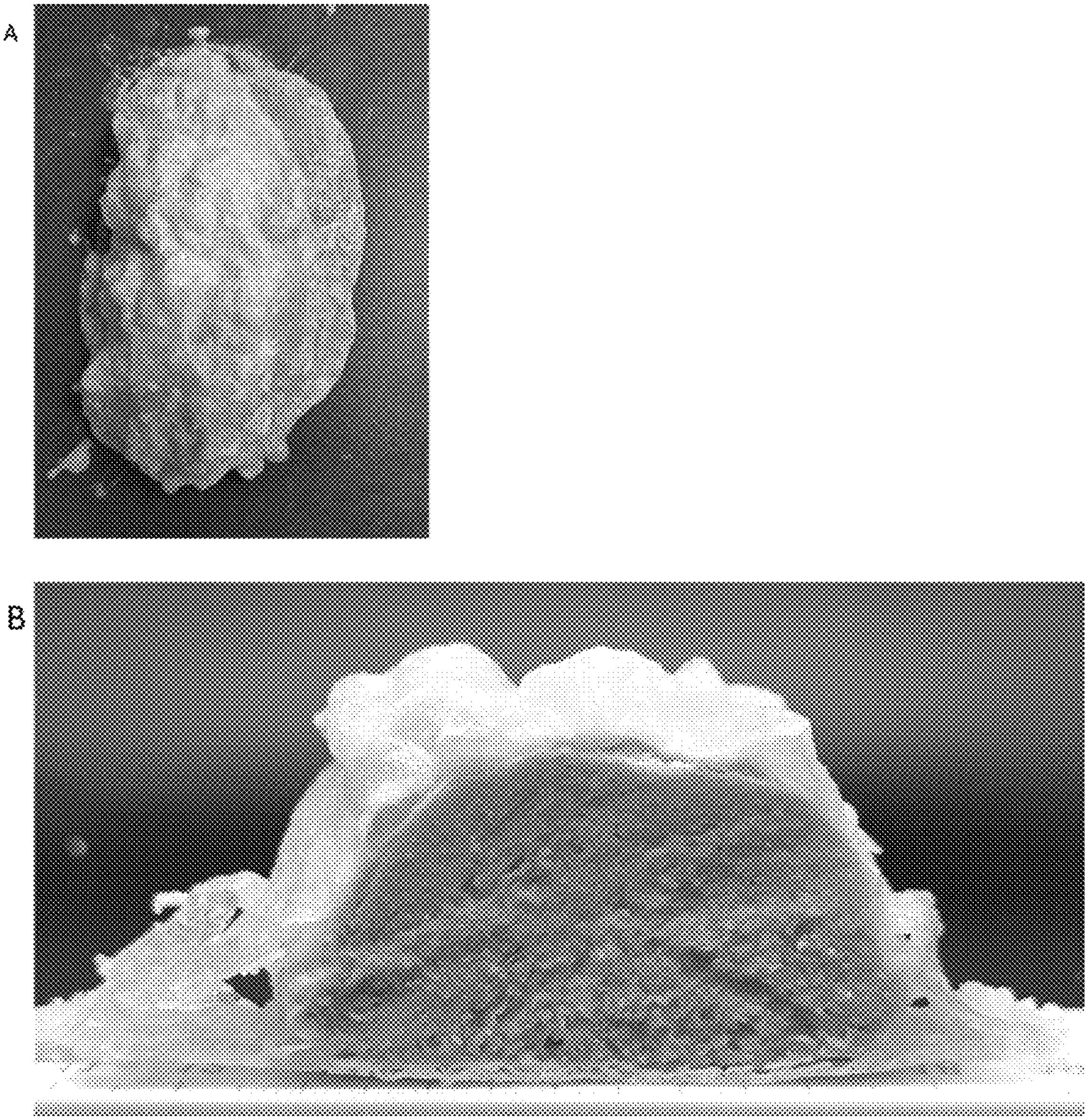
FIG. 22 shows all of the fibrous or laminated, textured and coated food products obtained after the implementation of Example 22. (A) Top view showing the skin. (B) Cross-section of the fibrous or laminated, textured and coated food product.

After the implementation of this example the resulting fibrous or laminated, textured and coated food product was photographed (see FIG. 22). Briefly:

The salted protein solution, enzymatically treated, acidified (pH 5.6) resulted, after freezing, coating and cooking, in a fibrous, cohesive, textured and coated food product (cf. FIG. 22A), with a density of 1.53 g/cm$^3$, a water retention capacity of 57%, a firmness of 24.18 N and an elasticity of 48.99%; presenting fibres with an average length of 5.06 mm and an average thickness of 0.15 mm (see FIG. 22B). The physicochemical properties of the fibrous or laminated, textured and coated food product are detailed in below Table 29.

TABLE 29

| Physicochemical properties of the coated product of the invention produced according to Example 22 | | |
|---|---|---|
| | | Example 22 |
| Texturometry | Firmness (N) | 24.18 |
| | Resilience (%) | 23.82 |
| | Cohesion (—) | 0.55 |
| | Elasticity (%) | 48.99 |
| | Chewability (N) | 662.91 |
| Physical chemistry | Dry matter (g/100 g) | 48.46 |
| | Humidity (%) | 52 |
| | Water retention capacity (%) | 57 |
| | Water retention capacity as a function of dry matter | 0.01 |
| | Product density (g/cm$^3$) | 1.53 |

TABLE 29-continued

| Physicochemical properties of the coated product of the invention produced according to Example 22 | | |
|---|---|---|
| | | Example 22 |
| Image analysis | Fibre density (%) | 89.43 |
| | Fibre thickness (mm) | 0.15 |
| | Fibre length (mm) | 5.06 |
| | Interfibre space (mm) | 0.17 |
| | Length (mm) | 150 |
| | Width (mm) | 98 |
| | Height (mm) | 33 |
| | Fibre length versus product length | 0.03 |
| | Length of the fibres in relation to the width of the product | 0.05 |
| | Length of the fibres as a function of the height of the product | 0.15 |

Example 23

1. Materials & Methods 1.1 Recipe

TABLE 30

| Recipes using soy protein isolate and oat fibres | | |
|---|---|---|
| Ingredients | Original recipe for 100 g Quantity (g) | Recipe for 800 g |
| Initial mix | | |
| Soy protein isolate | 13.2 | 105.6 |
| Oat fibres | 1.0 | 8.0 |
| NaCl | 0.3 | 2.4 |
| Distilled water | 78.87 | 630.96 |
| Vegetable oil | 3.0 | 24.0 |
| 1st addition | | |
| Microbial transglutaminase (mTG) powder | 0.18 | 1.44 |
| Aromatic mix | 3.05 | 24.4 |
| Adding water | 0 | 0 |
| 2nd addition: acid until target pH is reached | | |
| Citric acid solution | 0.4 | 3.2 |
| Citric acid monohydrate | 0.2 | 1.6 |
| Distilled water | 0.2 | 1.6 |
| Total | 100.0 | 800.0 |

TABLE 31

| Recipes of the "skin" for coating the fibrous or laminated, and textured food product | | |
|---|---|---|
| Ingredients | Original recipe for 100 g Quantity (g) | Recipe for 400 g |
| Initial mix | | |
| Vegetable oil | 5.0 | 20.0 |
| Potato starch | 1.5 | 6 |
| Sodium alginate | 0.5 | 2 |
| Distilled water | 93 | 372.0 |
| Total | 100.0 | 400.0 |

1.2. Protocol 1.2.1. Saline Protein Solution and Hydration

The water and NaCl are mixed in a blender (Cook robot, commercialised by Robot-Coupe®) at 200 rpm for 2 min to diffuse the NaCl into the water. The protein isolate powder and the oat fibres are then added and mixed at 350 rpm for 5 min. The edges of the bowl are scraped to avoid the accumulation of unhydrated powder on the sides. Vegetable oil is then added and the resulting saline protein solution is again mixed at 350 rpm for 25 min, for a total hydration time of 30 min.

1.2.2. Flavouring and Enzymatic Treatment

The mixer is equipped with 2 thermocouples to measure the surface and core temperatures of the mixture. The salted protein solution is heated by holding the mixture at 350 rpm until the core temperature reached 50 °C. Once this temperature is reached, the aromatic mix and the enzyme (or enzyme solution if dispersed in water) are added and incubated for 30 min hour with gentle agitation.

1.2.3. Cooling and Acidification

The enzymatically treated salt protein solution is cooled as quickly as possible. For this purpose, the container containing the enzymatically treated salted solution is placed in a double-jacket cooler with water circulating at 4 °C. The temperature is monitored by a thermocouple immersed in the protein solution until it reached 10 °C core temperature. The salted and enzymatically treated protein solution is then acidified with citric acid until a pH of 5.6 was reached.

1.2.4. Freezing

The salted, enzymatically treated, cooled and acidified protein solution is then frozen in a cryocabinet at −12 °C.

1.2.5. Process for Producing the Polymer Solution

Vegetable oil, potato starch and sodium alginate are mixed for 10 min. Distilled water is then added and the polymer solution is mixed for 10 min at 1000 rpm. This constitutes a first solution.

In another recipient, slowly mix the calcium chloride with distilled water until reaching a homogenous transparent solution. This constitutes a second solution.

1.2.6. Coating and Cooking

After freezing, the salted, enzymatically treated and acidified protein solution is soaked in the first solution so as to be homogenously coated. Then, the salted, enzymatically treated, acidified, frozen and coated product is dipped in the second solution. After the second coating, the product is baked at 160 °C in a standard oven for 20 min.

The fibrous or laminated, textured, coated and cooked food product obtained can be characterized as is or undergo deep-freezing.

1.2.7 Deep-Freezing

In the case of cold storage, the fibrous or laminated, textured and coated food product is placed back in a conventional static freezer at −25 °C.

1.2.8. Thawing

After storage in a conventional freezer, the fibrous or laminated, textured and coated food product is thawed at room temperature for 4 hours. At the end of this stage, the various characterization measurements could be carried out.

1.3. Products & Suppliers

Soy protein SOLPRO® 920 IP (Solbar)
NaCl Sodium Chloride≥99.5% (Fisher Scientific)
Transglutaminase PROBIND® TXo (BDF Ingredients)
Citric acid (Citric Acid Monohydrate, Caldic)
Shea Butter Akoplanet PBM 132-46 (AAK)
Oat fibre (JRS)
Potato Starch Pregeflo P100 (Roquette)
Sodium Alginate Viscarin RM55 (Dupont)
Calcium Chloride (Colin Ingredients)

2. Results

After the implementation of this example a fibrous or laminated, textured and coated food product, similar to the one of Example 22, is obtained.

We claim:

1. A fibrous and textured food product characterized by: an anisotropy greater than 1 a.u. in a texturometry test; a viscoelasticity tan S less than 1 a.u. in a rheology test; a firmness from 10.00 1 1.00 N to 50.00 1 10.00 N in a texturometry test; and a water retention capacity from 50.00±3.00% to 90.00±9.10%, said fibrous and textured food product comprising fibers with a fiber density from 40.00±5.00% to 90.00±0.10%, in which the ratio [fiber length:product width] is from 0.03±0.02 a.u. to 0.15±0.01 a.u.

2. The fibrous and textured food product according to claim 1, wherein said fibers have a thickness from 0.10±0.05 mm to 1.00±0.50 mm and a length from 1.00±0.50 mm to 150.00±20.00 mm.

3. The fibrous and textured food product according to claim 1, wherein the inter fiber space is from 0.05±0.03 mm to 1.00±0.50 mm.

4. The fibrous and textured food product according to claim 1, wherein said fibers have a thickness from 0.10±0.05 mm to 1.00±0.50 mm and a length from 1.00±0.50 mm to 150.00±20.00 mm, and wherein the inter fiber space is from 0.05±0.03 mm to 1.00±0.50 mm.

5. The fibrous and textured food product according to claim 1, said fibrous and textured food product being coated with a solution of food polymers of plant origin.

6. The fibrous and textures food product according to claim 1, comprising a plurality of flat sheets or fibers laid on top of each other.

7. A method of producing a fibrous and textured food product according to claim 1, from plant proteins, comprising at least the following steps: a) enzymatically treating a protein solution comprising from 1% to 30% by weight of plant proteins based on the weight of the protein solution and at least 20% of said plant proteins being soluble in said protein solution by adding an enzyme of the aminoacyltransferase class or the oxidoreductase class, said protein solution added with said enzyme being incubated under conditions of temperature from 30 °C to 60 °C and duration from 15 minutes to 120 minutes allowing said enzyme to catalyze at least one enzymatic reaction to obtain an enzymatically treated protein solution; and b) freezing said enzymatically treated protein solution under conditions of temperature ranging from −120 °C to −5 °C and duration ranging from 15 min to 48 h allowing the formation of protein fibers to obtain a fibrous textured food product.

8. The method according to claim 7, wherein the protein solution comprising from 1% to 30% by weight of plant proteins is derived from a mixture comprising:

at least 70% of proteins of plant origin with a lysine score of 50 to 150 and a glutamine score of 50 to 150 when said enzyme belongs to the class of aminoacyltransferases, or with a tyrosine score of 50 to 150 where the enzyme belongs to the class of oxidoreductases; and no more than 30% of other proteins.

9. The method according to claim 7, wherein said freezing in step b) is directional freezing.

10. The method according to claim 7, which further comprises a preliminary step of preparing from a protein source said protein solution comprising from 1% to 30% by weight of plant protein, or comprising from 1% to 30% by weight of plant protein from a protein mixture comprising: at least 70% of proteins of plant origin with a lysine score of 50 to 150 and a glutamine score of 50 to 150 when said enzyme belongs to the class of aminoacyltransferases or with a tyrosine score of 50 to 150 when said enzyme belongs to the class of oxidoreductases; and no more than 30% of other proteins, whether or not of plant origin, based on the mass of the protein solution and of which at least 20% of said plant proteins are soluble in said protein solution.

11. The method according to claim 7, wherein said protein source comprises proteins of plant origin comprising almond (*Prunus dulcis*), spotted amaranth (*Amaranthus cruetus*), *hypochondriacus* amaranth (*Amaranthus hypochondriacus*), fox-tail amaranth (*Amaranthus caudatus*), peanut (*Arachis hypogaea*), avocado (*Persea americana*), oat (*Avena sativa*), spelt (*Triticum spelta*), spinach (*Spinacia oleracea*), *faba* bean (*Vicia faba*), fig (*Figus carica*), cottonseed (*Gossypium hirsutum*), sesame seed (*Sesamum indicum*), sunflower seed (*Helianthus annuus*), winged bean (*Psophocarpus tetragonolobus*), common bean (*Phaseolus vulgaris*), lima bean (*Phaseolus lunatus*), mung bean (*Vigna radiata*), green bean (*Phaseolus vulgaris*), lentil (*Lens culinaris*), flax (*Linum usitatissimum*), white lupin (*Lupinus albus*), blue lupin (*Lupinus angustifolius*), changeable lupin (*Lupinus mutabilis*), yellow lupin (*Lupinus luteus*), cassava (*Manihot esculenta*), cowpea (*Vigna unguiculata*), cashew (*Anacardium occidentale*), coconut (*Cocos nucifera*), pecan (*Carya illinoinensis*), brazil nut (*Bertholletia excelsa*), barley (*Hordeum vulgare*), sweet potato (*Ipomoea batatas*), pistachio (*Pistacia vera* L.), pea (*Pisum sativum*), Bambara pea (*Vigna subterranea*), chickpea (*Cicer arietinum*), pigeonpea (*Cajanus cajan*), Maram pea (*Tylosema esculentum*), potato (*Solanum tuberosum*), rice (*Oryza sativa*), buckwheat (*Fagopyrum esculentum*), rye (*Secale cereale* L.), soybean (*Glycine max*) or their mixtures.

12. The method according to claim 10, wherein said preliminary step further comprises a step of mixing said protein solution with a salted solution comprising: NaCl;

and/or KCl; and/or an alkaline earth salt comprising $CaCl_2$, $MgCl_2$, $BaCl_2$ or mixtures thereof, to obtain a salted protein solution.

13. The method according to claim 10, wherein said preliminary step further comprises a step of hydrating said plant proteins for a period of at least one minute.

14. The method according to claim 7, wherein the amount of enzyme added in step a) is from 0.001% to 1.0% by weight of enzyme based on the weight of the protein solution.

15. The method according to claim 7, which further comprises between steps a) and b) a step i) of mixing said enzymatically treated protein solution with a salted solution comprising: an alkaline earth salt comprising $CaCl_2$, $MgCl_2$, $BaCl_2$ or mixtures thereof; and/or of KCl, to obtain an enzymatically treated and salted protein solution.

16. The method according to claim 15, which further comprises prior to step b) a step ii) of mixing said enzymatically treated protein solution with an acidic solution to obtain an enzymatically treated and acidified protein solution.

17. The method according to claim 7, which further comprises after step b) a step c) of precooking said fibrous and textured food product under conditions to denature the enzyme to obtain a fibrous and textured and precooked food product, in particular temperature conditions ranging from 70 °C to 250 °C and duration ranging from 15 minutes to 180 minutes.

18. The method according to claim 17, which further comprises after step c) a step d) of freezing or deep-freezing said fibrous textured and precooked food product.

19. The method according to claim 6, wherein said fibrous textured food product obtained from step b) has: a height of at least 0.5 cm; a thickness of at least 0.5 cm; and a width of at least 0.5 cm.

20. The method according to claim 7, which further comprises after step b) a step of coating the fibrous textured food product with a solution of food polymers of vegetable origin in order to obtain a fibrous, textured, and coated food product.

21. A fibrous and textured food product obtainable by the method of claim 7.

* * * * *

SEQUENCE LISTING

```
Sequence total quantity: 1
SEQ ID NO: 1           moltype = AA  length = 386
FEATURE                Location/Qualifiers
source                 1..386
                       mol_type = protein
                       organism = Gallus gallus
SEQUENCE: 1
MGSIGAASME FCFDVFKELK VHHANENIFY CPIAIMSALA MVYLGAKDST RTQINKVVRF  60
DKLPGFGDSI EAQCGTSVNV HSSLRDILNQ ITKPNDVYSF SLASRLYAEE RYPILPEYLQ  120
CVKELYRGGL EPINFQTAAD QARELINSWV ESQTNGIIRN VLQPSSVDSQ TAMVLVNAIV  180
FKGLWEKAFK DEDTQAMPFR VTEQESKPVQ MMYQIGLFRV ASMASEKMKI LELPFASGTM  240
SMLVLLPDEV SGLEQLESII NFEKLTEWTS SNVMEERKIK VYLPRMKMEE KYNLTSVLMA  300
MGITDVFSSS ANLSGISSAE SLKISQAVHA AHAEINEAGR EVVGSAEAGV DAASVSEEFR  360
ADHPFLFCIK HIATNAVLFF GRCVSP                                     386
```